US011409658B2

(12) United States Patent
Vemulapalli et al.

(10) Patent No.: US 11,409,658 B2
(45) Date of Patent: *Aug. 9, 2022

(54) DATA PREFETCHING FOR GRAPHICS DATA PROCESSING

(71) Applicant: Intel Corporation, Santa Clara, CA (US)

(72) Inventors: Vikranth Vemulapalli, Folsom, CA (US); Lakshminarayanan Striramassarma, Folsom, CA (US); Mike MacPherson, Portland, OR (US); Aravindh Anantaraman, Folsom, CA (US); Ben Ashbaugh, Folsom, CA (US); Murali Ramadoss, Folsom, CA (US); William B. Sadler, Folsom, CA (US); Jonathan Pearce, Hillsboro, OR (US); Scott Janus, Loomis, CA (US); Brent Insko, Portland, OR (US); Vasanth Ranganathan, El Dorado Hills, CA (US); Kamal Sinha, Rancho Cordova, CA (US); Arthur Hunter, Jr., Cameron Park, CA (US); Prasoonkumar Surti, Folsom, CA (US); Nicolas Galoppo von Borries, Portland, OR (US); Joydeep Ray, Folsom, CA (US); Abhishek R. Appu, El Dorado Hills, CA (US); ElMoustapha Ould-Ahmed-Vall, Chandler, AZ (US); Altug Koker, El Dorado Hills, CA (US); Sungye Kim, Folsom, CA (US); Subramaniam Maiyuran, Gold River, CA (US); Valentin Andrei, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/161,465

(22) Filed: Jan. 28, 2021

(65) Prior Publication Data

US 2021/0255957 A1    Aug. 19, 2021

Related U.S. Application Data

(63) Continuation of application No. 16/355,015, filed on Mar. 15, 2019, now Pat. No. 10,909,039.

(51) Int. Cl.
*G09G 5/36* (2006.01)
*G06F 12/0862* (2016.01)
(Continued)

(52) U.S. Cl.
CPC .......... *G06F 12/0862* (2013.01); *G06T 1/20* (2013.01); *G06T 1/60* (2013.01); *G06F 2212/602* (2013.01); *G06F 2212/608* (2013.01)

(58) Field of Classification Search
CPC ............ G06F 12/0862; G06F 12/0897; G06F 12/0811; G06F 2212/602;
(Continued)

(56) References Cited

U.S. PATENT DOCUMENTS 6,898,674 B2    5/2005    Maiyuran et al.
7,873,812 B1    1/2011    Mimar
(Continued)

FOREIGN PATENT DOCUMENTS

CN    113454609 A    9/2021
DE    112020000902 T5    11/2021
(Continued)

OTHER PUBLICATIONS

Notification of Transmittal of the International Search Report and the Written Opinion of the International Searching Authority for PCT Application No. PCT/US2020/017897, dated May 29, 2020, 15 pages.
(Continued)

*Primary Examiner* — Hau H Nguyen
(74) *Attorney, Agent, or Firm* — Jaffery Watson Mendonsa & Hamilton LLP

(57) ABSTRACT

Embodiments are generally directed to data prefetching for graphics data processing. An embodiment of an apparatus includes one or more processors including one or more graphics processing units (GPUs); and a plurality of caches to provide storage for the one or more GPUs, the plurality
(Continued)

of caches including at least an L1 cache and an L3 cache, wherein the apparatus to provide intelligent prefetching of data by a prefetcher of a first GPU of the one or more GPUs including measuring a hit rate for the L1 cache; upon determining that the hit rate for the L1 cache is equal to or greater than a threshold value, limiting a prefetch of data to storage in the L3 cache, and upon determining that the hit rate for the L1 cache is less than a threshold value, allowing the prefetch of data to the L1 cache.

18 Claims, 48 Drawing Sheets

(51) Int. Cl.
*G06T 1/20* (2006.01)
*G06T 1/60* (2006.01)

(58) Field of Classification Search
CPC ..... G06F 2212/6026; G06F 2212/6022; G06F 9/3802; G06F 2212/6024; G06F 2201/885; G06F 2212/1021; G06F 2212/283; G06F 2212/6028; G06F 8/4442; G06F 9/3814; G06F 9/383
See application file for complete search history.

(56) References Cited

U.S. PATENT DOCUMENTS

| | | | |
|---|---|---|---|
| 10,528,864 | B2 | 1/2020 | Dally et al. |
| 10,860,922 | B2 | 12/2020 | Dally et al. |
| 10,891,538 | B2 | 1/2021 | Dally et al. |
| 2006/0041723 | A1 | 2/2006 | Hakura et al. |
| 2012/0066455 | A1 | 3/2012 | Punyamurtula et al. |
| 2013/0246708 | A1 | 9/2013 | Ono et al. |
| 2015/0149714 | A1 | 5/2015 | Pugsley et al. |
| 2015/0221063 | A1 | 8/2015 | Kim et al. |
| 2016/0062947 | A1 | 3/2016 | Chetlur et al. |
| 2017/0371795 | A1 | 12/2017 | Wang et al. |
| 2018/0046906 | A1 | 2/2018 | Dally et al. |
| 2019/0294546 | A1* | 9/2019 | Agarwal ............... G06F 3/0611 |
| 2020/0117462 | A1 | 4/2020 | Jin |

FOREIGN PATENT DOCUMENTS

| | | |
|---|---|---|
| EP | 3972187 A1 | 3/2022 |
| WO | 2020/190429 A1 | 9/2020 |

OTHER PUBLICATIONS

Fang Juan, et al., "Miss-Aware LLC Buffer Management Strategy Based on Heterogeneous Multi-Core", Journal of Supercomputing, Kluwer Academic Publishers, Dordrecht, NL, vol. 75, No. 8, Feb. 20, 2019, pp. 4519-4528, XP036884000, ISSN: 0920-8542, DOI: 10.1007/S11227-019-02763-3.

Wenji Wu et al: "G-NetMon: A GPU-accelerated network performance monitoring system for large scale scientific collaborations", Local Computer Networks (LCN), 2011 IEEE 36th Conference on, IEEE, Oct. 4, 2011 (Oct. 4, 2011), pp. 195-198, XP032081687,DOI: 10.1109/LCN.2011.6115186ISBN: 978-1-61284-926-3.

Chakroun I et al: "Combining multi-core and GPU computing for solving combinatorial optimization problems", Journal of Parallel and Distributed Computing, Elsevier, Amsterdam, NL, vol. 73, No. 12, Aug. 22, 2013 (Aug. 22, 2013), pp. 1563-1577, XP028738004, ISSN: 0743-7315, DOI: 10.1016/J.JPDC.2013.07.023.

Yin-Chi Peng et al: "Cross-layer dynamic prefetching allocation strategies for high-performance multicores", VLSI Design, Automation, and Test (VLSI-DAT), 2013 International Symposium on, IEEE, Apr. 22, 2013 (Apr. 22, 2013), pp. 1-4, XP032679904, DOI: 10.1109/VLDI-DAT.2013.6533864 ISBN: 978-1-4673-4435-7 [retrieved on Jun. 14, 2013].

Goodfellow, et al. "Adaptive Computation and Machine Learning Series", Book, Nov. 18, 2016, pp. 98-165, Chapter 5, The MIT Press, Cambridge, MA.

Ross, et al. "Intel Processor Graphics: Architecture & Programming", Power Point Presentation, Aug. 2015, 78 pages, Intel Corporation, Santa Clara, CA.

Shane Cook, "CUDA Programming", Book, 2013, pp. 37-52, Chapter 3, Elsevier Inc., Amsterdam Netherlands.

Nicholas Wilt, "The CUDA Handbook; A Comprehensive Guide to GPU Programming", Book, Jun. 22, 2013, pp. 41-57, Addison-Wesley Professional, Boston, MA.

Stephen Junking, "The Compute Architecture of Intel Processor Graphics Gen9", paper, Aug. 14, 2015, 22 pages, Version 1.0, Intel Corporation, Santa Clara, CA.

* cited by examiner

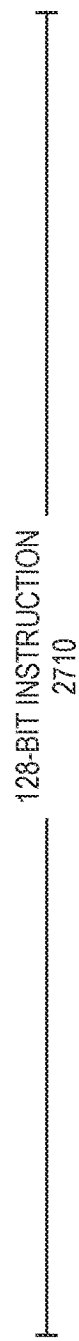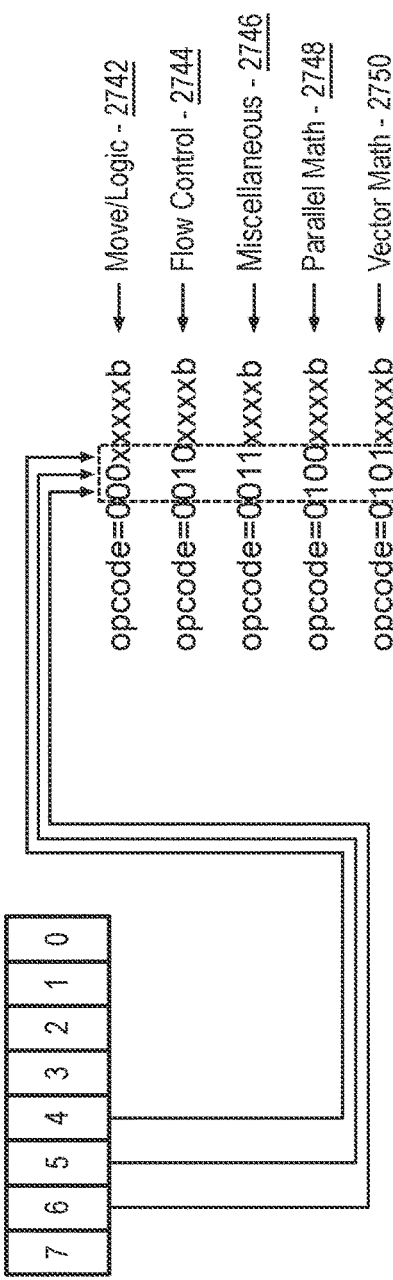
FIG. 27

FIG. 29A  GRAPHICS PROCESSOR COMMAND FORMAT
2900
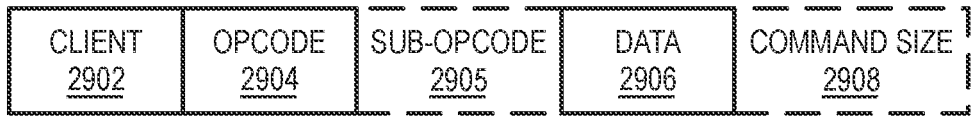
FIG. 29B  GRAPHICS PROCESSOR COMMAND SEQUENCE
2910
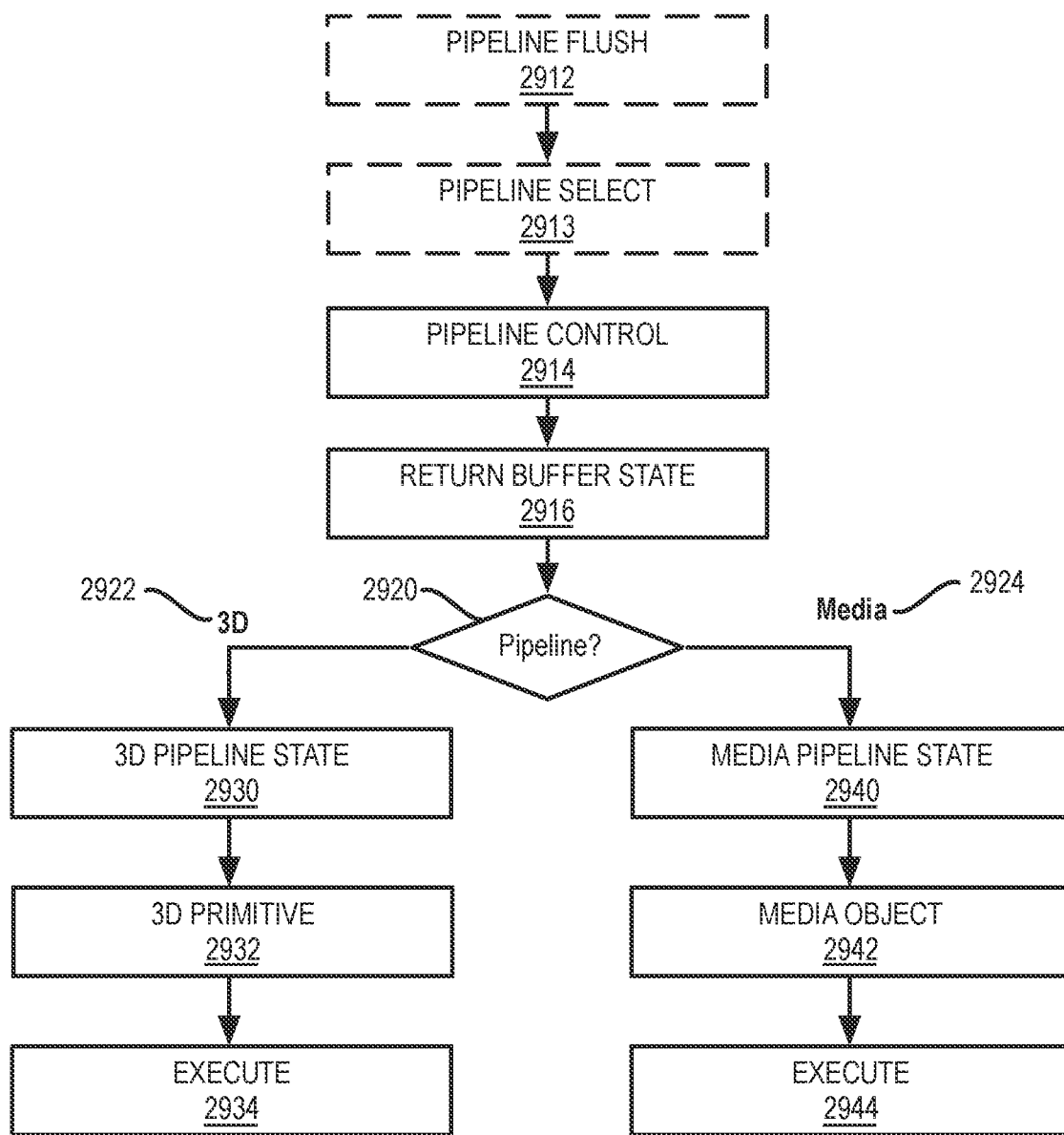

DATA PREFETCHING FOR GRAPHICS DATA PROCESSING

CLAIM TO PRIORITY

This Application is a continuation of and claims the benefit of and priority to U.S. application Ser. No. 16/355,015, entitled DATA PREFETCHING FOR GRAPHICS DATA PROCESSING, by Vikranth Vemulapalli, et al., filed Mar. 15, 2019, the entire contents of which are incorporated herein by reference.

TECHNICAL FIELD

Embodiments described herein generally relate to the field of electronic devices and, more particularly, data prefetching for graphics data processing.

BACKGROUND

Current parallel graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process, in parallel, as much graphics data as possible throughout the different parts of the graphics pipeline. Parallel graphics processors with single instruction, multiple thread (SIMT) architectures are designed to maximize the amount of parallel processing in the graphics pipeline. In an SIMT architecture, groups of parallel threads attempt to execute program instructions synchronously together as often as possible to increase processing efficiency. A general overview of software and hardware for SIMT architectures can be found in Shane Cook, *CUDA Programming* Chapter 3, pages 37-51 (2013).

Conventional graphics processing systems provide for prefetching of data elements for efficiency in graphics data processing. However, the prefetching operations in such systems includes numerous inefficiencies in how the prefetches are constructed or handled.

BRIEF DESCRIPTION OF THE DRAWINGS

Embodiments described here are illustrated by way of example, and not by way of limitation, in the figures of the accompanying drawings in which like reference numerals refer to similar elements.

FIG. 27 is a block diagram illustrating a graphics processor instruction formats according to some embodiments;

FIG. 29A-29B illustrate a graphics processor command format and command sequence, according to some embodiments;

DETAILED DESCRIPTION

Embodiments described herein are generally directed to data prefetching for graphics data processing.

In some embodiments, an apparatus, system, or process provides for improvements in data prefetching for graphics data processing, including one or more of the following:

(1) Intelligent Prefetch to Cache Based on Cache Hit Rate;

(2) Cache Prefetch Enhancement to Squash Unnecessary Prefetches;

(3) Speculative Prefetch;

(4) Prefetch for Instruction Cache (I-Cache); or (5) Exploiting Bandwidth Sources for Prefetching/Scrubbing.

In some embodiments, a graphics processing unit (GPU) is communicatively coupled to host/processor cores to accelerate graphics operations, machine-learning operations, pattern analysis operations, and various general-purpose GPU (GPGPU) functions. The GPU may be communicatively coupled to the host processor/cores over a bus or another interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

Figure 1:
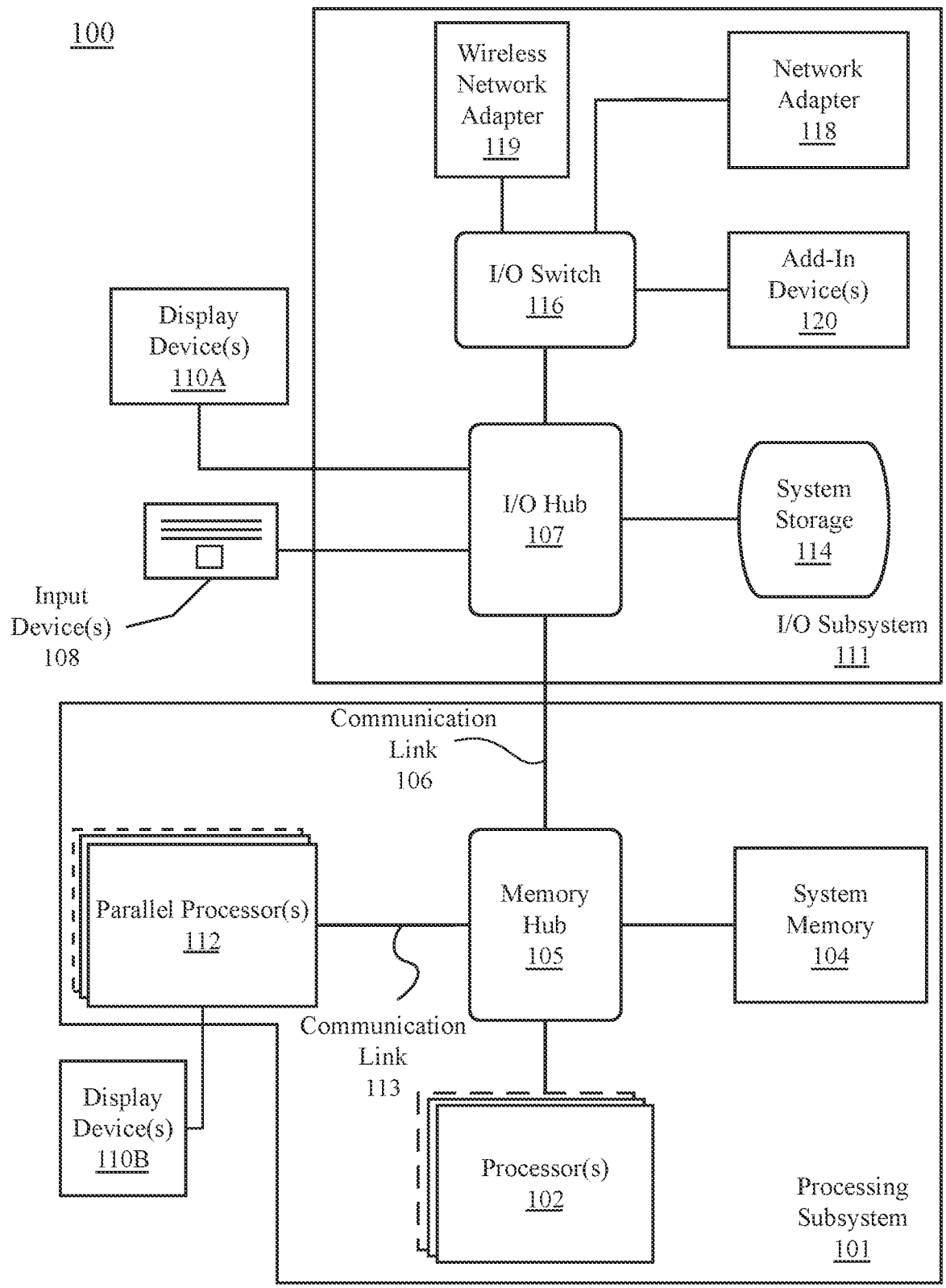
FIG. 1 is a block diagram illustrating a computer system configured to implement one or more aspects of the embodiments described herein.

FIG. 1 is a block diagram illustrating a computing system 100 configured to implement one or more aspects of the embodiments described herein. The computing system 100 includes a processing subsystem 101 having one or more processor(s) 102 and a system memory 104 communicating via an interconnection path that may include a memory hub 105. The memory hub 105 may be a separate component within a chipset component or may be integrated within the one or more processor(s) 102. The memory hub 105 couples with an I/O subsystem 111 via a communication link 106. The I/O subsystem 111 includes an I/O hub 107 that can enable the computing system 100 to receive input from one or more input device(s) 108. Additionally, the I/O hub 107 can enable a display controller, which may be included in the one or more processor(s) 102, to provide outputs to one or more display device(s) 110A. In one embodiment the one or more display device(s) 110A coupled with the I/O hub 107 can include a local, internal, or embedded display device.

In one embodiment the processing subsystem 101 includes one or more parallel processor(s) 112 coupled to memory hub 105 via a bus or other communication link 113. The communication link 113 may be one of any number of standards based communication link technologies or protocols, such as, but not limited to PCI Express, or may be a vendor specific communications interface or communications fabric. In one embodiment the one or more parallel processor(s) 112 form a computationally focused parallel or vector processing system that can include a large number of processing cores and/or processing clusters, such as a many integrated core (MIC) processor. In one embodiment the one or more parallel processor(s) 112 form a graphics processing subsystem that can output pixels to one of the one or more display device(s) 110A coupled via the I/O Hub 107. The one or more parallel processor(s) 112 can also include a display controller and display interface (not shown) to enable a direct connection to one or more display device(s) 110B.

Within the I/O subsystem 111, a system storage unit 114 can connect to the I/O hub 107 to provide a storage mechanism for the computing system 100. An I/O switch 116 can be used to provide an interface mechanism to enable connections between the I/O hub 107 and other components, such as a network adapter 118 and/or wireless network adapter 119 that may be integrated into the platform, and various other devices that can be added via one or more add-in device(s) 120. The network adapter 118 can be an Ethernet adapter or another wired network adapter. The wireless network adapter 119 can include one or more of a Wi-Fi, Bluetooth, near field communication (NFC), or other network device that includes one or more wireless radios.

The computing system 100 can include other components not explicitly shown, including USB or other port connections, optical storage drives, video capture devices, and the like, may also be connected to the I/O hub 107. Communication paths interconnecting the various components in FIG. 1 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 112 incorporate circuitry optimized for graphics and video processing, including, for example, video output circuitry, and constitutes a graphics processing unit (GPU). In another embodiment, the one or more parallel processor(s) 112 incorporate circuitry optimized for general purpose processing, while preserving the underlying computational architecture, described in greater detail herein. In yet another embodiment, components of the computing system 100 may be integrated with one or more other system elements on a single integrated circuit. For example, the one or more parallel processor(s) 112, memory hub 105, processor(s) 102, and I/O hub 107 can be integrated into a system on chip (SoC) integrated circuit. Alternatively, the components of the computing system 100 can be integrated into a single package to form a system in package (SIP) configuration. In one embodiment at least a portion of the components of the computing system 100 can be integrated into a multi-chip module (MCM), which can be interconnected with other multi-chip modules into a modular computing system.

It will be appreciated that the computing system 100 shown herein is illustrative and that variations and modifications are possible. The connection topology, including the number and arrangement of bridges, the number of processor(s) 102, and the number of parallel processor(s) 112, may be modified as desired. For instance, in some embodiments, system memory 104 is connected to the processor(s) 102 directly rather than through a bridge, while other devices communicate with system memory 104 via the memory hub 105 and the processor(s) 102. In other alternative topologies, the parallel processor(s) 112 are connected to the I/O hub 107 or directly to one of the one or more processor(s) 102, rather than to the memory hub 105. In other embodiments, the I/O hub 107 and memory hub 105 may be integrated into a single chip. Some embodiments may include two or more sets of processor(s) 102 attached via multiple sockets, which can couple with two or more instances of the parallel processor(s) 112.

Some of the particular components shown herein are optional and may not be included in all implementations of the computing system 100. For example, any number of add-in cards or peripherals may be supported, or some components may be eliminated. Furthermore, some architectures may use different terminology for components similar to those illustrated in FIG. 1. For example, the memory hub 105 may be referred to as a Northbridge in some architectures, while the I/O hub 107 may be referred to as a Southbridge.

Figure 2A:
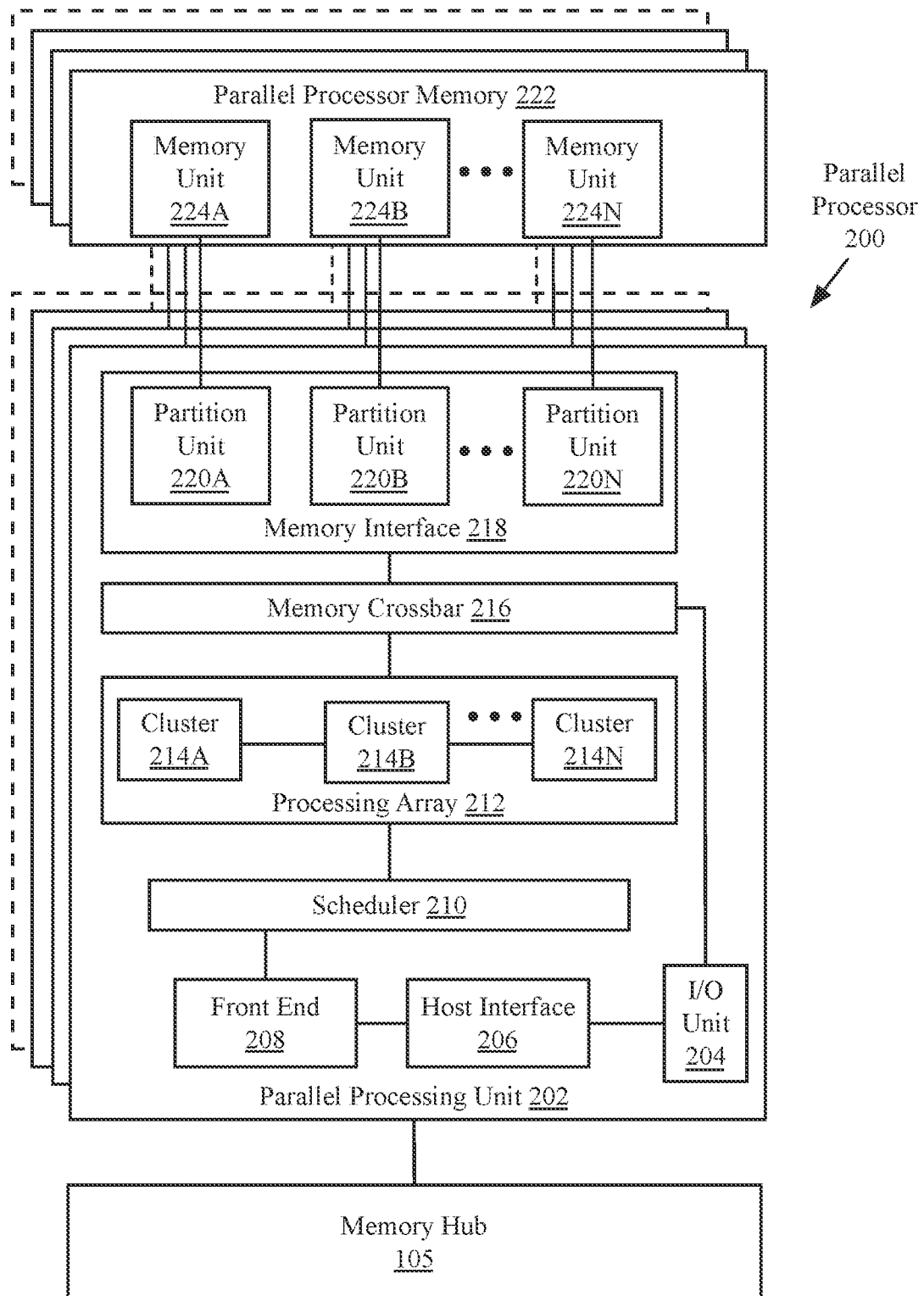
FIG. 2A-2D illustrate parallel processor components, according to an embodiment.

FIG. 2A illustrates a parallel processor 200, according to an embodiment. The various components of the parallel processor 200 may be implemented using one or more integrated circuit devices, such as programmable processors, application specific integrated circuits (ASICs), or field programmable gate arrays (FPGA). The illustrated parallel processor 200 is a variant of the one or more parallel processor(s) 112 shown in FIG. 1, according to an embodiment.

In one embodiment the parallel processor 200 includes a parallel processing unit 202. The parallel processing unit includes an I/O unit 204 that enables communication with other devices, including other instances of the parallel processing unit 202. The I/O unit 204 may be directly connected to other devices. In one embodiment the I/O unit 204 connects with other devices via the use of a hub or switch interface, such as memory hub 105. The connections between the memory hub 105 and the I/O unit 204 form a communication link 113. Within the parallel processing unit 202, the I/O unit 204 connects with a host interface 206 and a memory crossbar 216, where the host interface 206 receives commands directed to performing processing operations and the memory crossbar 216 receives commands directed to performing memory operations.

When the host interface 206 receives a command buffer via the I/O unit 204, the host interface 206 can direct work operations to perform those commands to a front end 208. In one embodiment the front end 208 couples with a scheduler 210, which is configured to distribute commands or other work items to a processing cluster array 212. In one embodiment the scheduler 210 ensures that the processing cluster array 212 is properly configured and in a valid state before tasks are distributed to the processing clusters of the processing cluster array 212. In one embodiment the scheduler 210 is implemented via firmware logic executing on a microcontroller. The microcontroller implemented scheduler 210 is configurable to perform complex scheduling and work distribution operations at coarse and fine granularity, enabling rapid preemption and context switching of threads executing on the processing array 212. In one embodiment, the host software can prove workloads for scheduling on the processing array 212 via one of multiple graphics processing doorbells. The workloads can then be automatically distributed across the processing array 212 by the scheduler 210 logic within the scheduler microcontroller.

The processing cluster array 212 can include up to "N" processing clusters (e.g., cluster 214A, cluster 214B, through cluster 214N). Each cluster 214A-214N of the processing cluster array 212 can execute a large number of concurrent threads. The scheduler 210 can allocate work to the clusters 214A-214N of the processing cluster array 212 using various scheduling and/or work distribution algorithms, which may vary depending on the workload arising for each type of program or computation. The scheduling can be handled dynamically by the scheduler 210, or can be assisted in part by compiler logic during compilation of program logic configured for execution by the processing cluster array 212. In one embodiment, different clusters 214A-214N of the processing cluster array 212 can be allocated for processing different types of programs or for performing different types of computations.

The processing cluster array 212 can be configured to perform various types of parallel processing operations. In one embodiment the processing cluster array 212 is configured to perform general-purpose parallel compute operations. For example, the processing cluster array 212 can include logic to execute processing tasks including filtering of video and/or audio data, performing modeling operations, including physics operations, and performing data transformations.

In one embodiment the processing cluster array 212 is configured to perform parallel graphics processing operations. In embodiments in which the parallel processor 200 is configured to perform graphics processing operations, the processing cluster array 212 can include additional logic to support the execution of such graphics processing operations, including, but not limited to texture sampling logic to perform texture operations, as well as tessellation logic and other vertex processing logic. Additionally, the processing cluster array 212 can be configured to execute graphics processing related shader programs such as, but not limited to vertex shaders, tessellation shaders, geometry shaders, and pixel shaders. The parallel processing unit 202 can transfer data from system memory via the I/O unit 204 for processing. During processing the transferred data can be stored to on-chip memory (e.g., parallel processor memory 222) during processing, then written back to system memory.

In one embodiment, when the parallel processing unit 202 is used to perform graphics processing, the scheduler 210 can be configured to divide the processing workload into approximately equal sized tasks, to better enable distribution of the graphics processing operations to multiple clusters 214A-214N of the processing cluster array 212. In some embodiments, portions of the processing cluster array 212 can be configured to perform different types of processing. For example a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 214A-214N may be stored in buffers to allow the intermediate data to be transmitted between clusters 214A-214N for further processing.

During operation, the processing cluster array 212 can receive processing tasks to be executed via the scheduler 210, which receives commands defining processing tasks from front end 208. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 210 may be configured to fetch the indices corresponding to the tasks or may receive the indices from the front end 208. The front end 208 can be configured to ensure the processing cluster array 212 is configured to a valid state before the workload specified by incoming command buffers (e.g., batch-buffers, push buffers, etc.) is initiated.

Each of the one or more instances of the parallel processing unit 202 can couple with parallel processor memory 222. The parallel processor memory 222 can be accessed via the memory crossbar 216, which can receive memory requests from the processing cluster array 212 as well as the I/O unit 204. The memory crossbar 216 can access the parallel processor memory 222 via a memory interface 218. The memory interface 218 can include multiple partition units (e.g., partition unit 220A, partition unit 220B, through partition unit 220N) that can each couple to a portion (e.g., memory unit) of parallel processor memory 222. In one implementation the number of partition units 220A-220N is configured to be equal to the number of memory units, such that a first partition unit 220A has a corresponding first memory unit 224A, a second partition unit 220B has a corresponding memory unit 224B, and an Nth partition unit 220N has a corresponding Nth memory unit 224N. In other embodiments, the number of partition units 220A-220N may not be equal to the number of memory devices.

In various embodiments, the memory units 224A-224N can include various types of memory devices, including dynamic random access memory (DRAM) or graphics random access memory, such as synchronous graphics random access memory (SGRAM), including graphics double data rate (GDDR) memory. In one embodiment, the memory units 224A-224N may also include 3D stacked memory, including but not limited to high bandwidth memory (HBM). Persons skilled in the art will appreciate that the specific implementation of the memory units 224A-224N can vary, and can be selected from one of various conventional designs. Render targets, such as frame buffers or texture maps may be stored across the memory units 224A-224N, allowing partition units 220A-220N to write portions of each render target in parallel to efficiently use the available bandwidth of parallel processor memory 222. In some embodiments, a local instance of the parallel processor memory 222 may be excluded in favor of a unified memory design that utilizes system memory in conjunction with local cache memory.

In one embodiment, any one of the clusters 214A-214N of the processing cluster array 212 can process data that will be written to any of the memory units 224A-224N within parallel processor memory 222. The memory crossbar 216 can be configured to transfer the output of each cluster 214A-214N to any partition unit 220A-220N or to another cluster 214A-214N, which can perform additional processing operations on the output. Each cluster 214A-214N can communicate with the memory interface 218 through the memory crossbar 216 to read from or write to various external memory devices. In one embodiment the memory crossbar 216 has a connection to the memory interface 218 to communicate with the I/O unit 204, as well as a connection to a local instance of the parallel processor memory 222, enabling the processing units within the different processing clusters 214A-214N to communicate with system memory or other memory that is not local to the parallel processing unit 202. In one embodiment the memory crossbar 216 can use virtual channels to separate traffic streams between the clusters 214A-214N and the partition units 220A-220N.

While a single instance of the parallel processing unit 202 is illustrated within the parallel processor 200, any number of instances of the parallel processing unit 202 can be included. For example, multiple instances of the parallel processing unit 202 can be provided on a single add-in card, or multiple add-in cards can be interconnected. The different instances of the parallel processing unit 202 can be configured to inter-operate even if the different instances have different numbers of processing cores, different amounts of local parallel processor memory, and/or other configuration differences. For example, in one embodiment some instances of the parallel processing unit 202 can include higher precision floating point units relative to other instances. Systems incorporating one or more instances of the parallel processing unit 202 or the parallel processor 200 can be implemented in a variety of configurations and form factors, including but not limited to desktop, laptop, or handheld personal computers, servers, workstations, game consoles, and/or embedded systems.

Figure 2B:
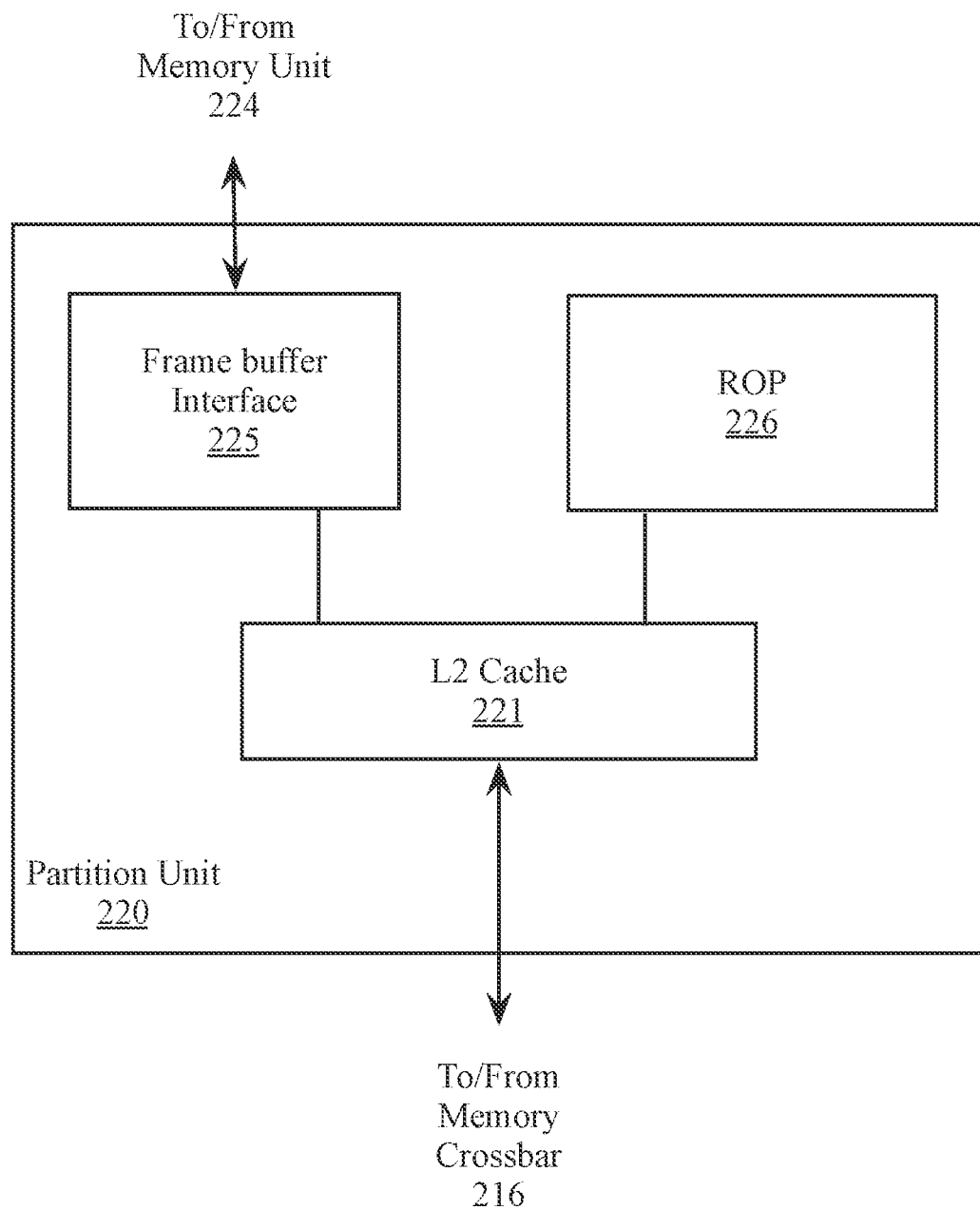

FIG. 2B is a block diagram of a partition unit 220, according to an embodiment. In one embodiment the partition unit 220 is an instance of one of the partition units 220A-220N of FIG. 2A. As illustrated, the partition unit 220 includes an L2 cache 221, a frame buffer interface 225, and a ROP 226 (raster operations unit). The L2 cache 221 is a read/write cache that is configured to perform load and store operations received from the memory crossbar 216 and ROP 226. Read misses and urgent write-back requests are output by L2 cache 221 to frame buffer interface 225 for processing. Updates can also be sent to the frame buffer via the frame buffer interface 225 for processing. In one embodiment the frame buffer interface 225 interfaces with one of the memory units in parallel processor memory, such as the memory units 224A-224N of FIG. 2A (e.g., within parallel processor memory 222).

In graphics applications, the ROP 226 is a processing unit that performs raster operations such as stencil, z test, blending, and the like. The ROP 226 then outputs processed graphics data that is stored in graphics memory. In some embodiments the ROP 226 includes compression logic to compress depth or color data that is written to memory and decompress depth or color data that is read from memory. The compression logic can be lossless compression logic that makes use of one or more of multiple compression algorithms. The type of compression that is performed by the ROP 226 can vary based on the statistical characteristics of the data to be compressed. For example, in one embodiment, delta color compression is performed on depth and color data on a per-tile basis.

In some embodiments, the ROP 226 is included within each processing cluster (e.g., cluster 214A-214N of FIG. 2A) instead of within the partition unit 220. In such embodiment, read and write requests for pixel data are transmitted over the memory crossbar 216 instead of pixel fragment data. The processed graphics data may be displayed on a display device, such as one of the one or more display device(s) 110 of FIG. 1, routed for further processing by the processor(s) 102, or routed for further processing by one of the processing entities within the parallel processor 200 of FIG. 2A.

Figure 2C:
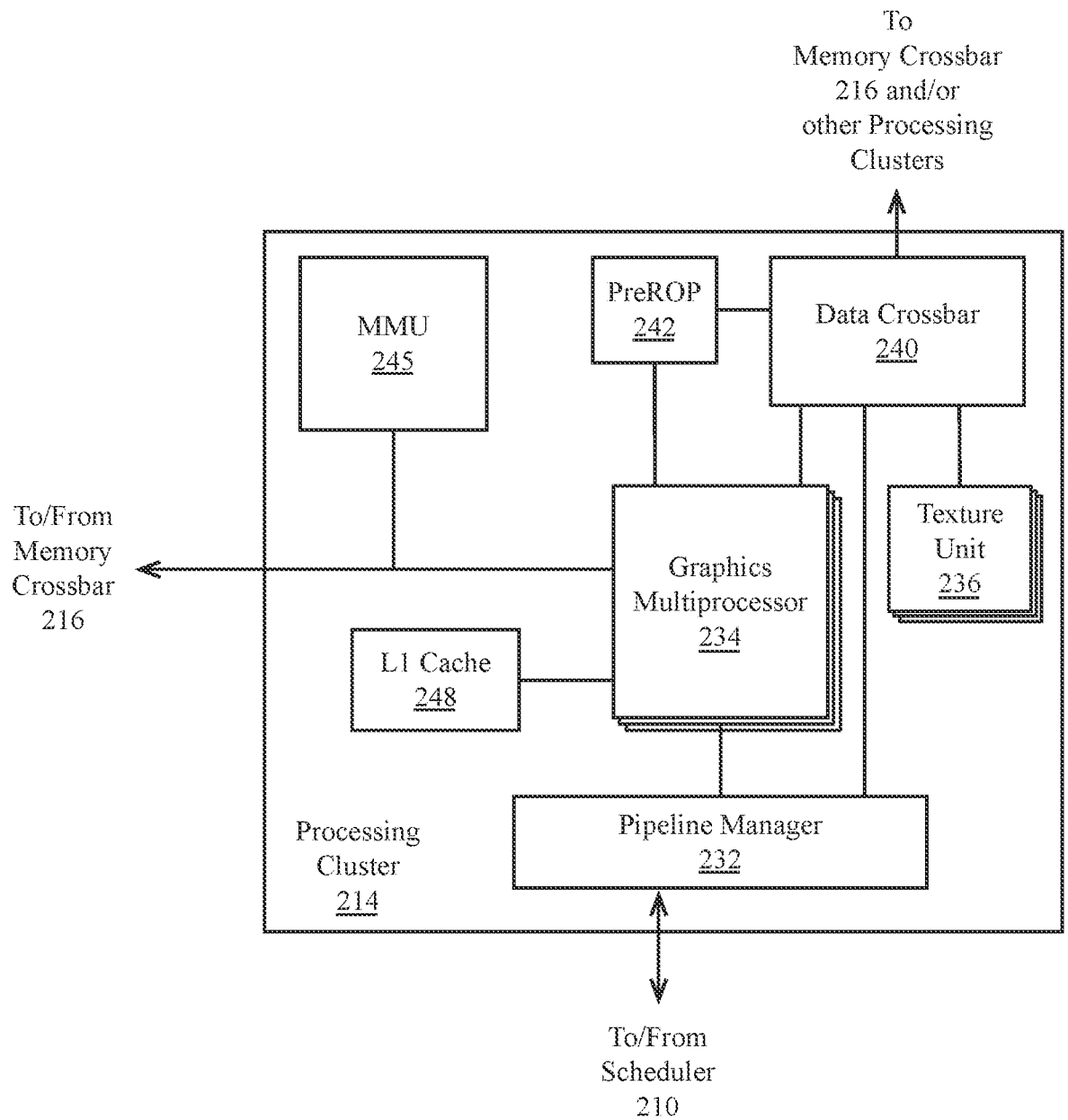

FIG. 2C is a block diagram of a processing cluster 214 within a parallel processing unit, according to an embodiment. In one embodiment the processing cluster is an instance of one of the processing clusters 214A-214N of FIG. 2A. The processing cluster 214 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 214 can be controlled via a pipeline manager 232 that distributes processing tasks to SIMT parallel processors. The pipeline manager 232 receives instructions from the scheduler 210 of FIG. 2A and manages execution of those instructions via a graphics multiprocessor 234 and/or a texture unit 236. The illustrated graphics multiprocessor 234 is an exemplary instance of a SIMT parallel processor. However, various types of SIMT parallel processors of differing architectures may be included within the processing cluster 214. One or more instances of the graphics multiprocessor 234 can be included within a processing cluster 214. The graphics multiprocessor 234 can process data and a data crossbar 240 can be used to distribute the processed data to one of multiple possible destinations, including other shader units. The pipeline manager 232 can facilitate the distribution of processed data by specifying destinations for processed data to be distributed via the data crossbar 240.

Each graphics multiprocessor 234 within the processing cluster 214 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating point arithmetic, comparison operations, Boolean operations, bit-shifting, and computation of various algebraic functions. In one embodiment the same functional-unit hardware can be leveraged to perform different operations and any combination of functional units may be present.

The instructions transmitted to the processing cluster 214 constitutes a thread. A set of threads executing across the set of parallel processing engines is a thread group. A thread group executes the same program on different input data. Each thread within a thread group can be assigned to a different processing engine within a graphics multiprocessor 234. A thread group may include fewer threads than the number of processing engines within the graphics multiprocessor 234. When a thread group includes fewer threads than the number of processing engines, one or more of the processing engines may be idle during cycles in which that thread group is being processed. A thread group may also include more threads than the number of processing engines within the graphics multiprocessor 234. When the thread group includes more threads than the number of processing engines within the graphics multiprocessor 234, processing can be performed over consecutive clock cycles. In one embodiment multiple thread groups can be executed concurrently on a graphics multiprocessor 234.

In one embodiment the graphics multiprocessor 234 includes an internal cache memory to perform load and store operations. In one embodiment, the graphics multiprocessor 234 can forego an internal cache and use a cache memory (e.g., L1 cache 248) within the processing cluster 214. Each graphics multiprocessor 234 also has access to L2 caches within the partition units (e.g., partition units 220A-220N of FIG. 2A) that are shared among all processing clusters 214 and may be used to transfer data between threads. The graphics multiprocessor 234 may also access off-chip global memory, which can include one or more of local parallel processor memory and/or system memory. Any memory external to the parallel processing unit 202 may be used as global memory. Embodiments in which the processing cluster 214 includes multiple instances of the graphics multiprocessor 234 can share common instructions and data, which may be stored in the L1 cache 248.

Each processing cluster 214 may include an MMU 245 (memory management unit) that is configured to map virtual addresses into physical addresses. In other embodiments, one or more instances of the MMU 245 may reside within the memory interface 218 of FIG. 2A. The MMU 245 includes a set of page table entries (PTEs) used to map a virtual address to a physical address of a tile and optionally a cache line index. The MMU 245 may include address translation lookaside buffers (TLB) or caches that may reside within the graphics multiprocessor 234 or the L1 cache or processing cluster 214. The physical address is processed to distribute surface data access locality to allow efficient request interleaving among partition units. The cache line index may be used to determine whether a request for a cache line is a hit or miss.

In graphics and computing applications, a processing cluster 214 may be configured such that each graphics multiprocessor 234 is coupled to a texture unit 236 for performing texture mapping operations, e.g., determining texture sample positions, reading texture data, and filtering the texture data. Texture data is read from an internal texture L1 cache (not shown) or in some embodiments from the L1 cache within graphics multiprocessor 234 and is fetched from an L2 cache, local parallel processor memory, or system memory, as needed. Each graphics multiprocessor 234 outputs processed tasks to the data crossbar 240 to provide the processed task to another processing cluster 214 for further processing or to store the processed task in an L2 cache, local parallel processor memory, or system memory via the memory crossbar 216. A preROP 242 (pre-raster operations unit) is configured to receive data from graphics multiprocessor 234, direct data to ROP units, which may be located with partition units as described herein (e.g., partition units 220A-220N of FIG. 2A). The preROP 242 unit can perform optimizations for color blending, organize pixel color data, and perform address translations.

It will be appreciated that the core architecture described herein is illustrative and that variations and modifications are possible. Any number of processing units, e.g., graphics multiprocessor 234, texture units 236, preROPs 242, etc., may be included within a processing cluster 214. Further, while only one processing cluster 214 is shown, a parallel processing unit as described herein may include any number of instances of the processing cluster 214. In one embodiment, each processing cluster 214 can be configured to operate independently of other processing clusters 214 using separate and distinct processing units, L1 caches, etc.

Figure 2D:
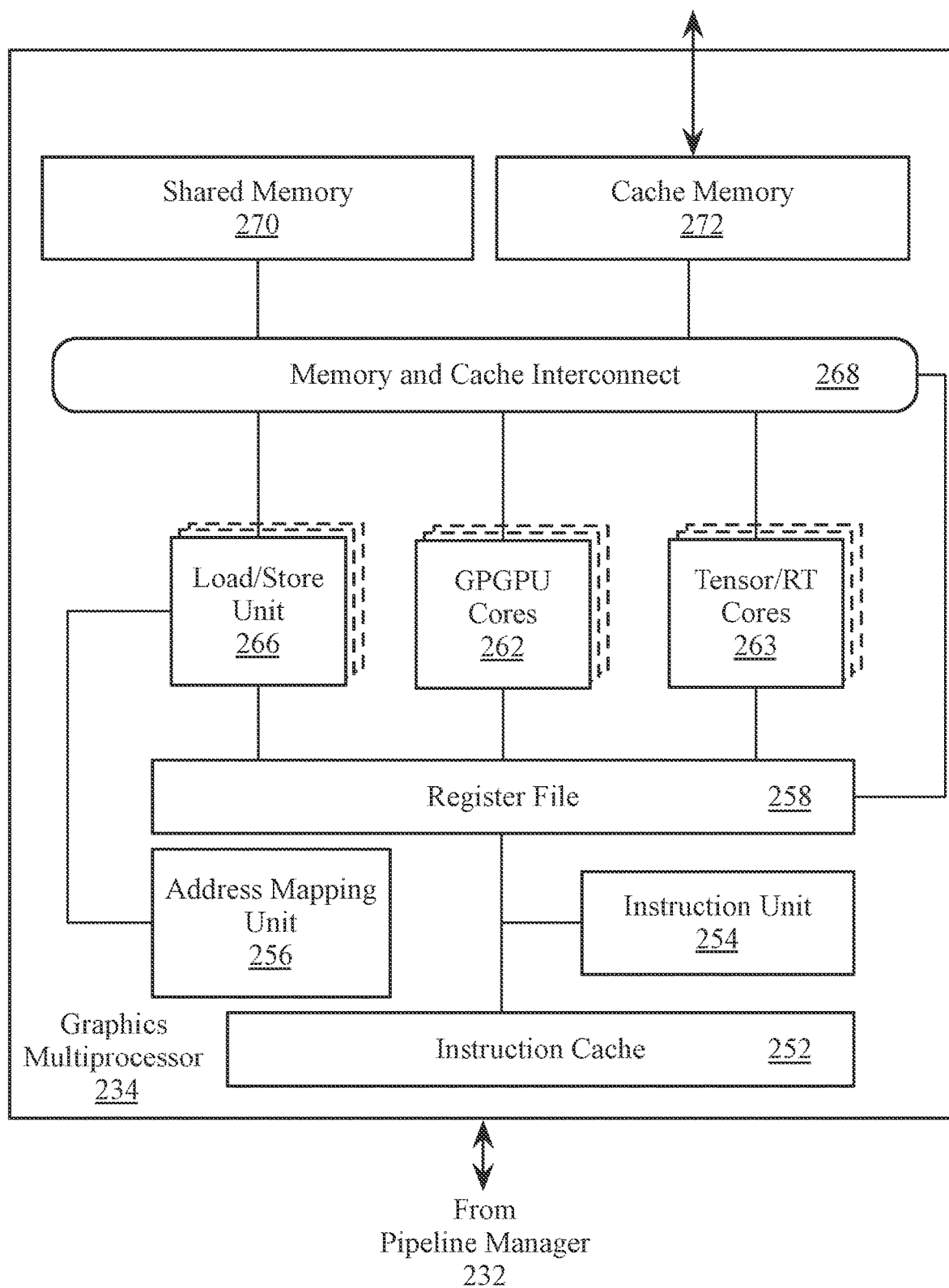

FIG. 2D shows a graphics multiprocessor 234, according to one embodiment. In such embodiment the graphics multiprocessor 234 couples with the pipeline manager 232 of the processing cluster 214. The graphics multiprocessor 234 has an execution pipeline including but not limited to an instruction cache 252, an instruction unit 254, an address mapping unit 256, a register file 258, one or more general purpose graphics processing unit (GPGPU) cores 262, and one or more load/store units 266. The GPGPU cores 262 and load/store units 266 are coupled with cache memory 272 and shared memory 270 via a memory and cache interconnect 268. In one embodiment the graphics multiprocessor 234 additionally includes tensor and/or ray-tracing cores 263 that include hardware logic to accelerate matrix and/or ray-tracing operations.

In one embodiment, the instruction cache 252 receives a stream of instructions to execute from the pipeline manager 232. The instructions are cached in the instruction cache 252 and dispatched for execution by the instruction unit 254. The instruction unit 254 can dispatch instructions as thread groups (e.g., warps), with each thread of the thread group assigned to a different execution unit within GPGPU core 262. An instruction can access any of a local, shared, or global address space by specifying an address within a unified address space. The address mapping unit 256 can be used to translate addresses in the unified address space into a distinct memory address that can be accessed by the load/store units 266.

The register file 258 provides a set of registers for the functional units of the graphics multiprocessor 234. The register file 258 provides temporary storage for operands connected to the data paths of the functional units (e.g., GPGPU cores 262, load/store units 266) of the graphics multiprocessor 234. In one embodiment, the register file 258 is divided between each of the functional units such that each functional unit is allocated a dedicated portion of the register file 258. In one embodiment, the register file 258 is divided between the different warps being executed by the graphics multiprocessor 234.

The GPGPU cores 262 can each include floating point units (FPUs) and/or integer arithmetic logic units (ALUs) that are used to execute instructions of the graphics multiprocessor 234. The GPGPU cores 262 can be similar in architecture or can differ in architecture, according to embodiments. For example and in one embodiment, a first portion of the GPGPU cores 262 include a single precision FPU and an integer ALU while a second portion of the GPGPU cores include a double precision FPU. In one embodiment the FPUs can implement the IEEE 754-2008 standard for floating point arithmetic or enable variable precision floating point arithmetic. The graphics multiprocessor 234 can additionally include one or more fixed function or special function units to perform specific functions such as copy rectangle or pixel blending operations. In one embodiment one or more of the GPGPU cores can also include fixed or special function logic.

In one embodiment the GPGPU cores 262 include SIMD logic capable of performing a single instruction on multiple sets of data. In one embodiment GPGPU cores 262 can physically execute SIMD4, SIMD8, and SIMD16 instructions and logically execute SIMD1, SIMD2, and SIMD32 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can be executed via a single SIMD instruction. For example and in one embodiment, eight SIMT threads that perform the same or similar operations can be executed in parallel via a single SIMD8 logic unit.

The memory and cache interconnect 268 is an interconnect network that connects each of the functional units of the graphics multiprocessor 234 to the register file 258 and to the shared memory 270. In one embodiment, the memory and cache interconnect 268 is a crossbar interconnect that allows the load/store unit 266 to implement load and store operations between the shared memory 270 and the register file 258. The register file 258 can operate at the same frequency as the GPGPU cores 262, thus data transfer between the GPGPU cores 262 and the register file 258 is very low latency. The shared memory 270 can be used to enable communication between threads that execute on the functional units within the graphics multiprocessor 234. The cache memory 272 can be used as a data cache for example, to cache texture data communicated between the functional units and the texture unit 236. The shared memory 270 can also be used as a program managed cached. Threads executing on the GPGPU cores 262 can programmatically store data within the shared memory in addition to the automatically cached data that is stored within the cache memory 272.

Figure 3A:
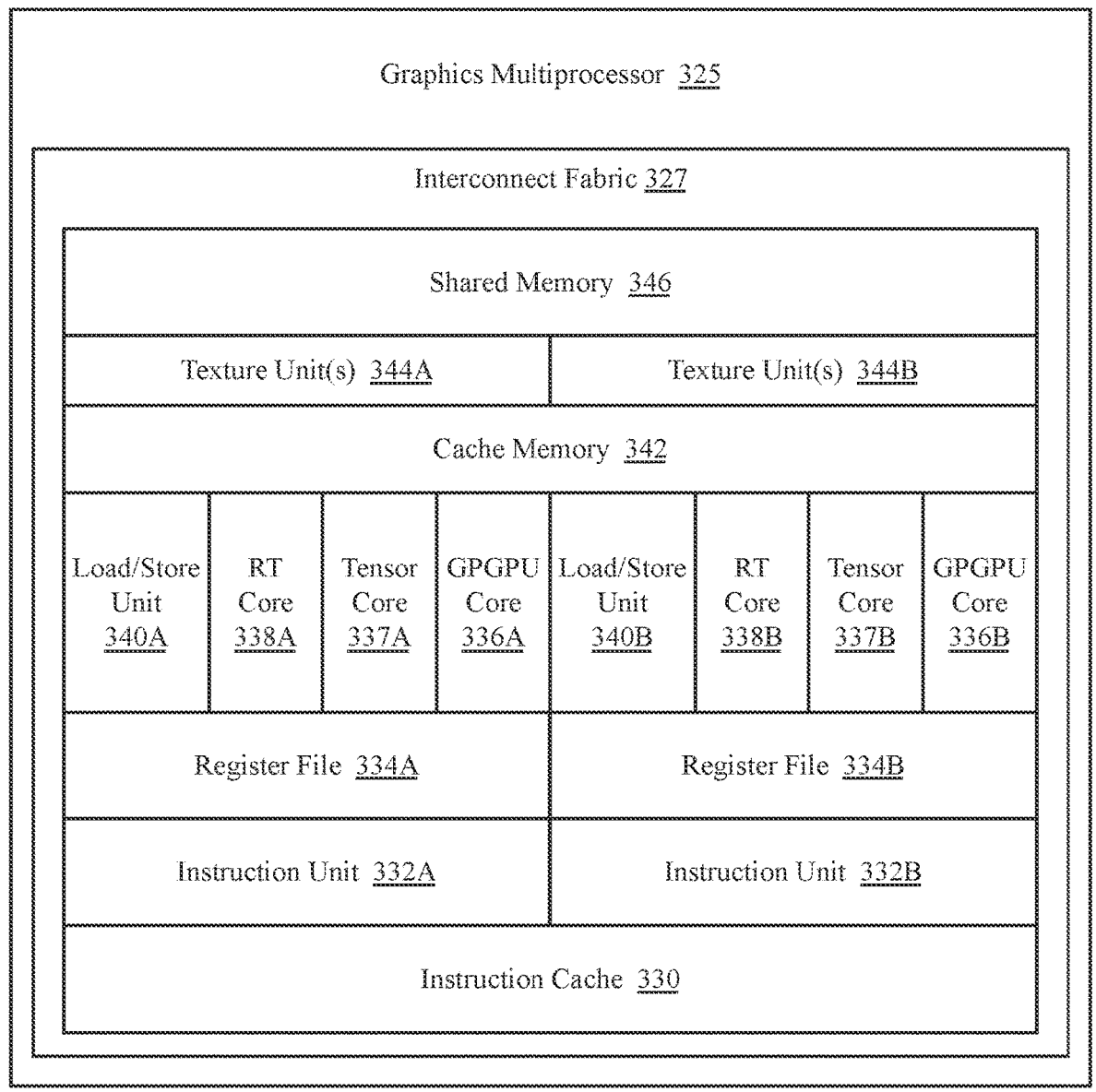
FIG. 3A-3C are block diagrams of graphics multiprocessors and multiprocessor-based GPUs, according to embodiments.
Figure 3B:
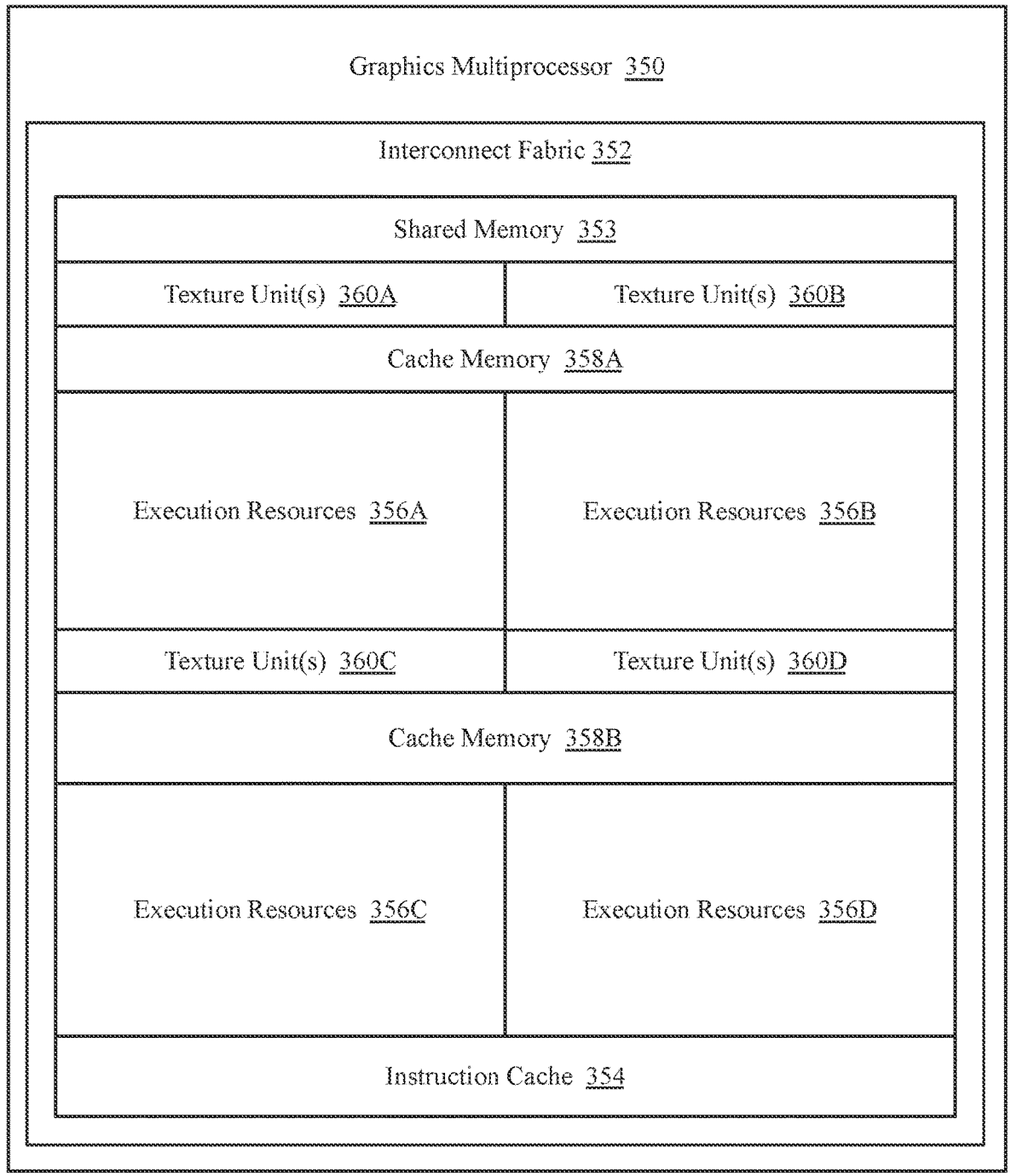
Figure 3C:
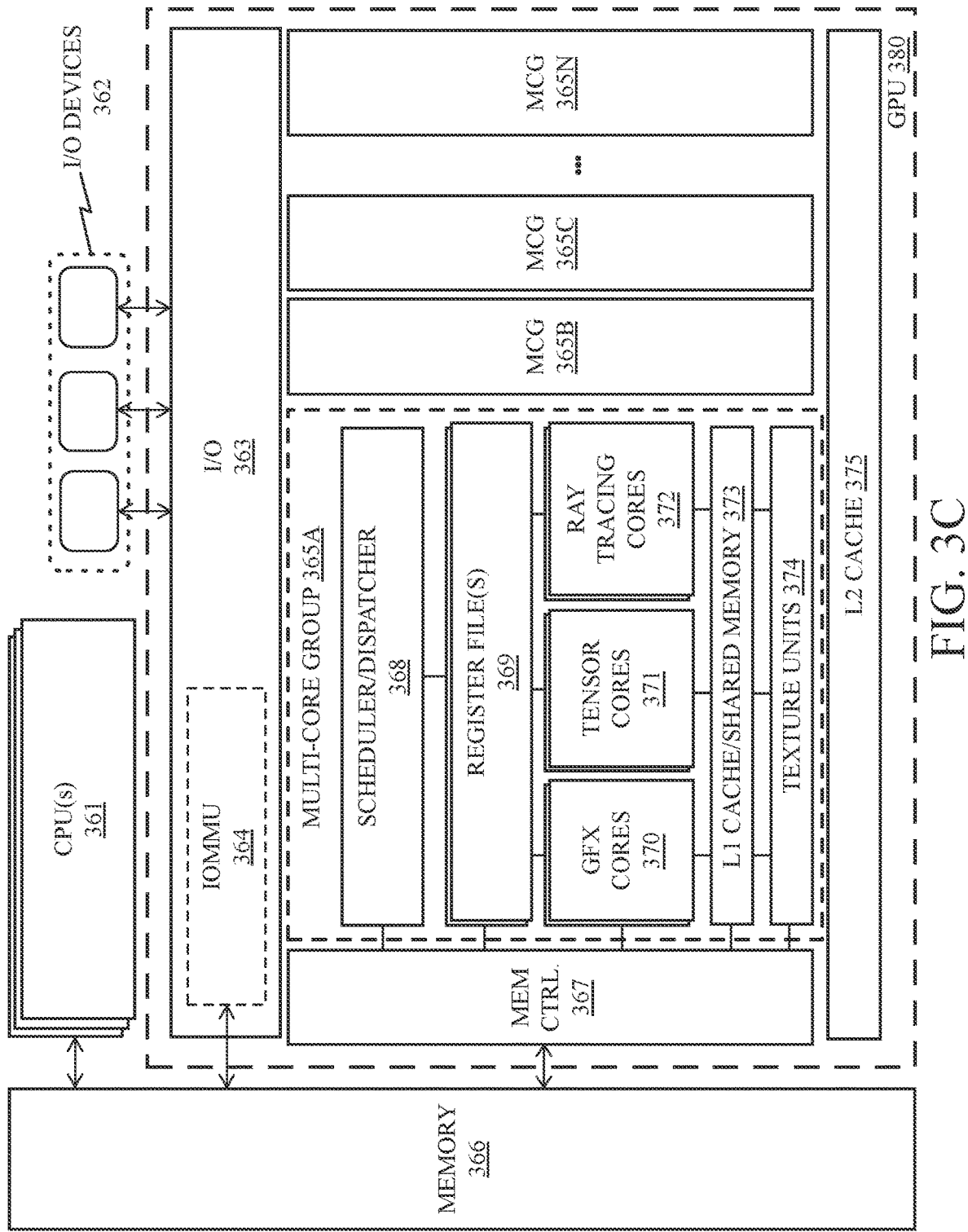

FIG. 3A-3C illustrate additional graphics multiprocessors, according to embodiments. FIG. 3A-3B illustrate graphics multiprocessors 325, 350, which are variants of the graphics multiprocessor 234 of FIG. 2C. FIG. 3C illustrates a graphics processing unit (GPU) 380 which includes dedicated sets of graphics processing resources arranged into multi-core groups 365A-365N. The illustrated graphics multiprocessors 325, 350 and the multi-core groups 365A-365N can be streaming multiprocessor (SM) capable of simultaneous execution of a large number of execution threads.

FIG. 3A shows a graphics multiprocessor 325 according to an additional embodiment. The graphics multiprocessor 325 includes multiple additional instances of execution resource units relative to the graphics multiprocessor 234 of FIG. 2D. For example, the graphics multiprocessor 325 can include multiple instances of the instruction unit 332A-332B, register file 334A-334B, and texture unit(s) 344A-344B. The graphics multiprocessor 325 also includes multiple sets of graphics or compute execution units (e.g., GPGPU core 336A-336B, tensor core 337A-337B, ray-tracing core 338A-338B) and multiple sets of load/store units 340A-340B. In one embodiment the execution resource units have a common instruction cache 330, texture and/or data cache memory 342, and shared memory 346.

The various components can communicate via an interconnect fabric 327. In one embodiment the interconnect fabric 327 includes one or more crossbar switches to enable communication between the various components of the graphics multiprocessor 325. In one embodiment the interconnect fabric 327 is a separate, high-speed network fabric layer upon which each component of the graphics multiprocessor 325 is stacked. The components of the graphics multiprocessor 325 communicate with remote components via the interconnect fabric 327. For example, the GPGPU cores 336A-336B, 337A-337B, and 3378A-338B can each communicate with shared memory 346 via the interconnect fabric 327. The interconnect fabric 327 can arbitrate communication within the graphics multiprocessor 325 to ensure a fair bandwidth allocation between components.

FIG. 3B shows a graphics multiprocessor 350 according to an additional embodiment. The graphics processor includes multiple sets of execution resources 356A-356D, where each set of execution resource includes multiple instruction units, register files, GPGPU cores, and load store units, as illustrated in FIG. 2D and FIG. 3A. The execution resources 356A-356D can work in concert with texture unit(s) 360A-360D for texture operations, while sharing an instruction cache 354, and shared memory 353. In one embodiment the execution resources 356A-356D can share an instruction cache 354 and shared memory 353, as well as multiple instances of a texture and/or data cache memory 358A-358B. The various components can communicate via an interconnect fabric 352 similar to the interconnect fabric 327 of FIG. 3A.

Persons skilled in the art will understand that the architecture described in FIGS. 1, 2A-2D, and 3A-3B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 202 of FIG. 2A, as well as one or more graphics processors or special purpose processing units, without departure from the scope of the embodiments described herein.

In some embodiments a parallel processor or GPGPU as described herein is communicatively coupled to host/processor cores to accelerate graphics operations, machine-learning operations, pattern analysis operations, and various general purpose GPU (GPGPU) functions. The GPU may be communicatively coupled to the host processor/cores over a bus or other interconnect (e.g., a high speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

FIG. 3C illustrates a graphics processing unit (GPU) 380 which includes dedicated sets of graphics processing resources arranged into multi-core groups 365A-N. While the details of only a single multi-core group 365A are provided, it will be appreciated that the other multi-core groups 365B-365N may be equipped with the same or similar sets of graphics processing resources.

As illustrated, a multi-core group 365A may include a set of graphics cores 370, a set of tensor cores 371, and a set of ray tracing cores 372. A scheduler/dispatcher 368 schedules and dispatches the graphics threads for execution on the various cores 370, 371, 372. A set of register files 369 store operand values used by the cores 370, 371, 372 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 373 store graphics data such as texture data, vertex data, pixel data, ray data, bounding volume data, etc., locally within each multi-core group 365A. One or more texture units 374 can also be used to perform texturing operations, such as texture mapping and sampling. A Level 2 (L2) cache 375 shared by all or a subset of the multi-core groups 365A-365N stores graphics data and/or instructions for multiple concurrent graphics threads. As illustrated, the L2 cache 375 may be shared across a plurality of multi-core groups 365A-365N. One or more memory controllers 367 couple the GPU 380 to a memory 366 which may be a system memory (e.g., DRAM) and/or a dedicated graphics memory (e.g., GDDR6 memory).

Input/output (I/O) circuitry 363 couples the GPU 380 to one or more I/O devices 362 such as digital signal processors (DSPs), network controllers, or user input devices. An on-chip interconnect may be used to couple the I/O devices 362 to the GPU 380 and memory 366. One or more I/O memory management units (IOMMUs) 364 of the I/O circuitry 3195 couple the I/O devices 362 directly to the system memory 366. In one embodiment, the IOMMU 364 manages multiple sets of page tables to map virtual addresses to physical addresses in system memory 366. In this embodiment, the I/O devices 362, CPU(s) 361, and GPU(s) 380 may share the same virtual address space.

In one implementation, the IOMMU 364 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 366). The base addresses of each of the first and second sets of page tables may be stored in control registers and swapped out on a context switch (e.g., so that the new context is provided with access to the relevant set of page tables). While not illustrated in FIG. 3C, each of the cores 370, 371, 372 and/or multi-core groups 365A-365N may include translation lookaside buffers (TLBs) to cache guest virtual to guest physical translations, guest physical to host physical translations, and guest virtual to host physical translations.

In one embodiment, the CPUs 361, GPUs 380, and I/O devices 362 are integrated on a single semiconductor chip and/or chip package. The illustrated memory 366 may be integrated on the same chip or may be coupled to the memory controllers 367 via an off-chip interface. In one implementation, the memory 366 comprises GDDR6 memory which shares the same virtual address space as other physical system-level memories, although the underlying principles of the invention are not limited to this specific implementation.

In one embodiment, the tensor cores 371 include a plurality of execution units specifically designed to perform matrix operations, which are the fundamental compute operation used to perform deep learning operations. For example, simultaneous matrix multiplication operations may be used for neural network training and inferencing. The tensor cores 371 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 371. The training of neural networks, in particular, requires a significant number matrix dot product operations. In order to process an inner-product formulation of an N×N×N matrix multiply, the tensor cores 371 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 371 to ensure that the most efficient precision is used for different workloads (e.g., such as inferencing workloads which can tolerate quantization to bytes and half-bytes).

In one embodiment, the ray tracing cores 372 accelerate ray tracing operations for both real-time ray tracing and non-real-time ray tracing implementations. In particular, the ray tracing cores 372 include ray traversal/intersection circuitry for performing ray traversal using bounding volume hierarchies (BVHs) and identifying intersections between rays and primitives enclosed within the BVH volumes. The ray tracing cores 372 may also include circuitry for performing depth testing and culling (e.g., using a Z buffer or similar arrangement). In one implementation, the ray tracing cores 372 perform traversal and intersection operations in concert with the image denoising techniques described herein, at least a portion of which may be executed on the tensor cores 371. For example, in one embodiment, the tensor cores 371 implement a deep learning neural network to perform denoising of frames generated by the ray tracing cores 372. However, the CPU(s) 361, graphics cores 370, and/or ray tracing cores 372 may also implement all or a portion of the denoising and/or deep learning algorithms.

In addition, as described above, a distributed approach to denoising may be employed in which the GPU 380 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 372 process all BVH traversal and ray-primitive intersections, saving the graphics cores 370 from being overloaded with thousands of instructions per ray. In one embodiment, each ray tracing core 372 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 365A can simply launch a ray probe, and the ray tracing cores 372 independently perform ray traversal and intersection and return hit data (e.g., a hit, no hit, multiple hits, etc.) to the thread context. The other cores 370, 371 are freed to perform other graphics or compute work while the ray tracing cores 372 perform the traversal and intersection operations.

In one embodiment, each ray tracing core 372 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 370 and tensor cores 371) are freed to perform other forms of graphics work.

In one particular embodiment described below, a hybrid rasterization/ray tracing approach is used in which work is distributed between the graphics cores 370 and ray tracing cores 372.

In one embodiment, the ray tracing cores 372 (and/or other cores 370, 371) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 372, graphics cores 370 and tensor cores 371 is Vulkan 1.1.85. Note, however, that the underlying principles of the invention are not limited to any particular ray tracing ISA.

In general, the various cores 372, 371, 370 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Techniques for GPU to Host Processor Interconnection

Figure 4A:
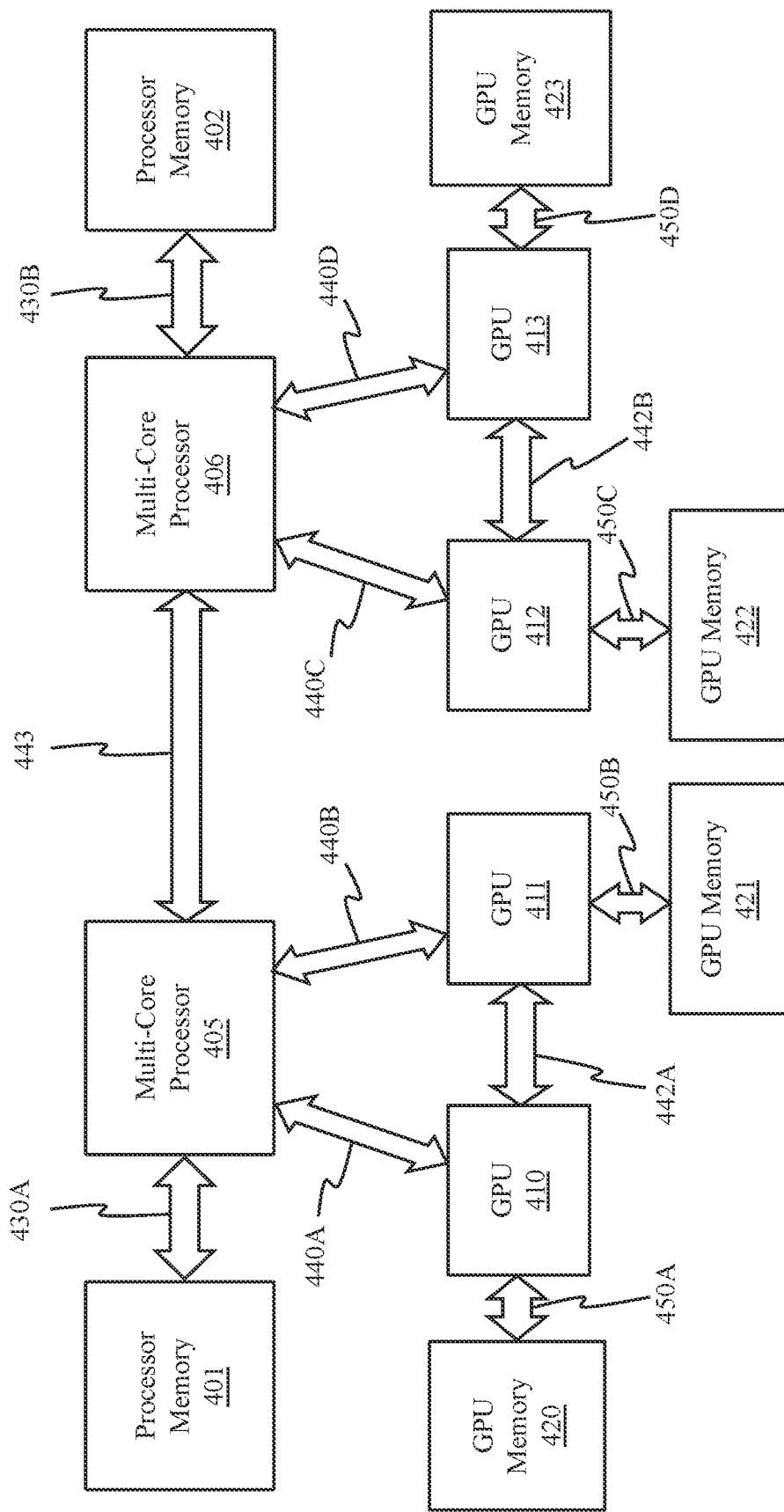
FIG. 4A-4F illustrate an exemplary architecture in which a plurality of GPUs is communicatively coupled to a plurality of multi-core processors.

FIG. 4A illustrates an exemplary architecture in which a plurality of GPUs 410-413 are communicatively coupled to a plurality of multi-core processors 405-406 over high-speed links 440A-440D (e.g., buses, point-to-point interconnects, etc.). In one embodiment, the high-speed links 440A-440D support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 410-413 are interconnected over high-speed links 442A-442B, which may be implemented using the same or different protocols/links than those used for high-speed links 440A-440D. Similarly, two or more of the multi-core processors 405-406 may be connected over high speed link 443 which may be symmetric multi-processor (SMP) buses operating at 20 GB/s, 30 GB/s, 120 GB/s or higher. Alternatively, all communication between the various system components shown in FIG. 4A may be accomplished using the same protocols/links (e.g., over a common interconnection fabric). As mentioned, however, the underlying principles of the invention are not limited to any particular type of interconnect technology.

In one embodiment, each multi-core processor 405-406 is communicatively coupled to a processor memory 401-402, via memory interconnects 430A-430B, respectively, and each GPU 410-413 is communicatively coupled to GPU memory 420-423 over GPU memory interconnects 450A-450D, respectively. The memory interconnects 430A-430B and 450A-450D may utilize the same or different memory access technologies. By way of example, and not limitation, the processor memories 401-402 and GPU memories 420-423 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of the memories may be volatile memory and another portion may be non-volatile memory (e.g., using a two-level memory (2LM) hierarchy).

As described below, although the various processors 405-406 and GPUs 410-413 may be physically coupled to a particular memory 401-402, 420-423, respectively, a unified memory architecture may be implemented in which the same virtual system address space (also referred to as the "effective address" space) is distributed among all of the various physical memories. For example, processor memories 401-402 may each comprise 64 GB of the system memory address space and GPU memories 420-423 may each comprise 32 GB of the system memory address space (resulting in a total of 256 GB addressable memory in this example).

Figure 4B:
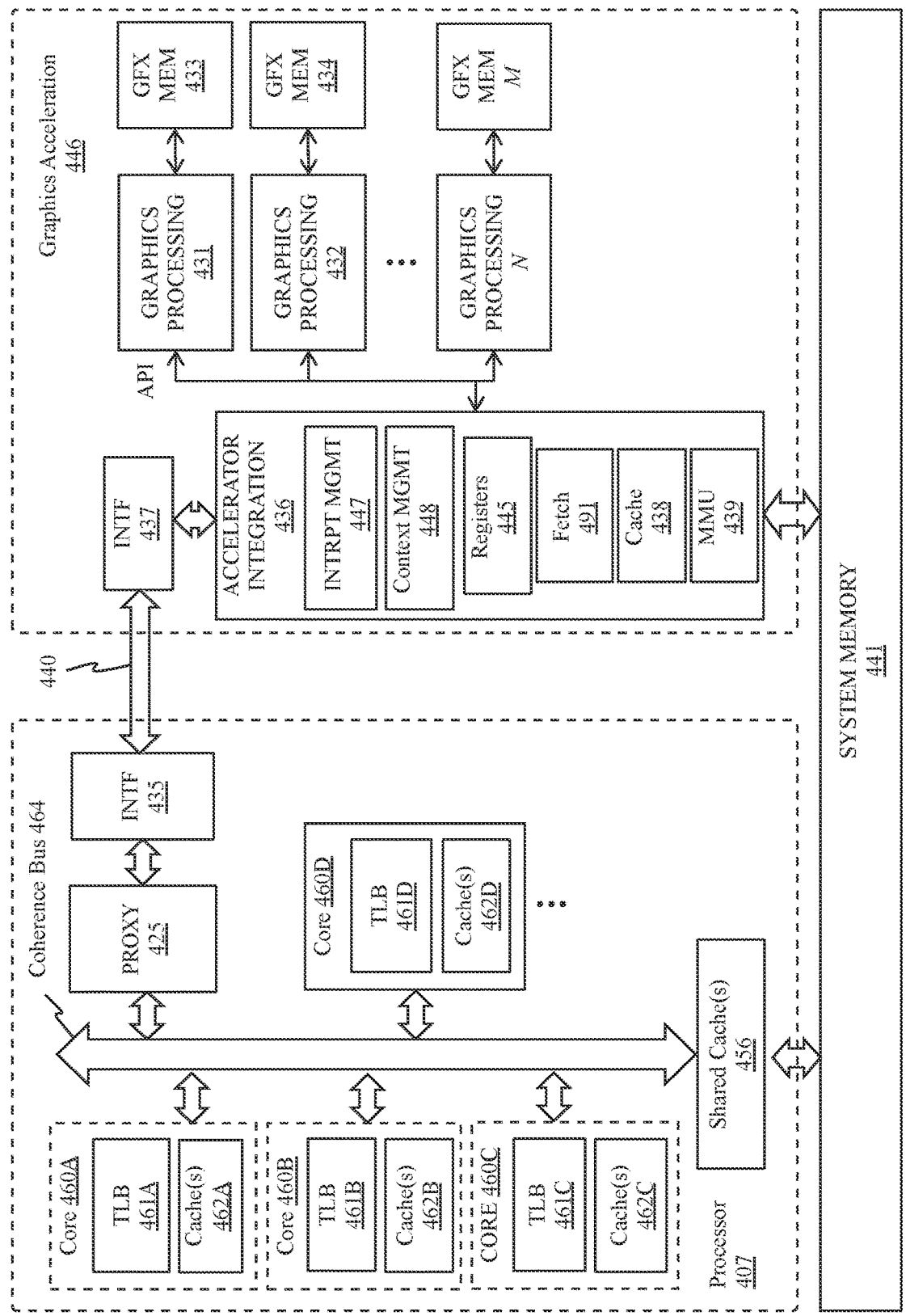

FIG. 4B illustrates additional details for an interconnection between a multi-core processor 407 and a graphics acceleration module 446 in accordance with one embodiment. The graphics acceleration module 446 may include one or more GPU chips integrated on a line card which is coupled to the processor 407 via the high-speed link 440. Alternatively, the graphics acceleration module 446 may be integrated on the same package or chip as the processor 407.

The illustrated processor 407 includes a plurality of cores 460A-460D, each with a translation lookaside buffer 461A-461D and one or more caches 462A-462D. The cores may include various other components for executing instructions and processing data which are not illustrated to avoid obscuring the underlying principles of the invention (e.g., instruction fetch units, branch prediction units, decoders, execution units, reorder buffers, etc.). The caches 462A-462D may comprise level 1 (L1) and level 2 (L2) caches. In addition, one or more shared caches 456 may be included in the caching hierarchy and shared by sets of the cores 460A-460D. For example, one embodiment of the processor 407 includes 24 cores, each with its own L1 cache, twelve shared L2 caches, and twelve shared L3 caches. In this embodiment, one of the L2 and L3 caches are shared by two adjacent cores. The processor 407 and the graphics accelerator integration module 446 connect with system memory 441, which may include processor memories 401-402.

Coherency is maintained for data and instructions stored in the various caches 462A-462D, 456 and system memory 441 via inter-core communication over a coherence bus 464. For example, each cache may have cache coherency logic/circuitry associated therewith to communicate to over the coherence bus 464 in response to detected reads or writes to particular cache lines. In one implementation, a cache snooping protocol is implemented over the coherence bus 464 to snoop cache accesses. Cache snooping/coherency techniques are well understood by those of skill in the art and will not be described in detail here to avoid obscuring the underlying principles of the invention.

In one embodiment, a proxy circuit 425 communicatively couples the graphics acceleration module 446 to the coherence bus 464, allowing the graphics acceleration module 446 to participate in the cache coherence protocol as a peer of the cores. In particular, an interface 435 provides connectivity to the proxy circuit 425 over high-speed link 440 (e.g., a PCIe bus, NVLink, etc.) and an interface 437 connects the graphics acceleration module 446 to the high-speed link 440.

In one implementation, an accelerator integration circuit 436 provides cache management, memory access, context management, and interrupt management services on behalf of a plurality of graphics processing engines 431, 432, N of the graphics acceleration module 446. The graphics processing engines 431, 432, N may each comprise a separate graphics processing unit (GPU). Alternatively, the graphics processing engines 431, 432, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 431-432, N or the graphics processing engines 431-432, N may be individual GPUs integrated on a common package, line card, or chip.

In one embodiment, the accelerator integration circuit 436 includes a memory management unit (MMU) 439 for performing various memory management functions such as virtual-to-physical memory translations (also referred to as effective-to-real memory translations) and memory access protocols for accessing system memory 441. The MMU 439 may also include a translation lookaside buffer (TLB) (not shown) for caching the virtual/effective to physical/real address translations. In one implementation, a cache 438 stores commands and data for efficient access by the graphics processing engines 431-432, N. In one embodiment, the data stored in cache 438 and graphics memories 433-434, M is kept coherent with the core caches 462A-462D, 456 and system memory 441. As mentioned, this may be accomplished via proxy circuit 425 which takes part in the cache coherency mechanism on behalf of cache 438 and memories 433-434, M (e.g., sending updates to the cache 438 related to modifications/accesses of cache lines on processor caches 462A-462D, 456 and receiving updates from the cache 438).

A set of registers 445 store context data for threads executed by the graphics processing engines 431-432, N and a context management circuit 448 manages the thread contexts. For example, the context management circuit 448 may perform save and restore operations to save and restore contexts of the various threads during contexts switches (e.g., where a first thread is saved and a second thread is stored so that the second thread can be execute by a graphics processing engine). For example, on a context switch, the context management circuit 448 may store current register values to a designated region in memory (e.g., identified by a context pointer). It may then restore the register values when returning to the context. In one embodiment, an interrupt management circuit 447 receives and processes interrupts received from system devices.

In one implementation, virtual/effective addresses from a graphics processing engine 431 are translated to real/physical addresses in system memory 441 by the MMU 439. One embodiment of the accelerator integration circuit 436 supports multiple (e.g., 4, 8, 16) graphics accelerator modules 446 and/or other accelerator devices. The graphics accelerator module 446 may be dedicated to a single application executed on the processor 407 or may be shared between multiple applications. In one embodiment, a virtualized graphics execution environment is presented in which the resources of the graphics processing engines 431-432, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 446 and provides address translation and system memory cache services. In addition, the accelerator integration circuit 436 may provide virtualization facilities for the host processor to manage virtualization of the graphics processing engines, interrupts, and memory management.

Because hardware resources of the graphics processing engines 431-432, N are mapped explicitly to the real address space seen by the host processor 407, any host processor can address these resources directly using an effective address value. One function of the accelerator integration circuit 436, in one embodiment, is the physical separation of the graphics processing engines 431-432, N so that they appear to the system as independent units.

As mentioned, in the illustrated embodiment, one or more graphics memories 433-434, M are coupled to each of the graphics processing engines 431-432, N, respectively. The graphics memories 433-434, M store instructions and data being processed by each of the graphics processing engines 431-432, N. The graphics memories 433-434, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over the high-speed link 440, biasing techniques are used to ensure that the data stored in graphics memories 433-434, M is data which will be used most frequently by the graphics processing engines 431-432, N and preferably not used by the cores 460A-460D (at least not frequently). Similarly, the biasing mechanism attempts to keep data needed by the cores (and preferably not the graphics processing engines 431-432, N) within the caches 462A-462D, 456 of the cores and system memory 441.

Figure 4C:
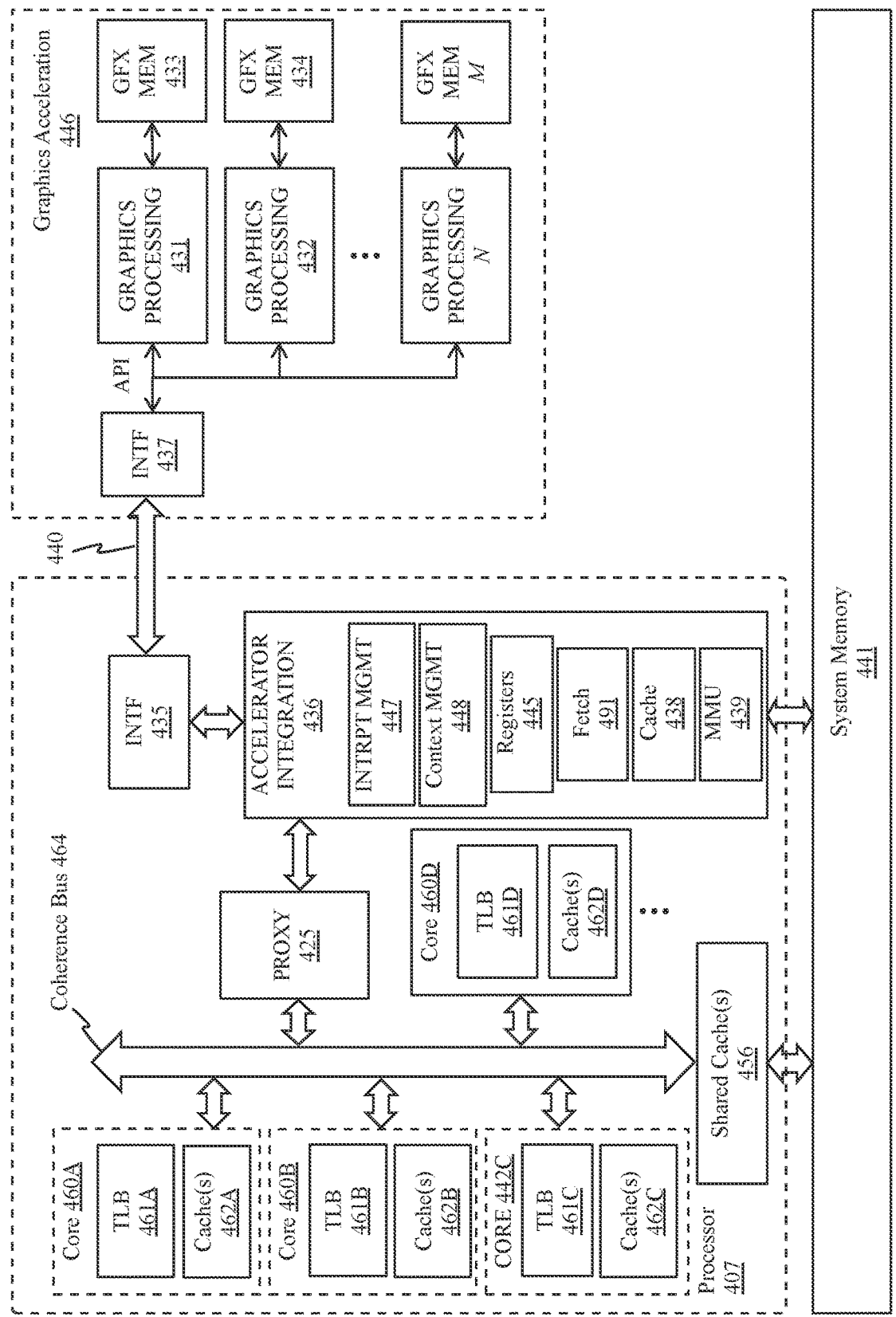

FIG. 4C illustrates another embodiment in which the accelerator integration circuit 436 is integrated within the processor 407. In this embodiment, the graphics processing engines 431-432, N communicate directly over the high-speed link 440 to the accelerator integration circuit 436 via interface 437 and interface 435 (which, again, may be utilize any form of bus or interface protocol). The accelerator integration circuit 436 may perform the same operations as those described with respect to FIG. 4B, but potentially at a higher throughput given its close proximity to the coherency bus 464 and caches 462A-462D, 456.

One embodiment supports different programming models including a dedicated-process programming model (no graphics acceleration module virtualization) and shared programming models (with virtualization). The latter may include programming models which are controlled by the accelerator integration circuit 436 and programming models which are controlled by the graphics acceleration module 446.

In one embodiment of the dedicated process model, graphics processing engines 431-432, N are dedicated to a single application or process under a single operating system. The single application can funnel other application requests to the graphics engines 431-432, N, providing virtualization within a VM/partition.

In the dedicated-process programming models, the graphics processing engines 431-432, N, may be shared by multiple VM/application partitions. The shared models require a system hypervisor to virtualize the graphics processing engines 431-432, N to allow access by each operating system. For single-partition systems without a hypervisor, the graphics processing engines 431-432, N are owned by the operating system. In both cases, the operating system can virtualize the graphics processing engines 431-432, N to provide access to each process or application.

For the shared programming model, the graphics acceleration module 446 or an individual graphics processing engine 431-432, N selects a process element using a process handle. In one embodiment, process elements are stored in system memory 441 and are addressable using the effective address to real address translation techniques described herein. The process handle may be an implementation-specific value provided to the host process when registering its context with the graphics processing engine 431-432, N (that is, calling system software to add the process element to the process element linked list). The lower 16-bits of the process handle may be the offset of the process element within the process element linked list.

Figure 4D:
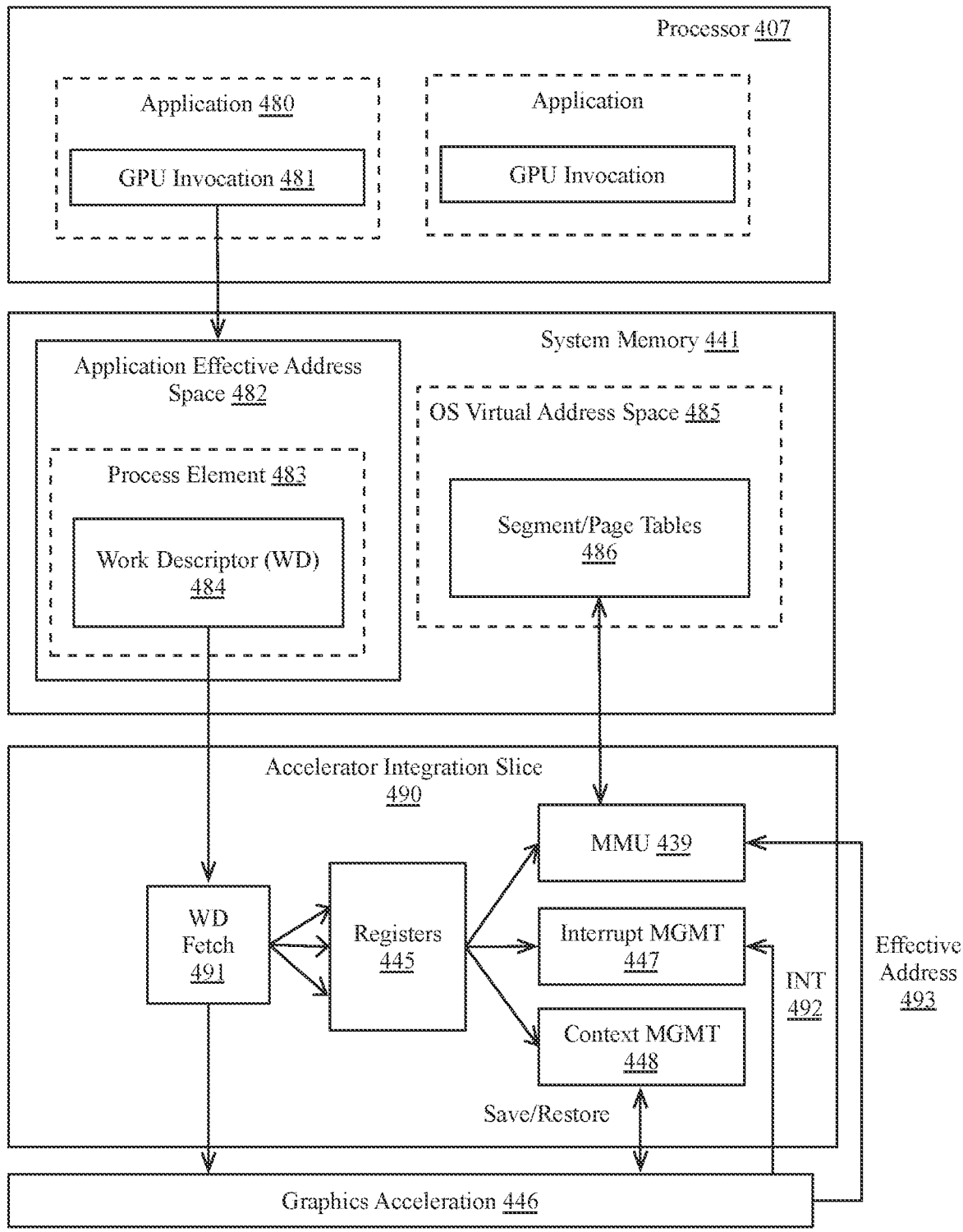

FIG. 4D illustrates an exemplary accelerator integration slice 490. As used herein, a "slice" comprises a specified portion of the processing resources of the accelerator integration circuit 436. Application effective address space 482 within system memory 441 stores process elements 483. In one embodiment, the process elements 483 are stored in response to GPU invocations 481 from applications 480 executed on the processor 407. A process element 483 contains the process state for the corresponding application 480. A work descriptor (WD) 484 contained in the process element 483 can be a single job requested by an application or may contain a pointer to a queue of jobs. In the latter case, the WD 484 is a pointer to the job request queue in the application's address space 482.

The graphics acceleration module 446 and/or the individual graphics processing engines 431-432, N can be shared by all or a subset of the processes in the system. Embodiments of the invention include an infrastructure for setting up the process state and sending a WD 484 to a graphics acceleration module 446 to start a job in a virtualized environment.

In one implementation, the dedicated-process programming model is implementation-specific. In this model, a single process owns the graphics acceleration module 446 or an individual graphics processing engine 431. Because the graphics acceleration module 446 is owned by a single process, the hypervisor initializes the accelerator integration circuit 436 for the owning partition and the operating system initializes the accelerator integration circuit 436 for the owning process at the time when the graphics acceleration module 446 is assigned.

In operation, a WD fetch unit 491 in the accelerator integration slice 490 fetches the next WD 484 which includes an indication of the work to be done by one of the graphics processing engines of the graphics acceleration module 446. Data from the WD 484 may be stored in registers 445 and used by the MMU 439, interrupt management circuit 447 and/or context management circuit 448 as illustrated. For example, one embodiment of the MMU 439 includes segment/page walk circuitry for accessing segment/ page tables 486 within the OS virtual address space 485. The interrupt management circuit 447 may process interrupt events 492 received from the graphics acceleration module 446. When performing graphics operations, an effective address 493 generated by a graphics processing engine 431-432, N is translated to a real address by the MMU 439.

In one embodiment, the same set of registers 445 are duplicated for each graphics processing engine 431-432, N and/or graphics acceleration module 446 and may be initialized by the hypervisor or operating system. Each of these duplicated registers may be included in an accelerator integration slice 490. Exemplary registers that may be initialized by the hypervisor are shown in Table 1.

TABLE 1

Hypervisor Initialized Registers

| | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by the operating system are shown in Table 2.

TABLE 2

Operating System Initialized Registers

| | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 484 is specific to a particular graphics acceleration module 446 and/or graphics processing engine 431-432, N. It contains all the information a graphics processing engine 431-432, N requires to do its work or it can be a pointer to a memory location where the application has set up a command queue of work to be completed.

Figure 4E:
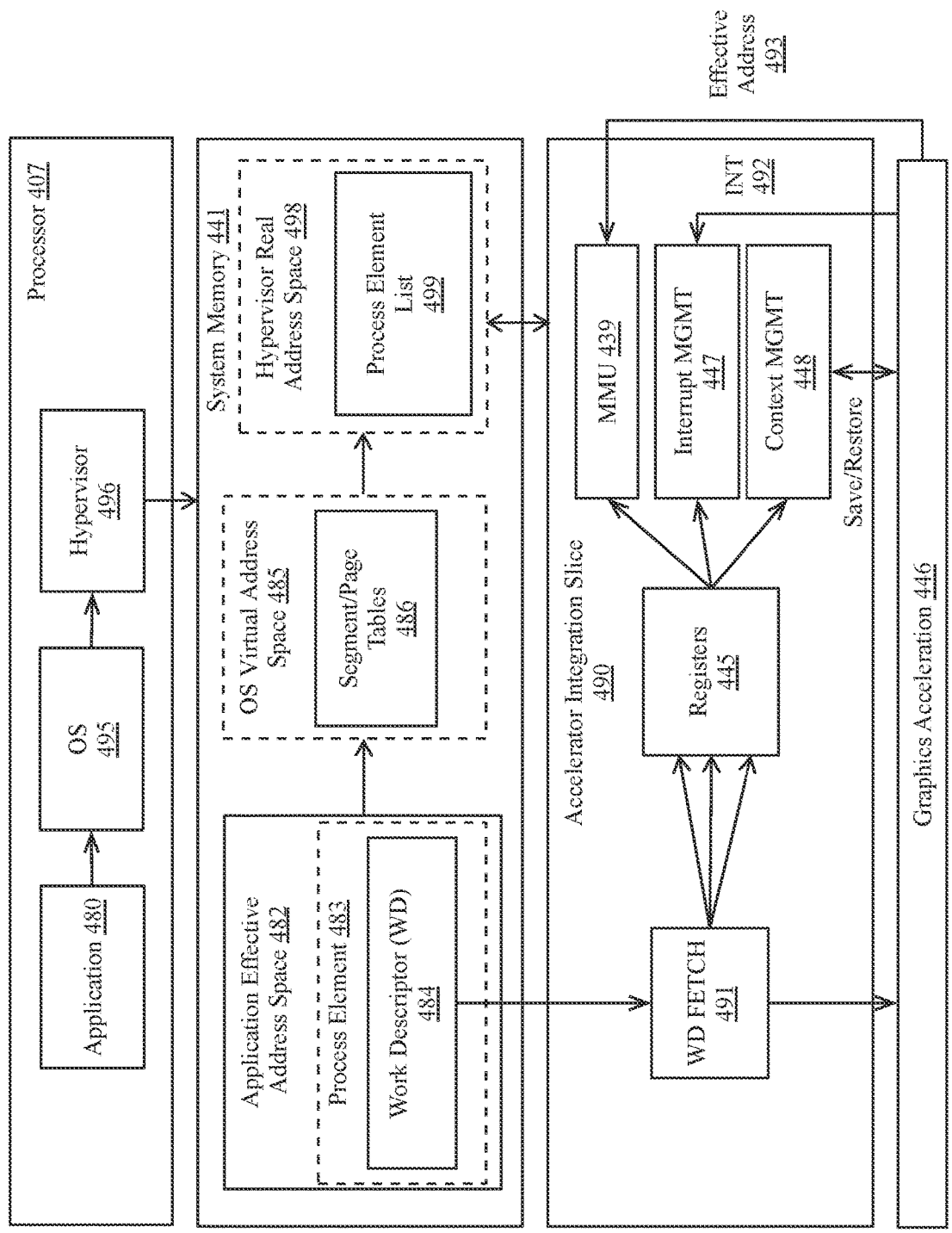

FIG. 4E illustrates additional details for one embodiment of a shared model. This embodiment includes a hypervisor real address space 498 in which a process element list 499 is stored. The hypervisor real address space 498 is accessible via a hypervisor 496 which virtualizes the graphics acceleration module engines for the operating system 495.

The shared programming models allow for all or a subset of processes from all or a subset of partitions in the system to use a graphics acceleration module 446. There are two programming models where the graphics acceleration module 446 is shared by multiple processes and partitions: time-sliced shared and graphics directed shared.

In this model, the system hypervisor 496 owns the graphics acceleration module 446 and makes its function available to all operating systems 495. For a graphics acceleration module 446 to support virtualization by the system hypervisor 496, the graphics acceleration module 446 may adhere to the following requirements: 1) An application's job request must be autonomous (that is, the state does not need to be maintained between jobs), or the graphics acceleration module 446 must provide a context save and restore mechanism. 2) An application's job request is guaranteed by the graphics acceleration module 446 to complete in a specified amount of time, including any translation faults, or the graphics acceleration module 446 provides the ability to preempt the processing of the job. 3) The graphics acceleration module 446 must be guaranteed fairness between processes when operating in the directed shared programming model.

In one embodiment, for the shared model, the application 480 is required to make an operating system 495 system call with a graphics acceleration module 446 type, a work descriptor (WD), an authority mask register (AMR) value, and a context save/restore area pointer (CSRP). The graphics acceleration module 446 type describes the targeted acceleration function for the system call. The graphics acceleration module 446 type may be a system-specific value. The WD is formatted specifically for the graphics acceleration module 446 and can be in the form of a graphics acceleration module 446 command, an effective address pointer to a user-defined structure, an effective address pointer to a queue of commands, or any other data structure to describe the work to be done by the graphics acceleration module 446. In one embodiment, the AMR value is the AMR state to use for the current process. The value passed to the operating system is similar to an application setting the AMR. If the accelerator integration circuit 436 and graphics acceleration module 446 implementations do not support a User Authority Mask Override Register (UAMOR), the operating system may apply the current UAMOR value to the AMR value before passing the AMR in the hypervisor call. The hypervisor 496 may optionally apply the current Authority Mask Override Register (AMOR) value before placing the AMR into the process element 483. In one embodiment, the CSRP is one of the registers 445 containing the effective address of an area in the application's address space 482 for the graphics acceleration module 446 to save and restore the context state. This pointer is optional if no state is required to be saved between jobs or when a job is preempted. The context save/restore area may be pinned system memory.

Upon receiving the system call, the operating system 495 may verify that the application 480 has registered and been given the authority to use the graphics acceleration module 446. The operating system 495 then calls the hypervisor 496 with the information shown in Table 3.

TABLE 3

OS to Hypervisor Call Parameters

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |
| 7 | A logical interrupt service number (LISN) |

Upon receiving the hypervisor call, the hypervisor 496 verifies that the operating system 495 has registered and been given the authority to use the graphics acceleration module 446. The hypervisor 496 then puts the process element 483 into the process element linked list for the corresponding graphics acceleration module 446 type. The process element may include the information shown in Table 4.

TABLE 4

Process Element Information

1. A work descriptor (WD)
2. An Authority Mask Register (AMR) value (potentially masked).
3. An effective address (EA) Context Save/Restore Area Pointer (CSRP)
4. A process ID (PID) and optional thread ID (TID)
5. A virtual address (VA) accelerator utilization record pointer (AURP)
6. The virtual address of the storage segment table pointer (SSTP)
7. A logical interrupt service number (LISN)
8. Interrupt vector table, derived from the hypervisor call parameters.
9. A state register (SR) value
10. A logical partition ID (LPID)
11. A real address (RA) hypervisor accelerator utilization record pointer
12. The Storage Descriptor Register (SDR)

In one embodiment, the hypervisor initializes a plurality of accelerator integration slice 490 registers 445.

Figure 4F:
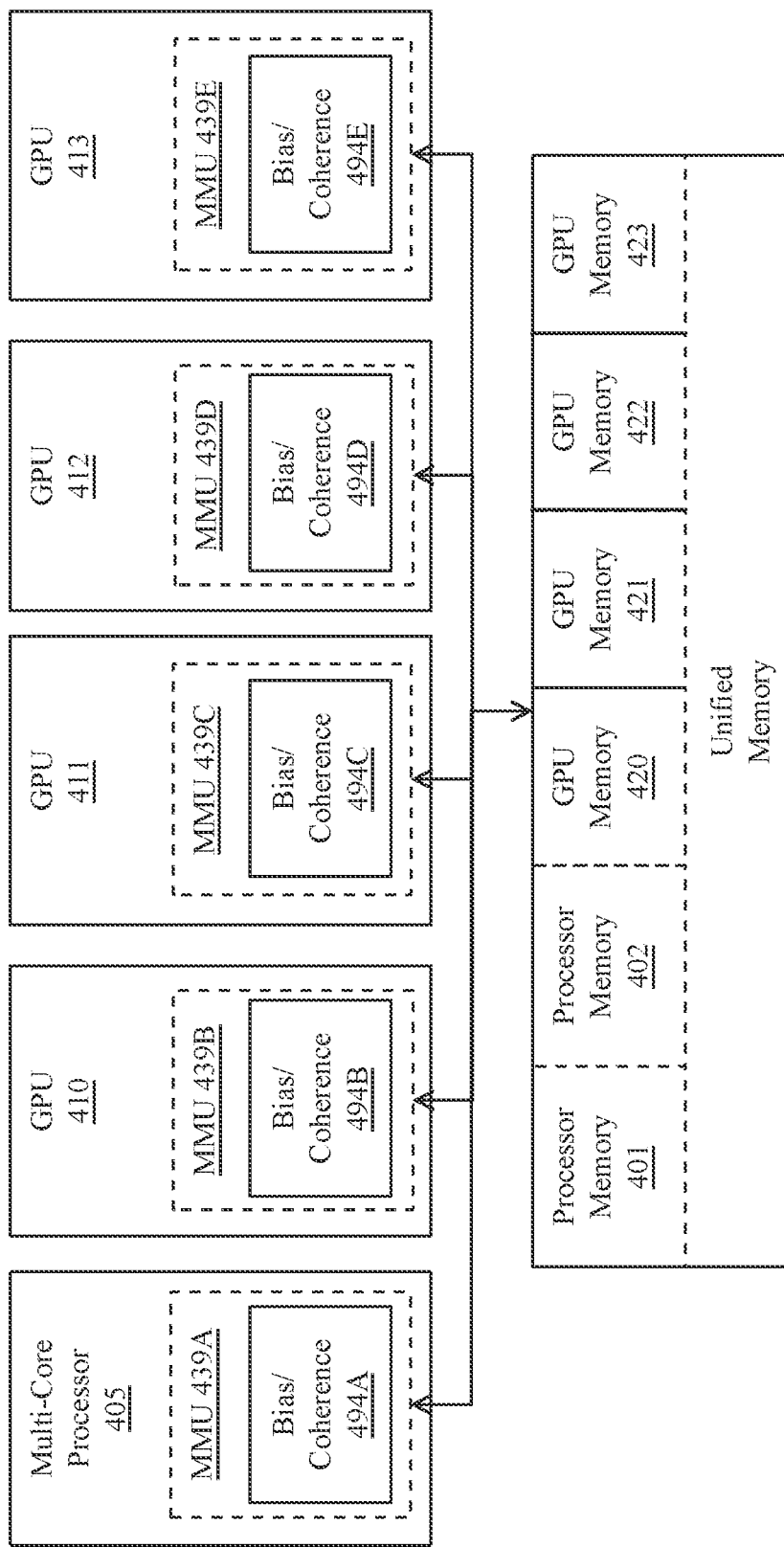

As illustrated in FIG. 4F, one embodiment of the invention employs a unified memory addressable via a common virtual memory address space used to access the physical processor memories 401-402 and GPU memories 420-423. In this implementation, operations executed on the GPUs 410-413 utilize the same virtual/effective memory address space to access the processors memories 401-402 and vice versa, thereby simplifying programmability. In one embodiment, a first portion of the virtual/effective address space is allocated to the processor memory 401, a second portion to the second processor memory 402, a third portion to the GPU memory 420, and so on. The entire virtual/effective memory space (sometimes referred to as the effective address space) is thereby distributed across each of the processor memories 401-402 and GPU memories 420-423, allowing any processor or GPU to access any physical memory with a virtual address mapped to that memory.

In one embodiment, bias/coherence management circuitry 494A-494E within one or more of the MMUs 439A-439E ensures cache coherence between the caches of the host processors (e.g., 405) and the GPUs 410-413 and implements biasing techniques indicating the physical memories in which certain types of data should be stored. While multiple instances of bias/coherence management circuitry 494A-494E are illustrated in FIG. 4F, the bias/coherence circuitry may be implemented within the MMU of one or more host processors 405 and/or within the accelerator integration circuit 436.

One embodiment allows GPU-attached memory 420-423 to be mapped as part of system memory, and accessed using shared virtual memory (SVM) technology, but without suffering the typical performance drawbacks associated with full system cache coherence. The ability to GPU-attached memory 420-423 to be accessed as system memory without onerous cache coherence overhead provides a beneficial operating environment for GPU offload. This arrangement allows the host processor 405 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 420-423 without cache coherence overheads can be critical to the execution time of an offloaded computation. In cases with substantial streaming write memory traffic, for example, cache coherence overhead can significantly reduce the effective write bandwidth seen by a GPU 410-413. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 420-423, with or without a bias cache in the GPU 410-413 (e.g., to cache frequently/recently used entries of the bias table). Alternatively, the entire bias table may be maintained within the GPU.

In one implementation, the bias table entry associated with each access to the GPU-attached memory 420-423 is accessed prior the actual access to the GPU memory, causing the following operations. First, local requests from the GPU 410-413 that find their page in GPU bias are forwarded directly to a corresponding GPU memory 420-423. Local requests from the GPU that find their page in host bias are forwarded to the processor 405 (e.g., over a high-speed link as discussed above). In one embodiment, requests from the processor 405 that find the requested page in host processor bias complete the request like a normal memory read. Alternatively, requests directed to a GPU-biased page may be forwarded to the GPU 410-413. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 405 bias to GPU bias, but is not required for the opposite transition.

In one embodiment, cache coherency is maintained by temporarily rendering GPU-biased pages uncacheable by the host processor 405. To access these pages, the processor 405 may request access from the GPU 410 which may or may not grant access right away, depending on the implementation. Thus, to reduce communication between the host processor 405 and GPU 410 it is beneficial to ensure that GPU-biased pages are those which are required by the GPU but not the host processor 405 and vice versa.

Graphics Processing Pipeline

Figure 5:
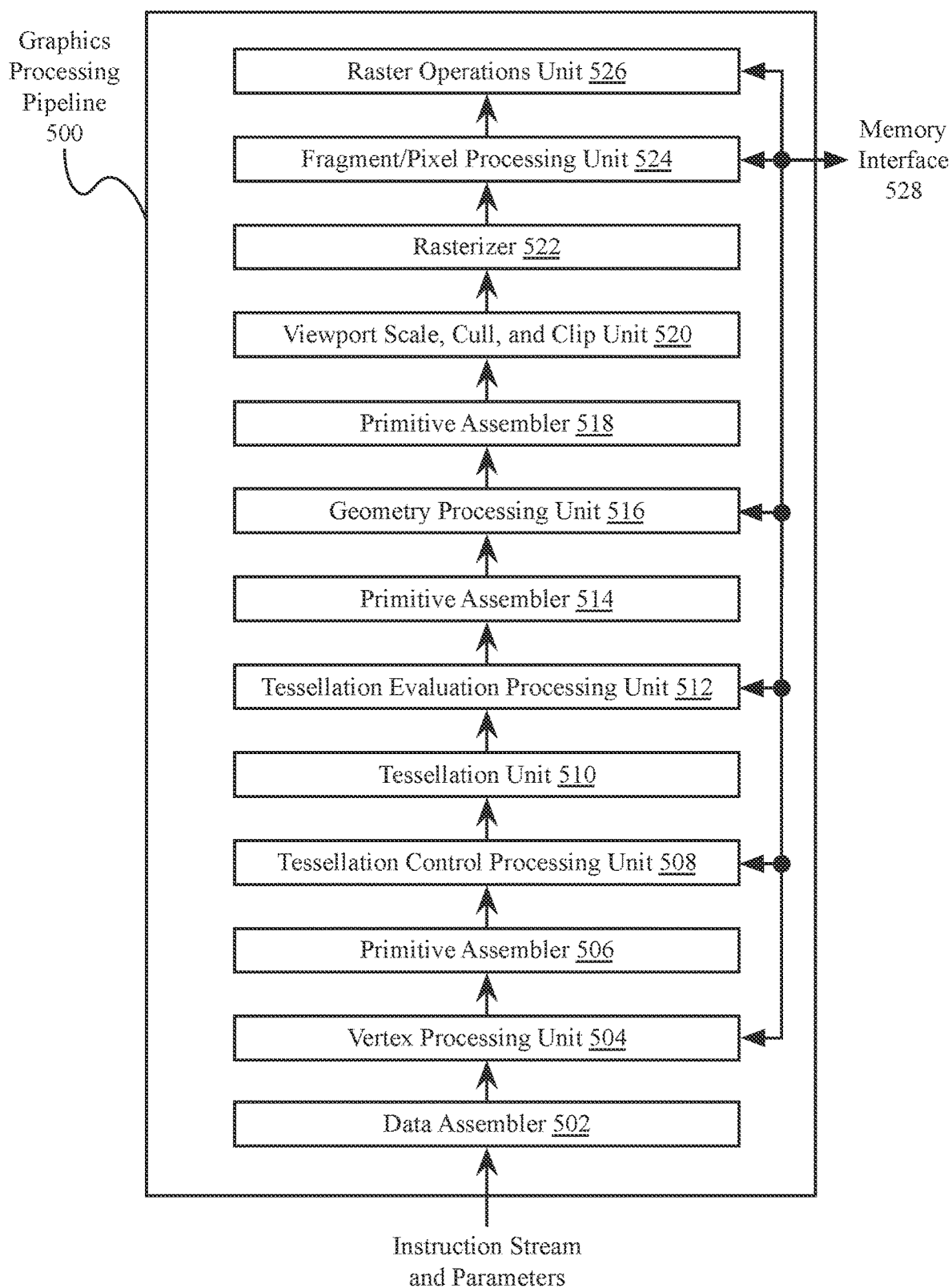
FIG. 5 illustrates a graphics processing pipeline, according to an embodiment.

FIG. 5 illustrates a graphics processing pipeline 500, according to an embodiment. In one embodiment a graphics processor can implement the illustrated graphics processing pipeline 500. The graphics processor can be included within the parallel processing subsystems as described herein, such as the parallel processor 200 of FIG. 2A, which, in one embodiment, is a variant of the parallel processor(s) 112 of FIG. 1. The various parallel processing systems can implement the graphics processing pipeline 500 via one or more instances of the parallel processing unit (e.g., parallel processing unit 202 of FIG. 2A) as described herein. For example, a shader unit (e.g., graphics multiprocessor 234 of FIG. 2C) may be configured to perform the functions of one or more of a vertex processing unit 504, a tessellation control processing unit 508, a tessellation evaluation processing unit 512, a geometry processing unit 516, and a fragment/pixel processing unit 524. The functions of data assembler 502, primitive assemblers 506, 514, 518, tessellation unit 510, rasterizer 522, and raster operations unit 526 may also be performed by other processing engines within a processing cluster (e.g., processing cluster 214 of FIG. 2A) and a corresponding partition unit (e.g., partition unit 220A-220N of FIG. 2A). The graphics processing pipeline 500 may also be implemented using dedicated processing units for one or more functions. In one embodiment, one or more portions of the graphics processing pipeline 500 can be performed by parallel processing logic within a general purpose processor (e.g., CPU). In one embodiment, one or more portions of the graphics processing pipeline 500 can access on-chip memory (e.g., parallel processor memory 222 as in FIG. 2A) via a memory interface 528, which may be an instance of the memory interface 218 of FIG. 2A.

In one embodiment the data assembler 502 is a processing unit that collects vertex data for surfaces and primitives. The data assembler 502 then outputs the vertex data, including the vertex attributes, to the vertex processing unit 504. The vertex processing unit 504 is a programmable execution unit that executes vertex shader programs, lighting and transforming vertex data as specified by the vertex shader programs. The vertex processing unit 504 reads data that is stored in cache, local or system memory for use in processing the vertex data and may be programmed to transform the vertex data from an object-based coordinate representation to a world space coordinate space or a normalized device coordinate space.

A first instance of a primitive assembler 506 receives vertex attributes from the vertex processing unit 504. The primitive assembler 506 readings stored vertex attributes as needed and constructs graphics primitives for processing by tessellation control processing unit 508. The graphics primitives include triangles, line segments, points, patches, and so forth, as supported by various graphics processing application programming interfaces (APIs).

The tessellation control processing unit 508 treats the input vertices as control points for a geometric patch. The control points are transformed from an input representation from the patch (e.g., the patch's bases) to a representation that is suitable for use in surface evaluation by the tessellation evaluation processing unit 512. The tessellation control processing unit 508 can also compute tessellation factors for edges of geometric patches. A tessellation factor applies to a single edge and quantifies a view-dependent level of detail associated with the edge. A tessellation unit 510 is configured to receive the tessellation factors for edges of a patch and to tessellate the patch into multiple geometric primitives such as line, triangle, or quadrilateral primitives, which are transmitted to a tessellation evaluation processing unit 512. The tessellation evaluation processing unit 512 operates on parameterized coordinates of the subdivided patch to generate a surface representation and vertex attributes for each vertex associated with the geometric primitives.

A second instance of a primitive assembler 514 receives vertex attributes from the tessellation evaluation processing unit 512, reading stored vertex attributes as needed, and constructs graphics primitives for processing by the geometry processing unit 516. The geometry processing unit 516 is a programmable execution unit that executes geometry shader programs to transform graphics primitives received from primitive assembler 514 as specified by the geometry shader programs. In one embodiment the geometry processing unit 516 is programmed to subdivide the graphics primitives into one or more new graphics primitives and calculate parameters used to rasterize the new graphics primitives.

In some embodiments the geometry processing unit 516 can add or delete elements in the geometry stream. The geometry processing unit 516 outputs the parameters and vertices specifying new graphics primitives to primitive assembler 518. The primitive assembler 518 receives the parameters and vertices from the geometry processing unit 516 and constructs graphics primitives for processing by a viewport scale, cull, and clip unit 520. The geometry processing unit 516 reads data that is stored in parallel processor memory or system memory for use in processing the geometry data. The viewport scale, cull, and clip unit 520 performs clipping, culling, and viewport scaling and outputs processed graphics primitives to a rasterizer 522.

The rasterizer 522 can perform depth culling and other depth-based optimizations. The rasterizer 522 also performs scan conversion on the new graphics primitives to generate fragments and output those fragments and associated coverage data to the fragment/pixel processing unit 524. The fragment/pixel processing unit 524 is a programmable execution unit that is configured to execute fragment shader programs or pixel shader programs. The fragment/pixel processing unit 524 transforming fragments or pixels received from rasterizer 522, as specified by the fragment or pixel shader programs. For example, the fragment/pixel processing unit 524 may be programmed to perform operations included but not limited to texture mapping, shading, blending, texture correction and perspective correction to produce shaded fragments or pixels that are output to a raster operations unit 526. The fragment/pixel processing unit 524 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 526 is a processing unit that performs raster operations including, but not limited to stencil, z-test, blending, and the like, and outputs pixel data as processed graphics data to be stored in graphics memory (e.g., parallel processor memory 222 as in FIG. 2A, and/or system memory 104 as in FIG. 1), to be displayed on the one or more display device(s) 110 or for further processing by one of the one or more processor(s) 102 or parallel processor(s) 112. In some embodiments the raster operations unit 526 is configured to compress z or color data that is written to memory and decompress z or color data that is read from memory.

Machine Learning Overview

The architecture described above can be applied to perform training and inference operations using machine learning models. Machine learning has been successful at solving many kinds of tasks. The computations that arise when training and using machine learning algorithms (e.g., neural networks) lend themselves naturally to efficient parallel implementations. Accordingly, parallel processors such as general-purpose graphic processing units (GPGPUs) have played a significant role in the practical implementation of deep neural networks. Parallel graphics processors with single instruction, multiple thread (SIMT) architectures are designed to maximize the amount of parallel processing in the graphics pipeline. In an SIMT architecture, groups of parallel threads attempt to execute program instructions synchronously together as often as possible to increase processing efficiency. The efficiency provided by parallel machine learning algorithm implementations allows the use of high capacity networks and enables those networks to be trained on larger datasets.

A machine learning algorithm is an algorithm that can learn based on a set of data. Embodiments of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An exemplary type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 6:
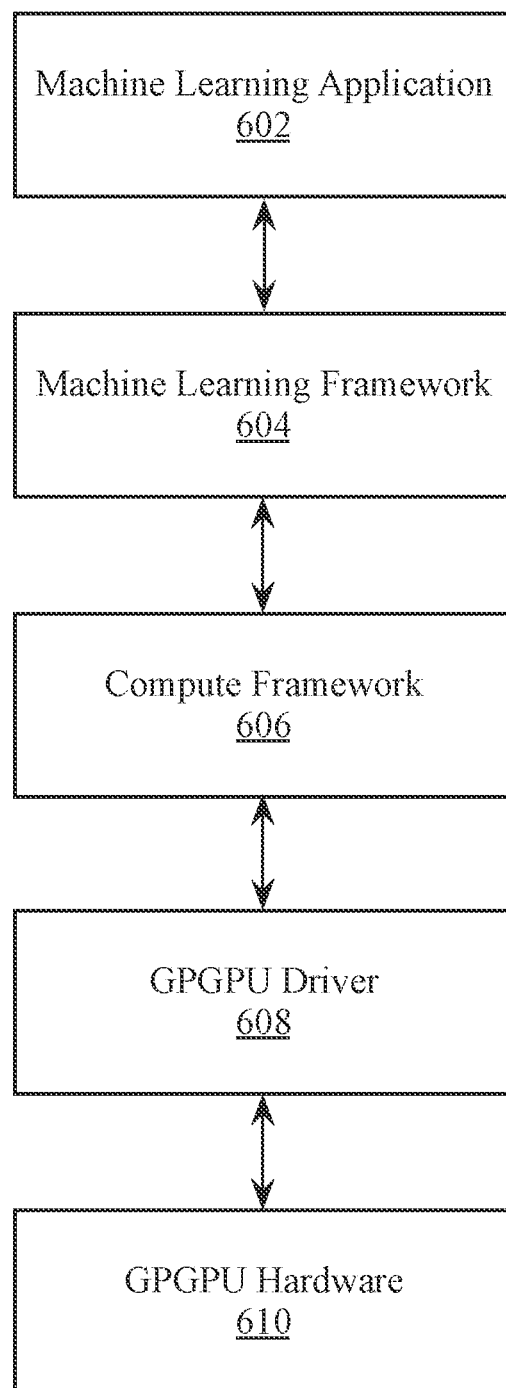
FIG. 6 illustrates a machine learning software stack, according to an embodiment.

FIG. 6 is a generalized diagram of a machine learning software stack 600. A machine learning application 602 can be configured to train a neural network using a training dataset or to use a trained deep neural network to implement machine intelligence. The machine learning application 602 can include training and inference functionality for a neural network and/or specialized software that can be used to train a neural network before deployment. The machine learning application 602 can implement any type of machine intelligence including but not limited to image recognition, mapping and localization, autonomous navigation, speech synthesis, medical imaging, or language translation.

Hardware acceleration for the machine learning application 602 can be enabled via a machine learning framework 604. The machine learning framework 604 can provide a library of machine learning primitives. Machine learning primitives are basic operations that are commonly performed by machine learning algorithms. Without the machine learning framework 604, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 604. Exemplary primitives include tensor convolutions, activation functions, and pooling, which are computational operations that are performed while training a convolutional neural network (CNN). The machine learning framework 604 can also provide primitives to implement basic linear algebra subprograms performed by many machine-learning algorithms, such as matrix and vector operations.

The machine learning framework 604 can process input data received from the machine learning application 602 and generate the appropriate input to a compute framework 606. The compute framework 606 can abstract the underlying instructions provided to the GPGPU driver 608 to enable the machine learning framework 604 to take advantage of hardware acceleration via the GPGPU hardware 610 without requiring the machine learning framework 604 to have intimate knowledge of the architecture of the GPGPU hardware 610. Additionally, the compute framework 606 can enable hardware acceleration for the machine learning framework 604 across a variety of types and generations of the GPGPU hardware 610.

GPGPU Machine Learning Acceleration

Figure 7:
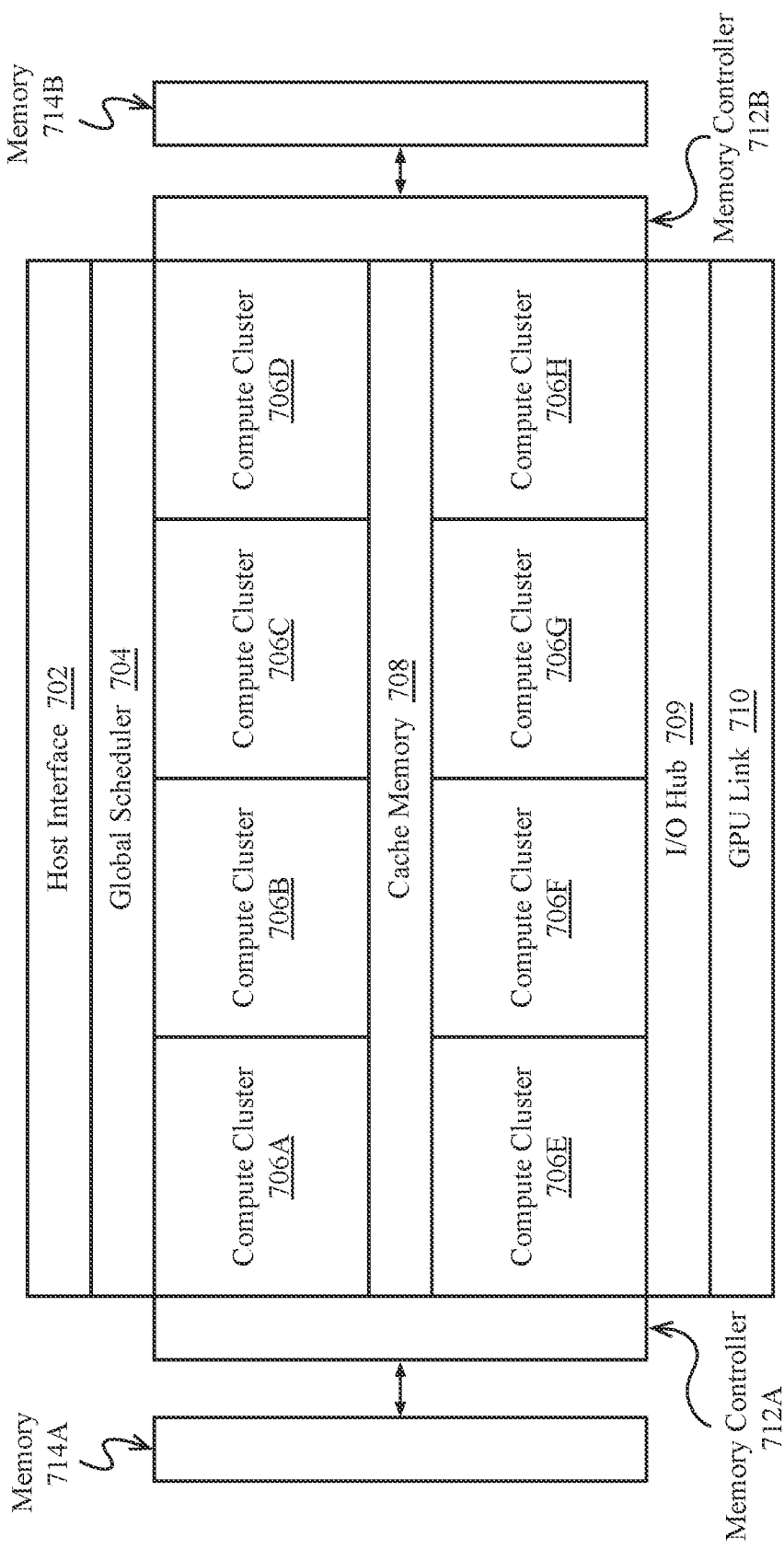
FIG. 7 illustrates a general-purpose graphics processing unit, according to an embodiment.

FIG. 7 illustrates a general-purpose graphics processing unit 700, according to an embodiment. In one embodiment, the general-purpose processing unit (GPGPU) 700 can be configured to be particularly efficient in processing the type of computational workloads associated with training deep neural networks. Additionally, the GPGPU 700 can be linked directly to other instances of the GPGPU to create a multi-GPU cluster to improve training speed for particularly deep neural networks.

The GPGPU 700 includes a host interface 702 to enable a connection with a host processor. In one embodiment the host interface 702 is a PCI Express interface. However, the host interface can also be a vendor specific communications interface or communications fabric. The GPGPU 700 receives commands from the host processor and uses a global scheduler 704 to distribute execution threads associated with those commands to a set of compute clusters 706A-706H. The compute clusters 706A-706H share a cache memory 708. The cache memory 708 can serve as a higher-level cache for cache memories within the compute clusters 706A-706H.

The GPGPU 700 includes memory 714A-B coupled with the compute clusters 706A-H via a set of memory controllers 712A-712B. In various embodiments, the memory 714A-714B can include various types of memory devices including dynamic random-access memory (DRAM) or graphics random access memory, such as synchronous graphics random access memory (SGRAM), including graphics double data rate (GDDR) memory. In one embodiment, the memory 714A-714N may also include 3D stacked memory, including but not limited to high bandwidth memory (HBM).

In one embodiment, each of the compute clusters 706A-706H includes a set of graphics multiprocessors, such as the graphics multiprocessor 400 of FIG. 4A. The graphics multiprocessors of the compute cluster multiple types of integer and floating-point logic units that can perform computational operations at a range of precisions including suited for machine learning computations. For example, and in one embodiment at least a subset of the floating-point units in each of the compute clusters 706A-H can be configured to perform 16-bit or 32-bit floating point operations, while a different subset of the floating-point units can be configured to perform 64-bit floating point operations.

Multiple instances of the GPGPU 700 can be configured to operate as a compute cluster. The communication mechanism used by the compute cluster for synchronization and data exchange varies across embodiments. In one embodiment, the multiple instances of the GPGPU 700 communicate over the host interface 702. In one embodiment the GPGPU 700 includes an I/O hub 709 that couples the GPGPU 700 with a GPU link 710 that enables a direct connection to other instances of the GPGPU. In one embodiment the GPU link 710 is coupled to a dedicated GPU-to-GPU bridge that enables communication and synchronization between multiple instances of the GPGPU 700. In one embodiment the GPU link 710 couples with a high-speed interconnect to transmit and receive data to other GPGPUs or parallel processors. In one embodiment the multiple instances of the GPGPU 700 are located in separate data processing systems and communicate via a network device that is accessible via the host interface 702. In one embodiment the GPU link 710 can be configured to enable a connection to a host processor in addition to or as an alternative to the host interface 702.

While the illustrated configuration of the GPGPU 700 can be configured to train neural networks, one embodiment provides alternate configuration of the GPGPU 700 that can be configured for deployment within a high performance or low power inferencing platform. In an inferencing configuration, the GPGPU 700 includes fewer of the compute clusters 706A-706H relative to the training configuration. Additionally, memory technology associated with the memory 714A-714B may differ between inferencing and training configurations. In one embodiment, the inferencing configuration of the GPGPU 700 can support inferencing specific instructions. For example, an inferencing configuration can provide support for one or more 8-bit integer dot product instructions, which are commonly used during inferencing operations for deployed neural networks.

Figure 8:
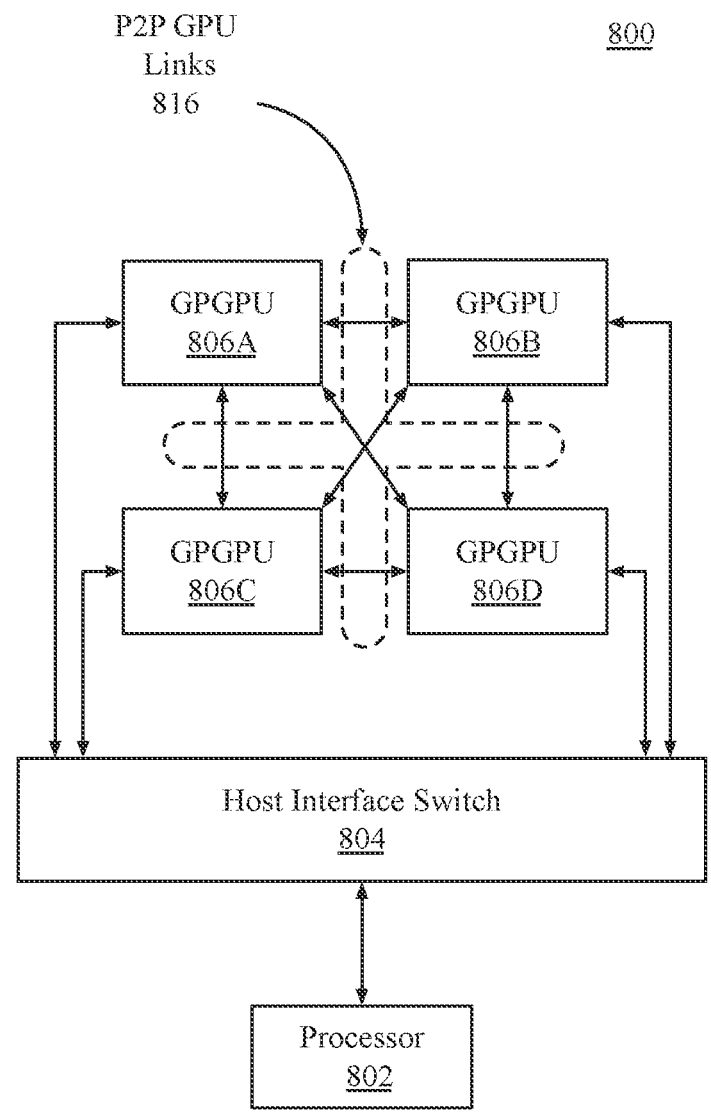
FIG. 8 illustrates a multi-GPU computing system, according to an embodiment.

FIG. 8 illustrates a multi-GPU computing system 800, according to an embodiment. The multi-GPU computing system 800 can include a processor 802 coupled to multiple GPGPUs 806A-806D via a host interface switch 804. The host interface switch 804, in one embodiment, is a PCI express switch device that couples the processor 802 to a PCI express bus over which the processor 802 can communicate with the set of GPGPUs 806A-806D. Each of the multiple GPGPUs 806A-806D can be an instance of the GPGPU 700 of FIG. 7. The GPGPUs 806A-806D can interconnect via a set of high-speed point to point GPU to GPU links 816. The high-speed GPU to GPU links can connect to each of the GPGPUs 806A-806D via a dedicated GPU link, such as the GPU link 710 as in FIG. 7. The P2P GPU links 816 enable direct communication between each of the GPGPUs 806A-806D without requiring communication over the host interface bus to which the processor 802 is connected. With GPU-to-GPU traffic directed to the P2P GPU links, the host interface bus remains available for system memory access or to communicate with other instances of the multi-GPU computing system 800, for example, via one or more network devices. While in the illustrated embodiment the GPGPUs 806A-D connect to the processor 802 via the host interface switch 804, in one embodiment the processor 802 includes direct support for the P2P GPU links 816 and can connect directly to the GPGPUs 806A-806D.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is well-known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for an RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 9A:
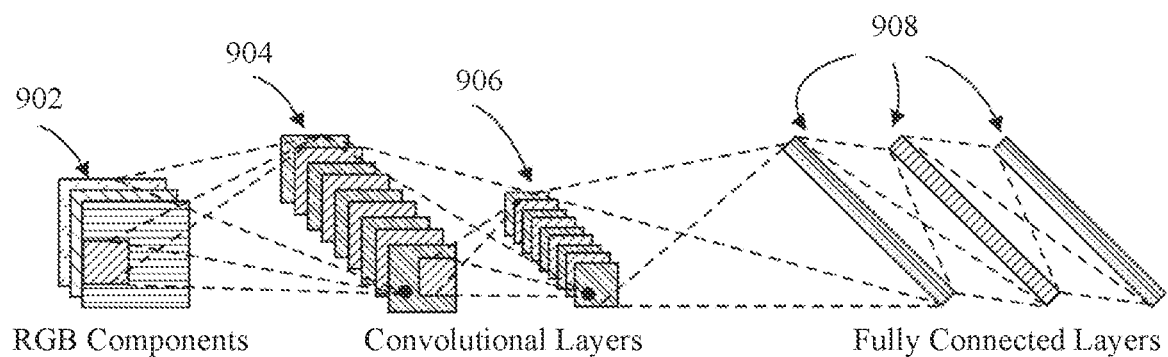
FIG. 9A-9B illustrate layers of exemplary deep neural networks.
Figure 9B:
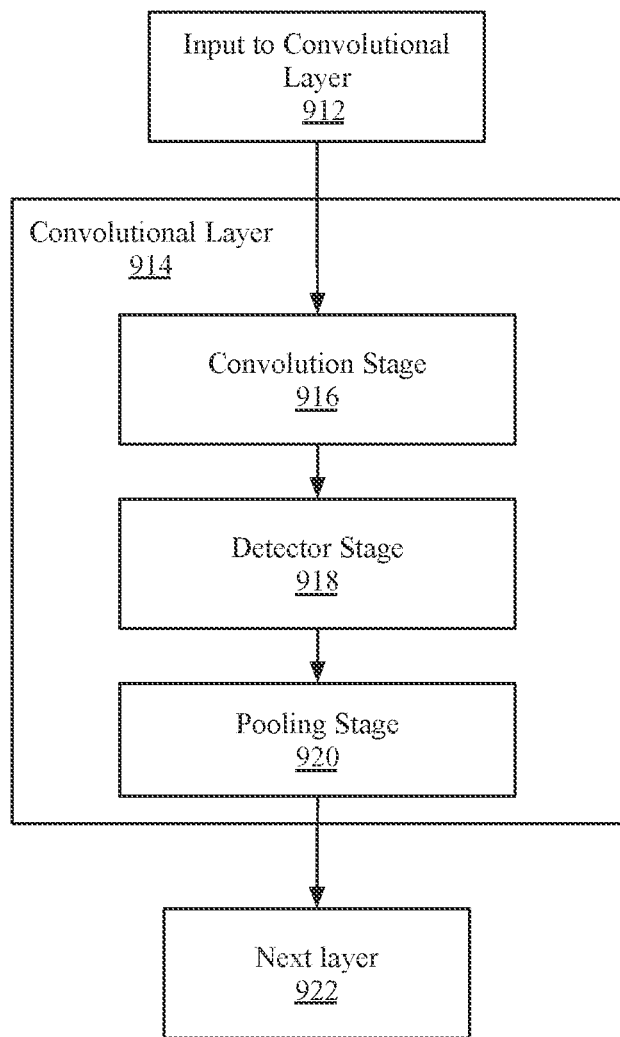

FIG. 9A-9B illustrate an exemplary convolutional neural network. FIG. 9A illustrates various layers within a CNN. As shown in FIG. 9A, an exemplary CNN used to model image processing can receive input 902 describing the red, green, and blue (RGB) components of an input image. The input 902 can be processed by multiple convolutional layers (e.g., convolutional layer 904, convolutional layer 906). The output from the multiple convolutional layers may optionally be processed by a set of fully connected layers 908. Neurons in a fully connected layer have full connections to all activations in the previous layer, as previously described for a feedforward network. The output from the fully connected layers 908 can be used to generate an output result from the network. The activations within the fully connected layers 908 can be computed using matrix multiplication instead of convolution. Not all CNN implementations make use of fully connected layers 908. For example, in some implementations the convolutional layer 906 can generate output for the CNN.

The convolutional layers are sparsely connected, which differs from traditional neural network configuration found in the fully connected layers 908. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 9B illustrates exemplary computation stages within a convolutional layer of a CNN. Input to a convolutional layer 912 of a CNN can be processed in three stages of a convolutional layer 914. The three stages can include a convolution stage 916, a detector stage 918, and a pooling stage 920. The convolution layer 914 can then output data to a successive convolutional layer. The final convolutional layer of the network can generate output feature map data or provide input to a fully connected layer, for example, to generate a classification value for the input to the CNN.

In the convolution stage 916 performs several convolutions in parallel to produce a set of linear activations. The convolution stage 916 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 916 defines a set of linear activations that are processed by successive stages of the convolutional layer 914.

The linear activations can be processed by a detector stage 918. In the detector stage 918, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0, x)$, such that the activation is thresholded at zero.

The pooling stage 920 uses a pooling function that replaces the output of the convolutional layer 906 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 920, including max pooling, average pooling, and l2-norm pooling. Additionally, some CNN implementations do not include a pooling stage. Instead, such implementations substitute and additional convolution stage having an increased stride relative to previous convolution stages.

The output from the convolutional layer 914 can then be processed by the next layer 922. The next layer 922 can be an additional convolutional layer or one of the fully connected layers 908. For example, the first convolutional layer 904 of FIG. 9A can output to the second convolutional layer 906, while the second convolutional layer can output to a first layer of the fully connected layers 908.

Figure 10:
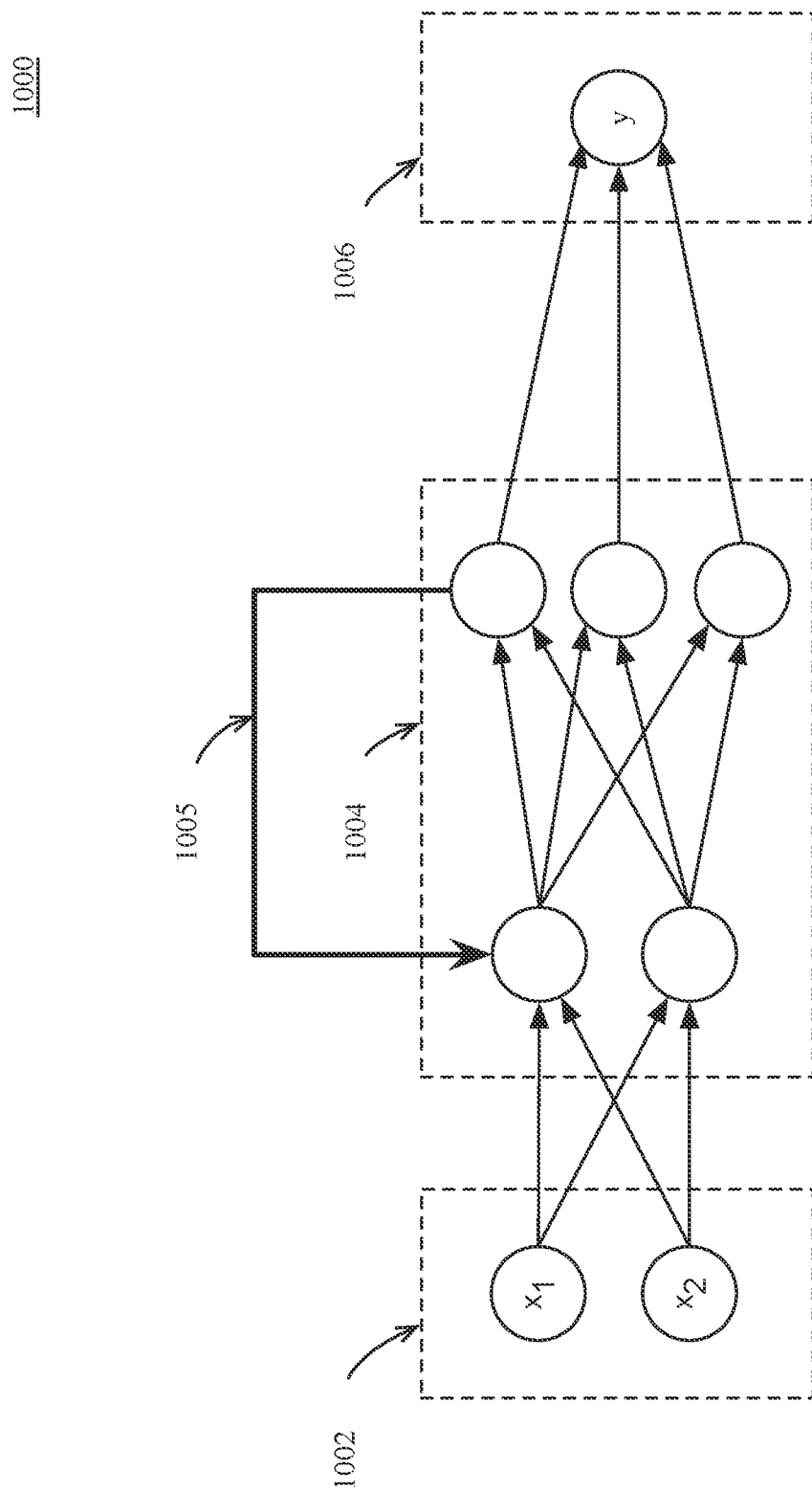
FIG. 10 illustrates an exemplary recurrent neural network.

FIG. 10 illustrates an exemplary recurrent neural network 1000. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 1000 can be described has having an input layer 1002 that receives an input vector, hidden layers 1004 to implement a recurrent function, a feedback mechanism 1005 to enable a 'memory' of previous states, and an output layer 1006 to output a result. The RNN 1000 operates based on time-steps. The state of the RNN at a given time step is influenced based on the previous time step via the feedback mechanism 1005. For a given time step, the state of the hidden layers 1004 is defined by the previous state and the input at the current time step. An initial input ($x_1$) at a first time step can be processed by the hidden layer 1004. A second input ($x_2$) can be processed by the hidden layer 1004 using state information that is determined during the processing of the initial input ($x_1$). A given state can be computed as $s_t = f(Ux_t + Ws_{t-1})$, where U and W are parameter matrices. The function $f$ is generally a non-linearity, such as the hyperbolic tangent function (Tan h) or a variant of the rectifier function $f(x) = max(0, x)$. However, the specific mathematical function used in the hidden layers 1004 can vary depending on the specific implementation details of the RNN 1000.

In addition to the basic CNN and RNN networks described, variations on those networks may be enabled. One example RNN variant is the long short term memory (LSTM) RNN. LSTM RNNs are capable of learning long-term dependencies that may be necessary for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimal initial set of weights for the neural network.

Figure 11:
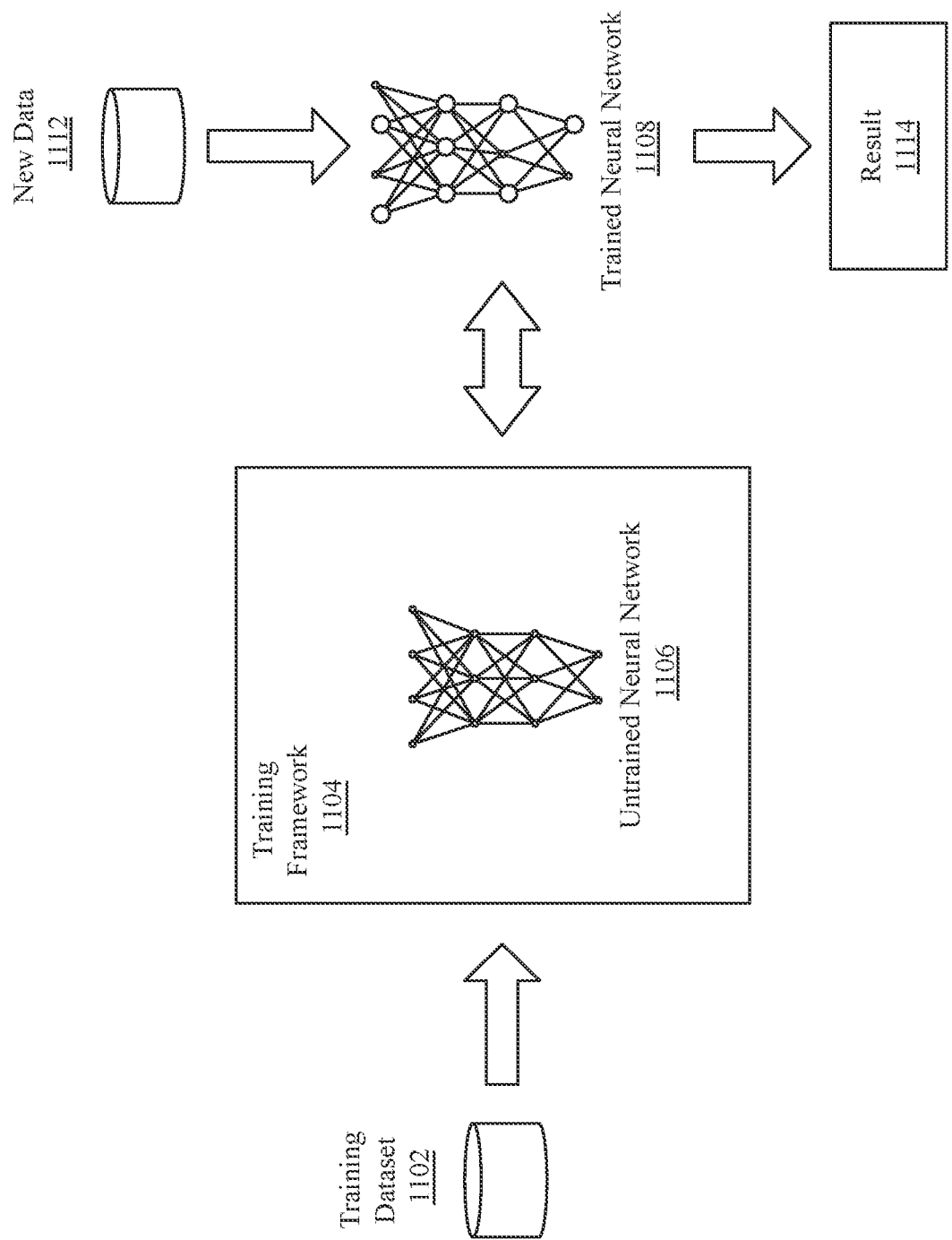
FIG. 11 illustrates training and deployment of a deep neural network.

FIG. 11 illustrates training and deployment of a deep neural network. Once a given network has been structured for a task the neural network is trained using a training dataset 1102. Various training frameworks 1104 have been developed to enable hardware acceleration of the training process. For example, the machine learning framework 604 of FIG. 6 may be configured as a training framework 604. The training framework 604 can hook into an untrained neural network 1106 and enable the untrained neural net to be trained using the parallel processing resources described herein to generate a trained neural net 1108.

To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1102 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1104 can adjust to adjust the weights that control the untrained neural network 1106. The training framework 1104 can provide tools to monitor how well the untrained neural network 1106 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural net 1108. The trained neural network 1108 can then be deployed to implement any number of machine learning operations to generate an inference result 1114 based on input of new data 1112.

Unsupervised learning is a learning method in which the network attempts to train itself using unlabeled data. Thus, for unsupervised learning the training dataset 1102 will include input data without any associated output data. The untrained neural network 1106 can learn groupings within the unlabeled input and can determine how individual inputs are related to the overall dataset. Unsupervised training can be used to generate a self-organizing map, which is a type of trained neural network 1108 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1102 includes a mix of labeled and unlabeled data of the same distribution. Incremental learning is a variant of supervised learning in which input data is continuously used to further train the model. Incremental learning enables the trained neural network 1108 to adapt to the new data 1112 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

Figure 12:
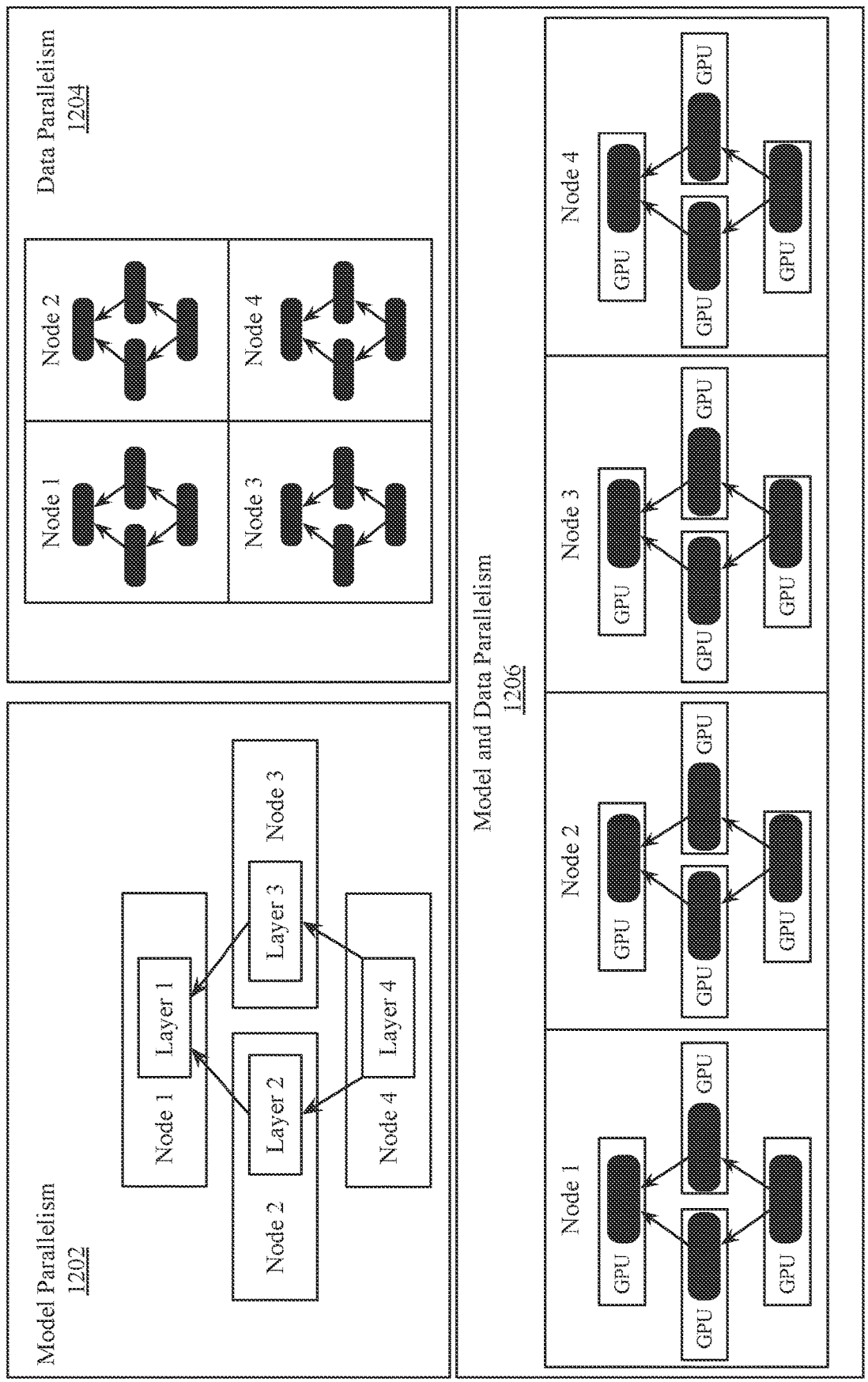
FIG. 12 is a block diagram illustrating distributed learning.

FIG. 12 is a block diagram illustrating distributed learning. Distributed learning is a training model that uses multiple distributed computing nodes to perform supervised or unsupervised training of a neural network. The distributed computational nodes can each include one or more host processors and one or more of the general-purpose processing nodes, such as the highly-parallel general-purpose graphics processing unit 700 as in FIG. 700. As illustrated, distributed learning can be performed model parallelism 1202, data parallelism 1204, or a combination of model and data parallelism 1204.

In model parallelism 1202, different computational nodes in a distributed system can perform training computations for different parts of a single network. For example, each layer of a neural network can be trained by a different processing node of the distributed system. The benefits of model parallelism include the ability to scale to particularly large models. Splitting the computations associated with different layers of the neural network enables the training of very large neural networks in which the weights of all layers would not fit into the memory of a single computational node. In some instances, model parallelism can be particularly useful in performing unsupervised training of large neural networks.

In data parallelism 1204, the different nodes of the distributed network have a complete instance of the model and each node receives a different portion of the data. The results from the different nodes are then combined. While different approaches to data parallelism are possible, data parallel training approaches all require a technique of combining results and synchronizing the model parameters between each node. Exemplary approaches to combining data include parameter averaging and update based data parallelism. Parameter averaging trains each node on a subset of the training data and sets the global parameters (e.g., weights, biases) to the average of the parameters from each node. Parameter averaging uses a central parameter server that maintains the parameter data. Update based data parallelism is similar to parameter averaging except that instead of transferring parameters from the nodes to the parameter server, the updates to the model are transferred. Additionally, update based data parallelism can be performed in a decentralized manner, where the updates are compressed and transferred between nodes.

Combined model and data parallelism 1206 can be implemented, for example, in a distributed system in which each computational node includes multiple GPUs. Each node can have a complete instance of the model with separate GPUs within each node are used to train different portions of the model.

Distributed training has increased overhead relative to training on a single machine. However, the parallel processors and GPGPUs described herein can each implement various techniques to reduce the overhead of distributed training, including techniques to enable high bandwidth GPU-to-GPU data transfer and accelerated remote data synchronization.

Exemplary Machine Learning Applications

Machine learning can be applied to solve a variety of technological problems, including but not limited to computer vision, autonomous driving and navigation, speech recognition, and language processing. Computer vision has traditionally been one of the most active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes the most probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Exemplary natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training. Exemplary parallel processors suited for training include the general-purpose graphics processing unit 700 of FIG. 700 and the multi-GPU computing system 800 of FIG. 800. On the contrary, deployed machine learning platforms generally include lower power parallel processors suitable for use in products such as cameras, autonomous robots, and autonomous vehicles.

Figure 13:
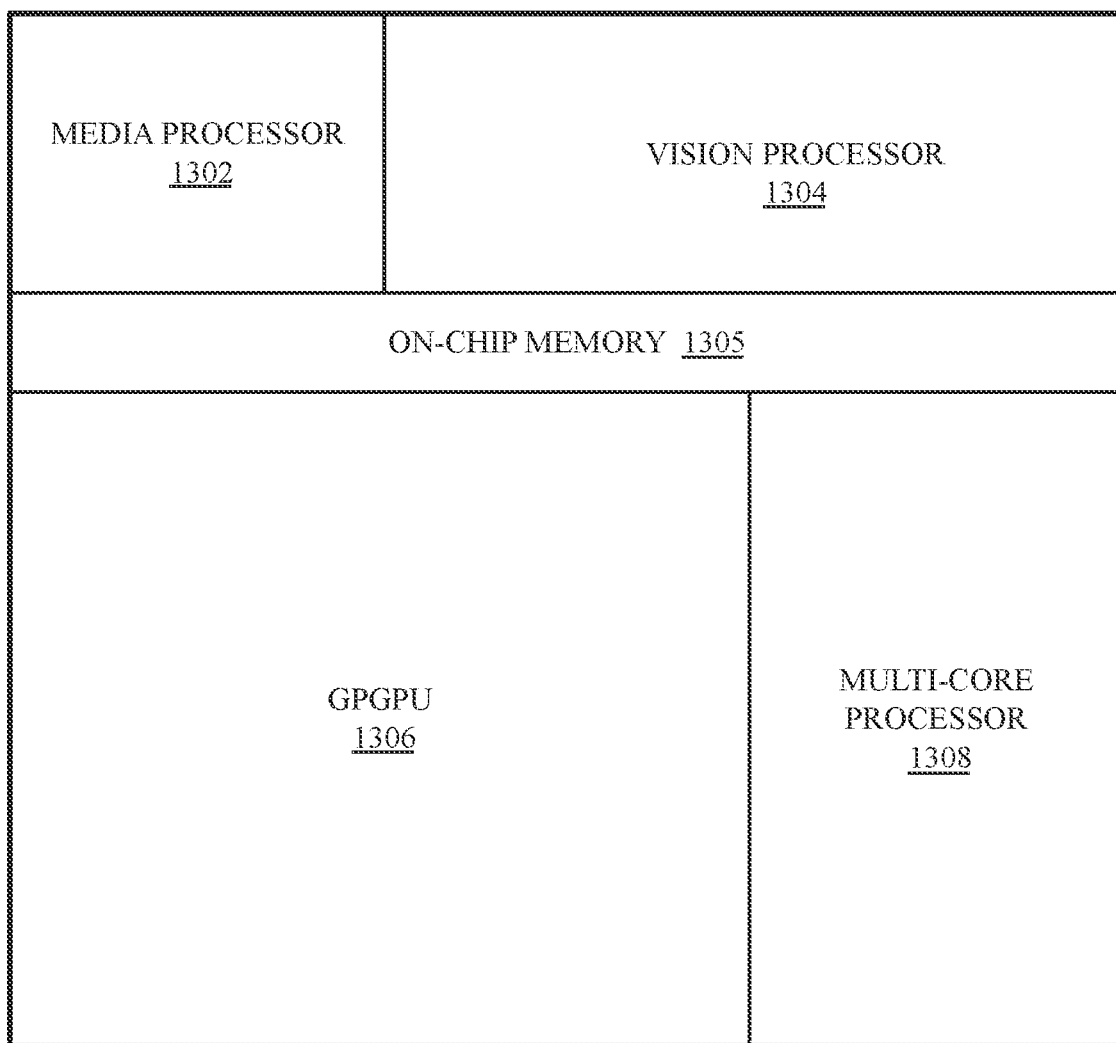
FIG. 13 illustrates an exemplary inferencing system on a chip (SOC) suitable for performing inferencing using a trained model.

FIG. 13 illustrates an exemplary inferencing system on a chip (SOC) 1300 suitable for performing inferencing using a trained model. The SOC 1300 can integrate processing components including a media processor 1302, a vision processor 1304, a GPGPU 1306 and a multi-core processor 1308. The SOC 1300 can additionally include on-chip memory 1305 that can enable a shared on-chip data pool that is accessible by each of the processing components. The processing components can be optimized for low power operation to enable deployment to a variety of machine learning platforms, including autonomous vehicles and autonomous robots. For example, one implementation of the SOC 1300 can be used as a portion of the main control system for an autonomous vehicle. Where the SOC 1300 is configured for use in autonomous vehicles the SOC is designed and configured for compliance with the relevant functional safety standards of the deployment jurisdiction.

During operation, the media processor 1302 and vision processor 1304 can work in concert to accelerate computer vision operations. The media processor 1302 can enable low latency decode of multiple high-resolution (e.g., 4K, 8K) video streams. The decoded video streams can be written to a buffer in the on-chip-memory 1305. The vision processor 1304 can then parse the decoded video and perform preliminary processing operations on the frames of the decoded video in preparation of processing the frames using a trained image recognition model. For example, the vision processor 1304 can accelerate convolution operations for a CNN that is used to perform image recognition on the high-resolution video data, while back end model computations are performed by the GPGPU 1306.

The multi-core processor 1308 can include control logic to assist with sequencing and synchronization of data transfers and shared memory operations performed by the media processor 1302 and the vision processor 1304. The multi-core processor 1308 can also function as an application processor to execute software applications that can make use of the inferencing compute capability of the GPGPU 1306.

For example, at least a portion of the navigation and driving logic can be implemented in software executing on the multi-core processor 1308. Such software can directly issue computational workloads to the GPGPU 1306 or the computational workloads can be issued to the multi-core processor 1308, which can offload at least a portion of those operations to the GPGPU 1306.

The GPGPU 1306 can include compute clusters such as a low power configuration of the compute clusters 706A-706H within general-purpose graphics processing unit 700. The compute clusters within the GPGPU 1306 can support instruction that are specifically optimized to perform inferencing computations on a trained neural network. For example, the GPGPU 1306 can support instructions to perform low precision computations such as 8-bit and 4-bit integer vector operations.

Data Prefetching to Cache for Graphics Data Processing

In general prefetching of data to cache is utilized to improve computing operation, including performance utilizing a graphics processor. An apparatus or system providing prefetching may include a graphics multiprocessor 234 illustrated in FIGS. 2C and 2D operating to prefetch data from one or more cache memories.

However, conventional operations do not provide for efficient prefetch operations in all cases, resulting in loss of performance in a graphics processing environment.

In some embodiments, an apparatus, system, or process provides for improvements in data prefetching for graphics data processing, including one or more of the following:

(1) Intelligent Prefetch to Cache Based on Cache Hit Rate;
(2) Cache Prefetch Enhancements;
(3) Cache Prefetch Enhancement to Squash Unnecessary Prefetches;
(4) Prefetch for Instruction Cache (I-Cache); or
(5) Exploiting Bandwidth Sources for Prefetching/Scrubbing.

Figure 14:
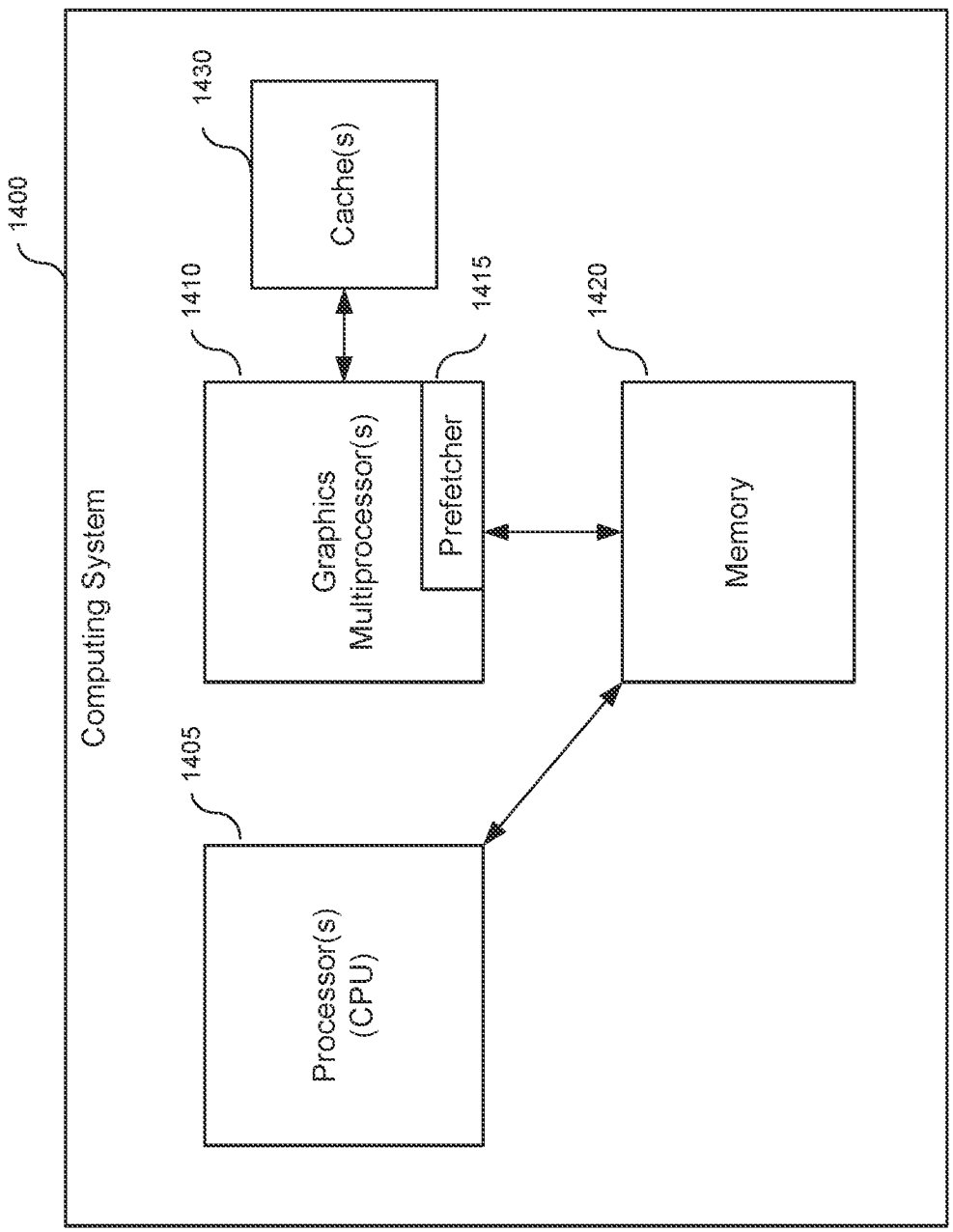
FIG. 14 is an illustration of data prefetching for graphics data processing according to some embodiments.

FIG. 14 is an illustration of data prefetching for graphics data processing according to some embodiments. As illustrated, a computer system 1400 includes one or more processors 1405, which may include a central processing (CPU) or other host processing element, and one or more graphics multiprocessors 1410. Each graphics multiprocessor may include a prefetcher 1415 to prefetch data. In addition to other processing, the one or more graphics multiprocessors 1410 are to provide for data pre-fetching by the prefetcher 1415 from a memory 1420 to one or more caches 1430 (which may include internal and external caches, and multiple cache levels, such as L1, L2, and L3 caches) for the purpose of graphics data processing.

In some embodiments, an apparatus, system (such as computing system), or process is to provide for prefetching operations as illustrated in FIGS. 15A to 19B.

Figure 15A:
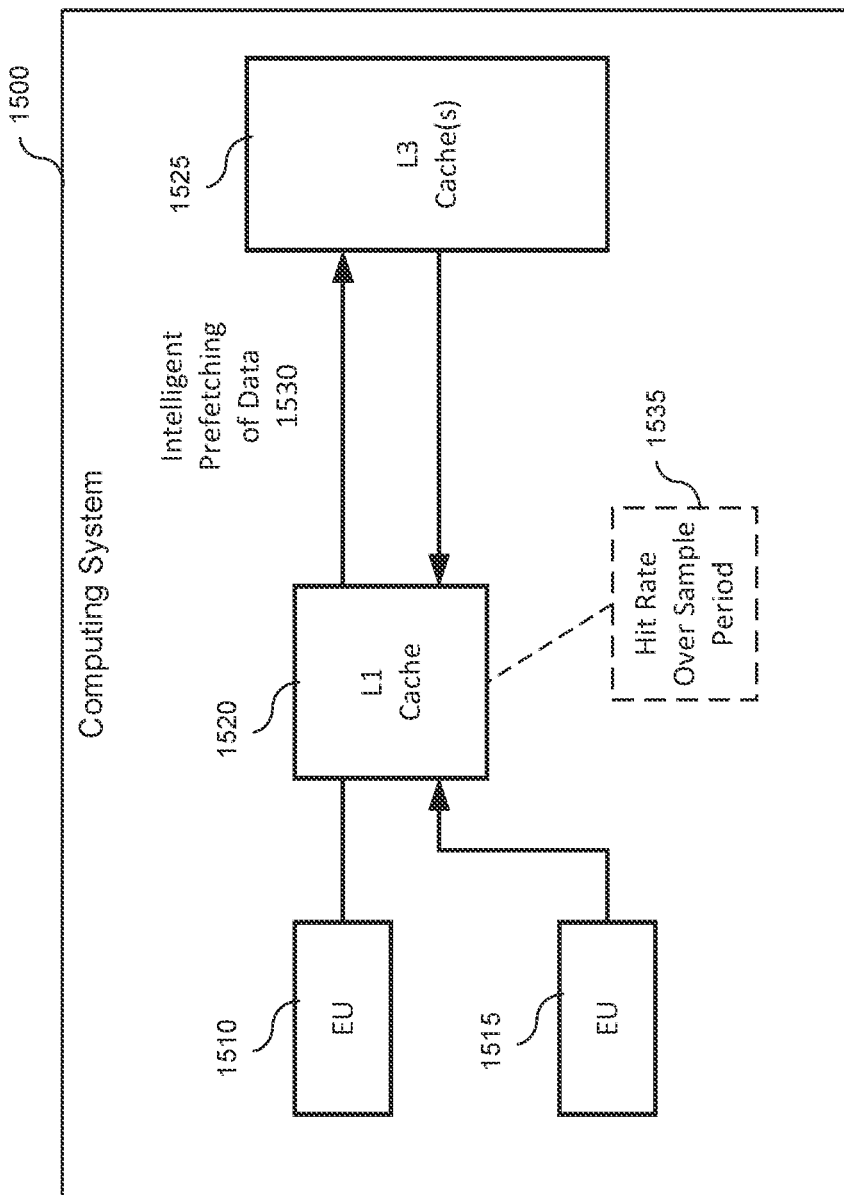
FIG. 15A is an illustration of intelligent prefetch to cache according to some embodiments.

FIG. 15A is an illustration of intelligent prefetch to cache according to some embodiments. In an apparatus or system, such as computing system 1500, current implementations are to initiate an instruction prefetch to one or more L3 caches 1525. There is an opportunity for better performance by the execution units (EUs) of a processor, illustrated as, for example, a first execution unit 1510 and a second execution unit 1515, by prefetching all the way to the L1 cache 1520. However, prefetching to the L1 cache 1520 can cause cache thrashing in which the pattern of accesses results in competition for the same cache lines in the L1 cache, and thus frequent eviction of data and high levels of cache misses. Thus, the thrashing of the L1 cache 1520 will reduce the performance of computing system 1500.

In some embodiments, an improved apparatus, system, or process is to provide intelligent prefetching of data 1530 wherein the data is prefetched to the L1 cache 1520 upon determining that the hit rate (or hit ratio) over a particular sampling period 1535 is low, such as a hit rate below a certain threshold value. The low hit rate thereby enables efficient data eviction from the L1 cache, and thus allows for prefetching all the way to the L1 cache. However, if the hit rate over the sample period is equal to or greater than the threshold value, then it may be concluded that that prefetching to the L1 cache 1520 would be inefficient, and thus prefetched data would remain only in the L3 cache(s) 1525.

Figure 15B:
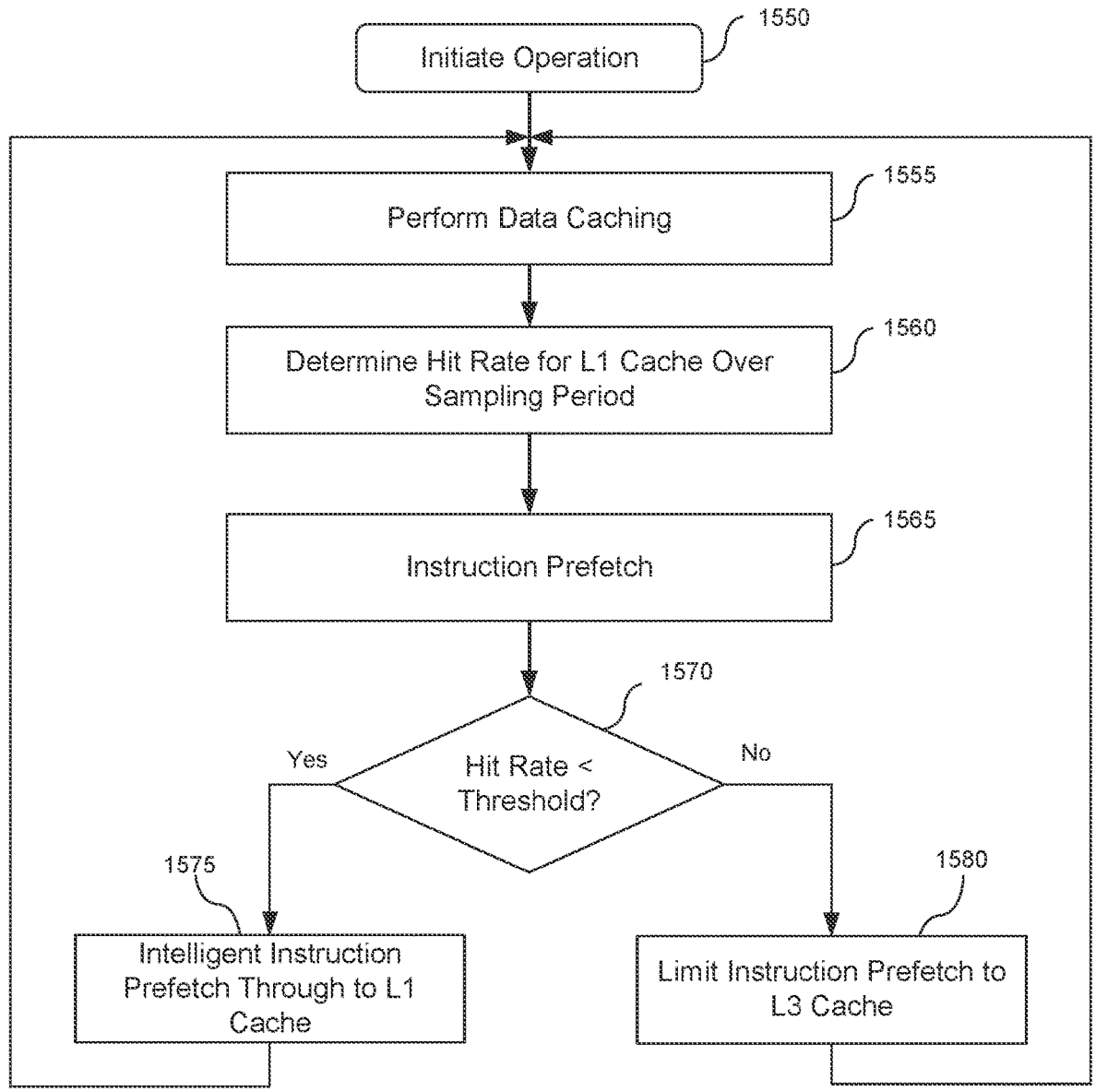
FIG. 15B is a flowchart to illustrate a process for intelligent prefetch to cache according to some embodiments.

FIG. 15B is a flowchart to illustrate a process for intelligent prefetch to cache according to some embodiments. In some embodiments, a process for intelligent prefetching includes initiating an operation in a computing environment 1550. The process then provides for performing caching 1555, wherein the caching includes caching to at least an L1 cache and an L3 cache, such as the L1 cache 1520 and the L3 cache 1525 illustrated in FIG. 15A.

In some embodiments, the process includes measuring or determining a hit rate (or hit ratio, or other similar measure of cache hits) over a certain sample period 1560. Upon there being an operation that results in an instruction prefetch 1565, there is a determination whether the hit rate is less than a certain threshold 1570. If so, then an intelligent instruction prefetch may be made through to the L1 cache 1575 because the low hit rate indicates a low probability of cache thrashing in the L1 cache. However, if the hit rate is instead equal to or greater than the threshold, then the instruction prefetch is limited to the L3 cache 1580 to avoid cache thrashing in the L1 cache.

Figure 16A:
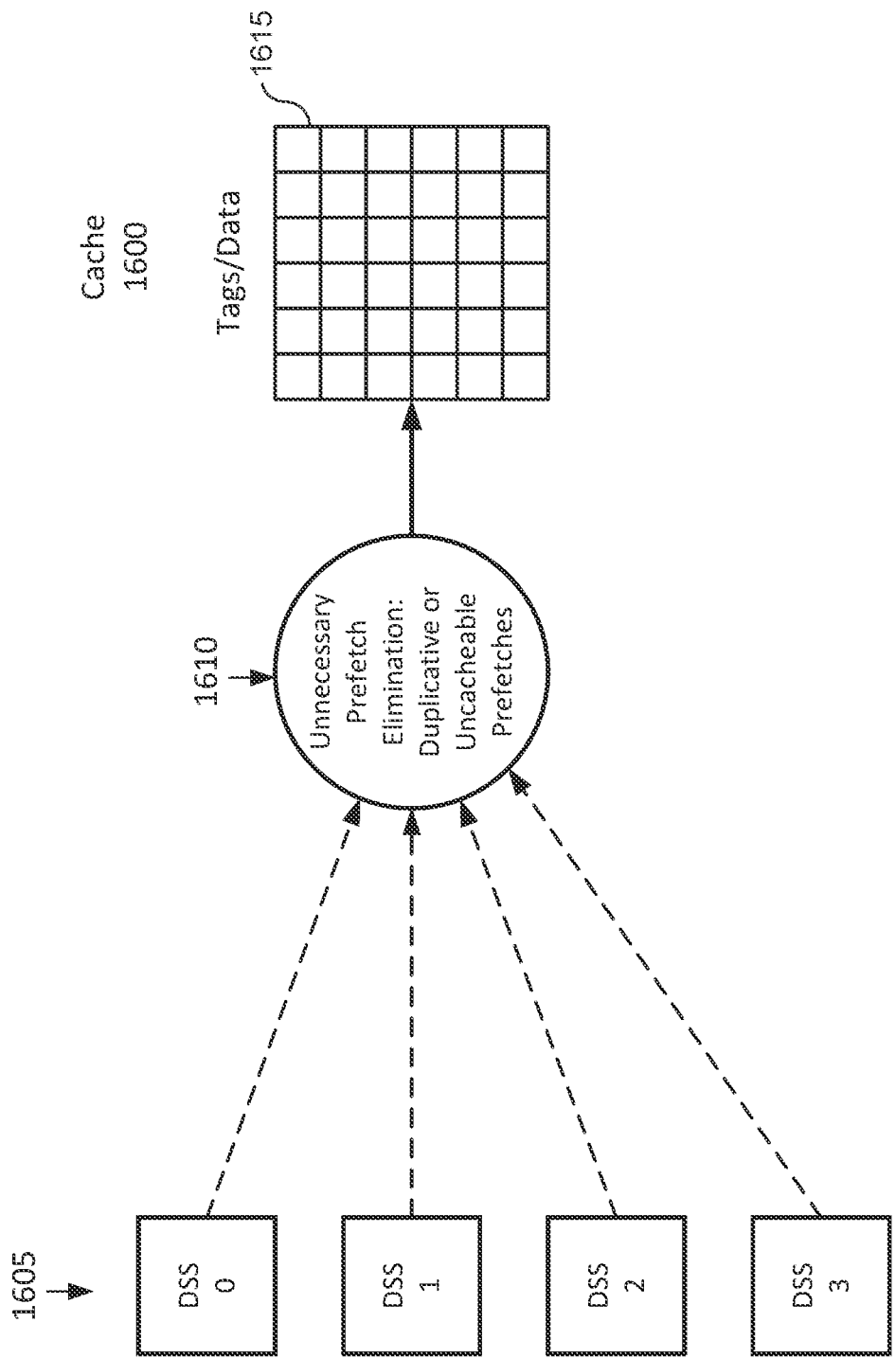
FIG. 16A is an illustration of cache prefetch enhancement to eliminate unnecessary prefetches according to some embodiments.

FIG. 16A is an illustration of cache prefetch enhancement to eliminate unnecessary prefetches according to some embodiments. Prefetching of cache data can result in significant improvement in system performance However, there are certain unnecessary prefetches that do not add to performance. In particular, duplicative prefetches with the same address do not provide any additional cache information, and prefetches that relate to data that is uncacheable will not result in any cached data. Thus, these prefetches are unnecessary or unproductive and can be eliminated without negatively affecting the cache operation.

In some embodiments, an apparatus, system, or process is to eliminate unnecessary prefetches. Specifically, the apparatus, system, or process is to eliminate (i.e., squash, flush, or clear) prefetches that are recognized to have duplicative addresses of another prefetch or are directed to uncacheable data. The elimination of these unnecessary prefetches can assist in reducing power consumption in a computing system.

As shown in FIG. 16A, multiple DSS, shown as DSS 0, DSS 1, DSS 2, and DSS 3, are providing prefetches for a cache 1600, shown as providing storage of tags and cached data 1615. In some embodiments, an apparatus, system, or process includes an interface 1610 or other element to evaluate the prefetches and eliminate prefetches that are unnecessary. In particular, the interface 1610 is compare the prefetches received from the DSS to detect any prefetches having a duplicate address, and to squash one or more prefetches having the duplicate address such that only a single prefetch with the address is provided. Further, the interface is to evaluate the prefetches to determine if any prefetch is directed to data that is uncacheable, and to drop such requests.

Figure 16B:
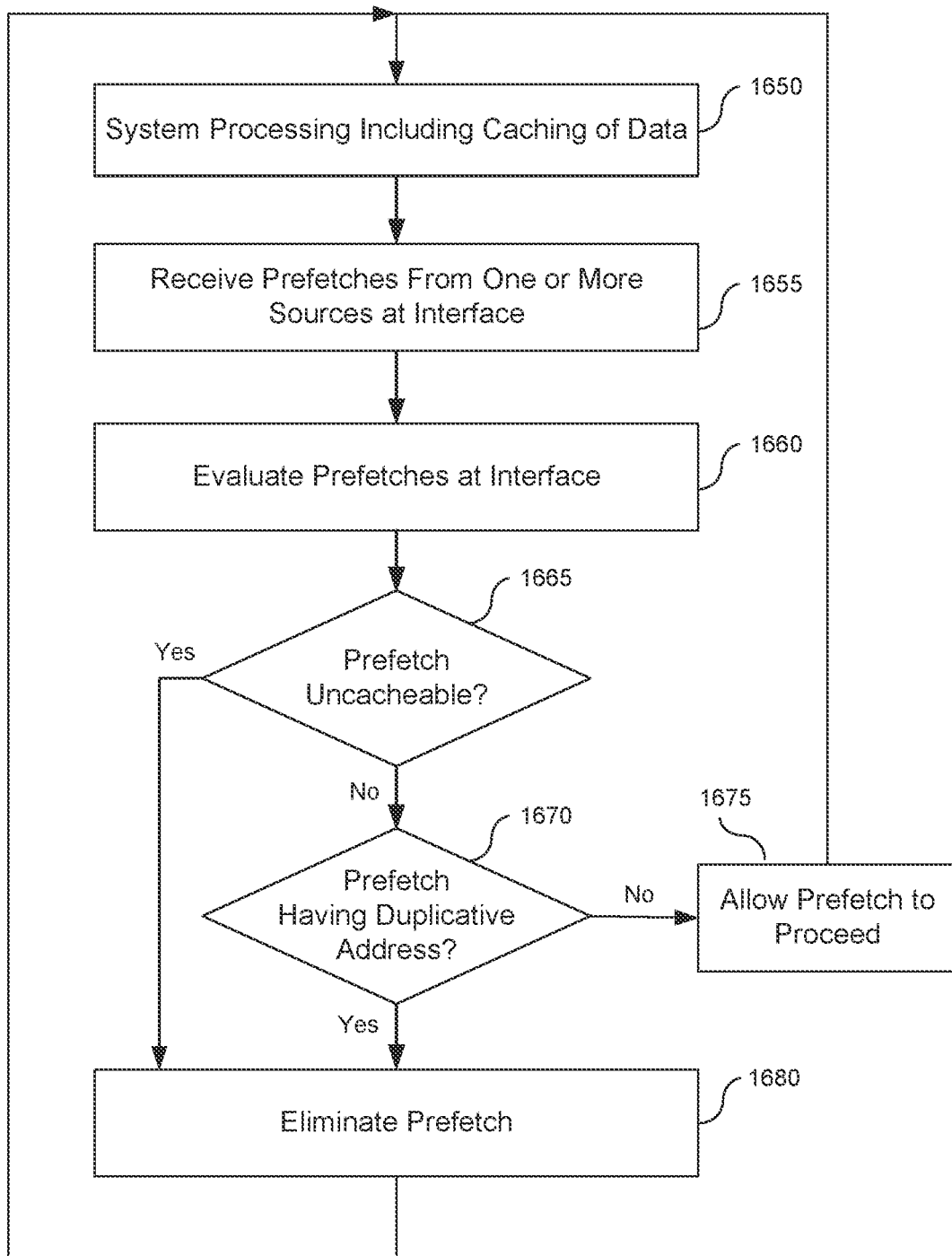
FIG. 16B is a flowchart to illustrate a process to squash unnecessary prefetches according to some embodiments.

FIG. 16B is a flowchart to illustrate a process to eliminate unnecessary prefetches according to some embodiments. As illustrated in FIG. 16B, a process includes system processing including caching of data 1650, wherein this may include processing with a computing system such as computing system 100 illustrated in FIG. 1. The process may include receiving prefetches from one or more sources at an interface 1655, wherein the interface may be the interface 1610 illustrated in FIG. 16A. In some embodiments, the prefetches are evaluated at the interface 1660, such evaluation enabling the elimination of unproductive prefetches.

The process continues with a determination whether the prefetch is uncacheable 1665. If so, the prefetch is to be eliminated 1680, and the process continues with the system processing 1650. If not, there is a further determination whether prefetch has an address that is a duplicate of another prefetch 1670, and, if so, one or more duplicate prefetches are eliminated 1680. If not, then the prefetch is allowed to proceed 1675.

While the determinations 1665 and 1670 are illustrated in a particular order for purposes of illustration, embodiments are not limited to this example. The determinations may be made in a different order or at the same or an overlapping time, depending on the implementation. Further, other determinations may further be included to identify other unproductive prefetches that can be eliminated before such prefetches are processed.

Figure 17:
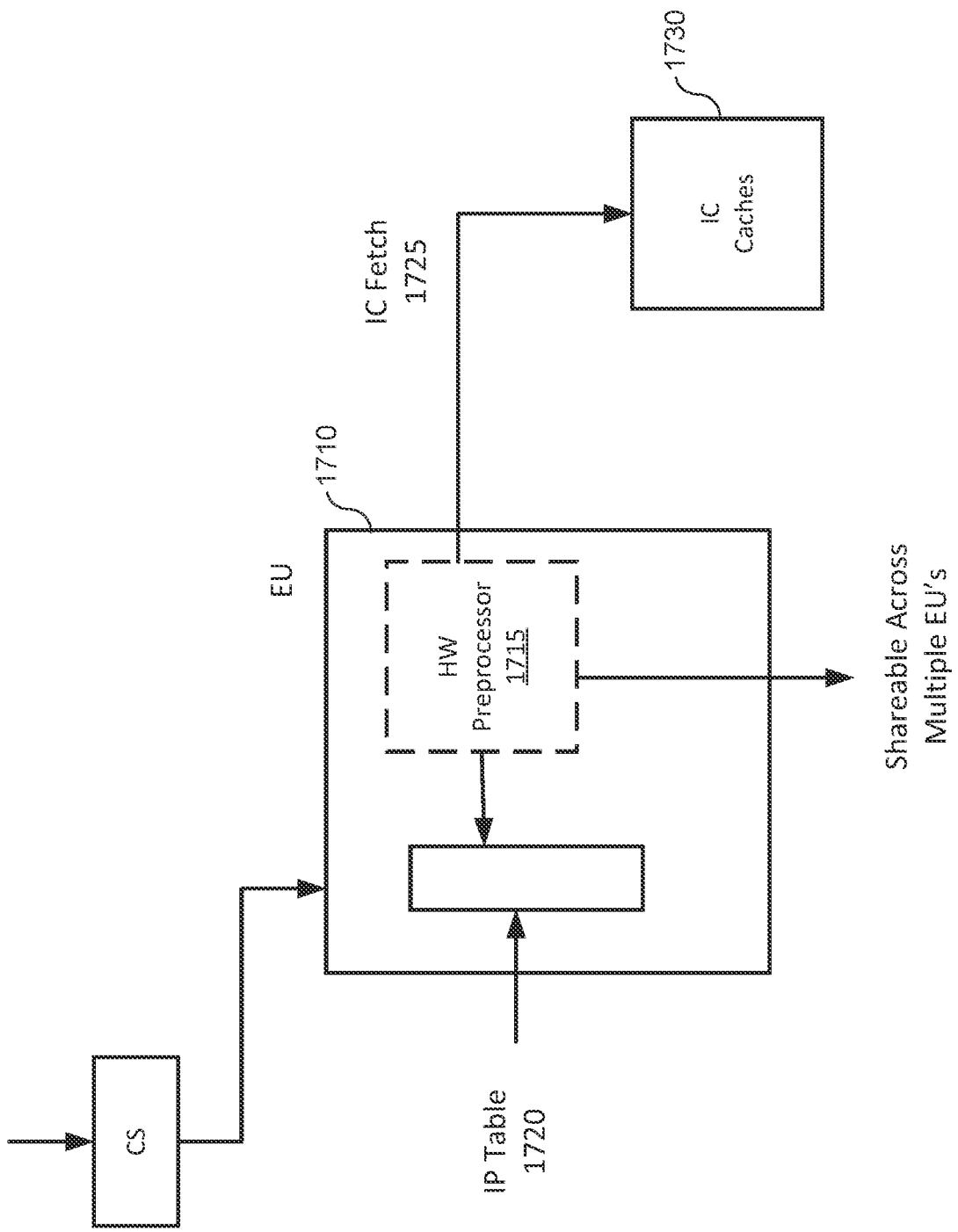
FIG. 17 is an illustration of speculative prefetch according to some embodiments.

FIG. 17 is an illustration of speculative prefetch according to some embodiments. Instruction prefetch is conventionally based on a thread executing an instruction, and at that point prefetching a next N cache lines. However, there can be issues regarding the latency of prefetches with this process.

In some embodiments, and apparatus, system, or process provides support for a higher performant speculative instruction prefetch with a hardware preprocessor. In some embodiments, an execution unit (EU) 1710 of a processor utilizes a hardware preprocessor 1715 that has access to a table of IP (Internet Protocol) addresses 1720 that the kernel is using.

In some embodiments, the hardware preprocessor 1715 is to commence prefetching IP addresses ahead of thread execution, which can significantly reduce fetch latency. In some embodiments, the hardware preprocessor 1715 is a hardware element that is shareable across multiple EUs of a processor.

In some embodiments, the table of IP addresses 1720 is loaded based on either software generating sequences of IP addresses that the kernel is utilizing, or based on generating a stride that can be used to identify and load the IP addresses.

Figure 18:
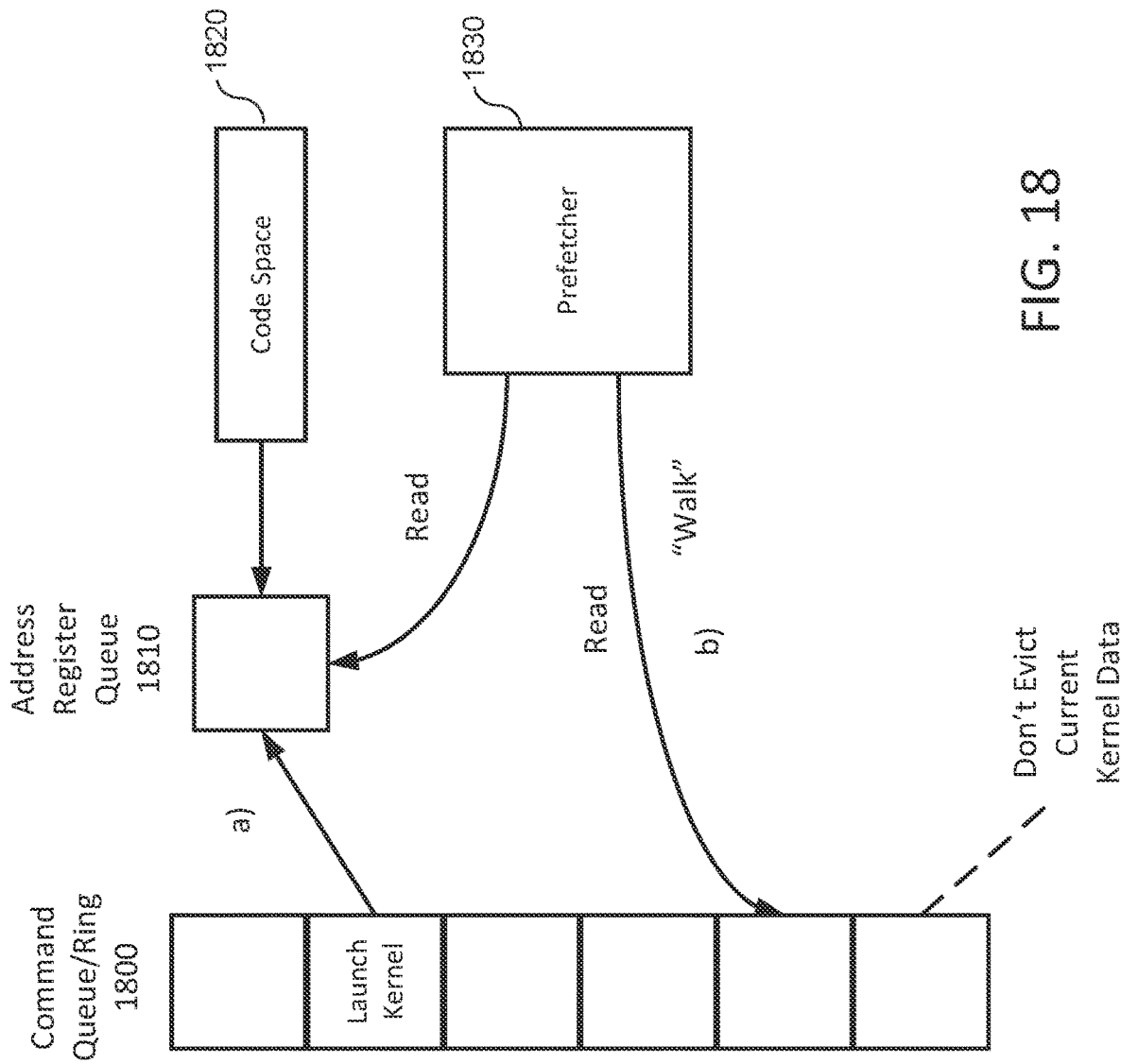
FIG. 18 is an illustration of prefetch for an instruction cache according to some embodiments.

FIG. 18 is an illustration of prefetch for an instruction cache according to some embodiments. In some embodiments, prefetch is to be made directly into the I-cache (Instruction cache). In this operation:

(i) The application driver is aware of the next kernel.
(ii) There is a command to load block instructions into I code (instruction code).
(iii) A prefetch is issued for the next kernel when starting execution of the current kernel.

In some embodiments, this process addresses the problem of kernels that are short running but have large instruction counts. Currently the prefetch is performed as the current kernel executes, thus potentially causing stalls in such circumstances.

In some embodiments, as illustrated in FIG. 18, a hardware prefetcher communicates with a command queue/ring 1800 through the following:
  a) An address register queue 1810 (ring→prefetcher), shown as receiving from code space 1820.
  b) A prefetcher 1830 is to read the command queue/ring 1800 (prefetcher→ring).

Figure 19B:
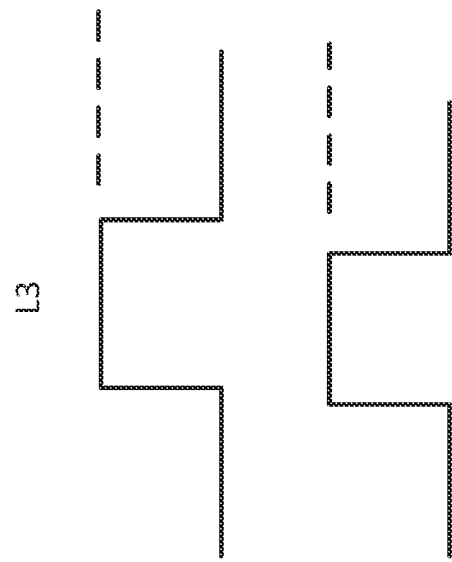
FIG. 19B is an illustration of activity of L3 cache and memory activity to be utilized in exploitation of bandwidth sources for prefetching/scrubbing to some embodiments.
Figure 19A:
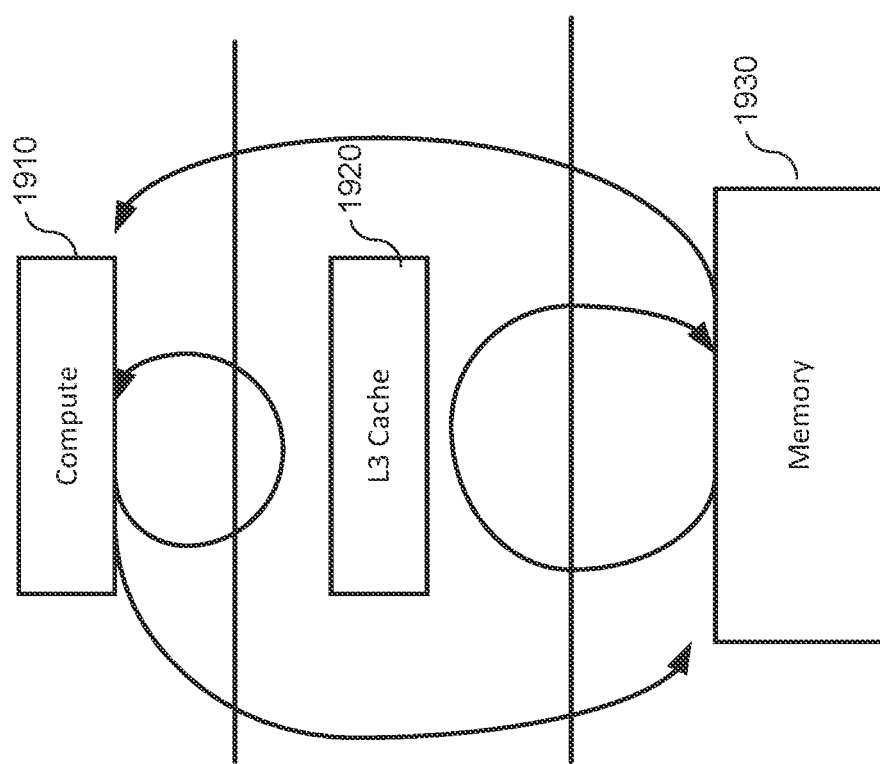
FIG. 19A is an illustration of exploitation of bandwidth sources for prefetching/scrubbing according to some embodiments.

FIG. 19A is an illustration of exploitation of bandwidth sources for prefetching/scrubbing according to some embodiments. FIG. 19A illustrates compute operation 1910, an L3 cache 1920, and memory 1930. In operation, when the compute operation 1910 is operating out of the L3 cache 1920, the memory 1930 is idle. In some embodiments, in this circumstance, an apparatus, system, or process is to use the memory link for memory 1930 to perform memory scrubbing in order to keep the memory bandwidth active. In some embodiments, an apparatus, system, or process is to maintain operation to gauge L3 and memory activity, and trigger activities (prefetching and scrubbing) based at least in part the determination of L3 cache and memory activity.

FIG. 19B is an illustration of activity of L3 cache and memory activity to be utilized in exploitation of bandwidth sources for prefetching/scrubbing to some embodiments.

Figure 20:
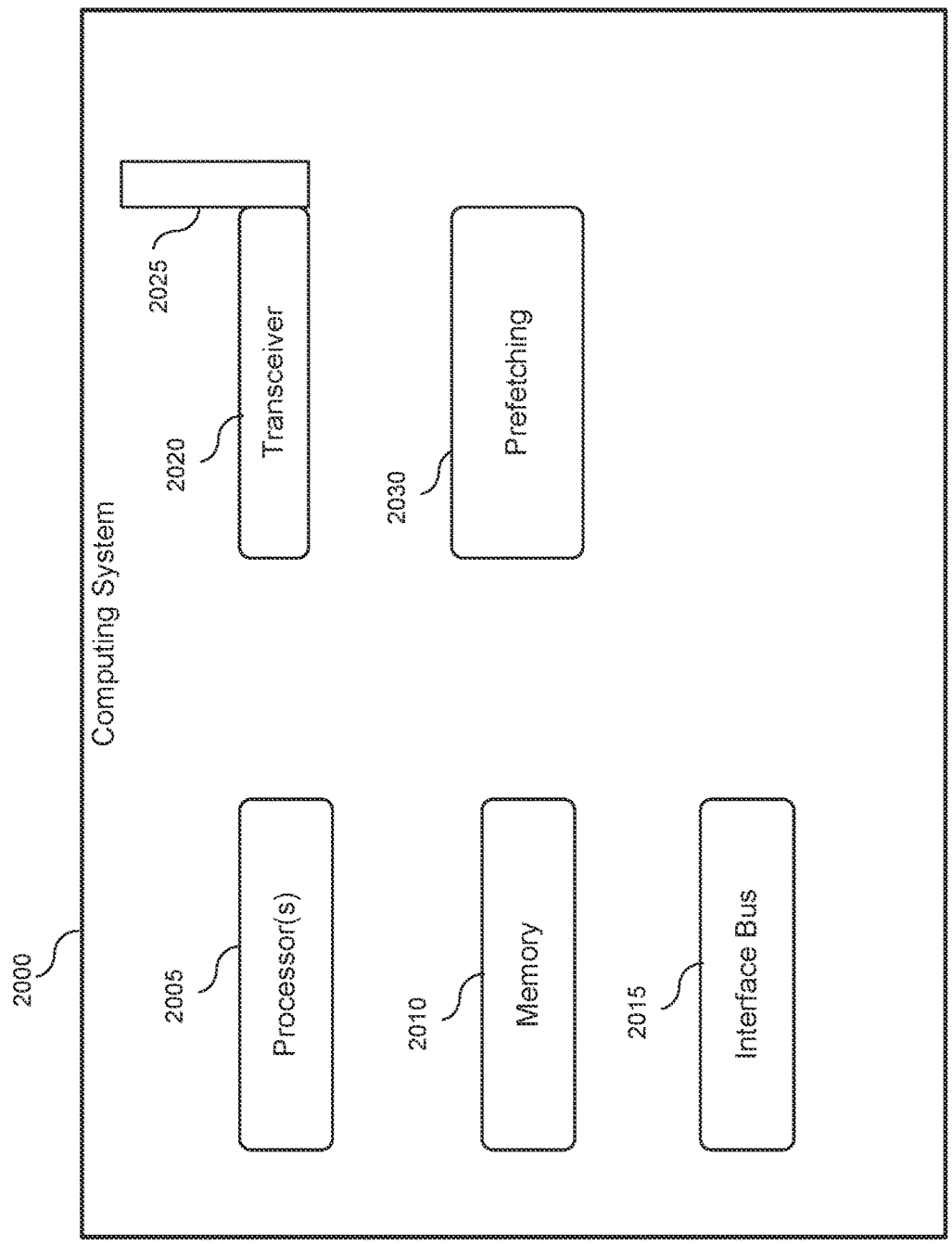
FIG. 20 is an illustration of an apparatus or system to provide for data prefetching for graphics data processing, according to some embodiments.

FIG. 20 is an illustration of an apparatus or system to provide for data prefetching for graphics data processing, according to some embodiments. As illustrated in FIG. 20, a computing system 2000, such as, for example, system 100 illustrated in FIG. 1, includes one or more processors 2005 for the processing of data, such as one or more processors 102 and one or more parallel processor(s) 112 incorporating circuitry optimized for graphics and video processing, including, for example, video output circuitry, and constituting a graphics processing unit (GPU), as shown in FIG. 1. The computing system 2000 further includes memory 2010 for the storage of data and one or more elements for the transfer of data, such as interface bus 2015 and transceiver 2020. In some embodiments, the transceiver 2020 is a wireless transceiver with one or more antennas 2025 for transmission and reception of data, wherein the antennas 2025 may include a dipole antenna or other antenna structure.

In some embodiments, the computing system 2000 further includes prefetching 2030 to provide for enhanced prefetching operations as illustrated in FIGS. 15A to 19B.

System Overview

Figure 21:
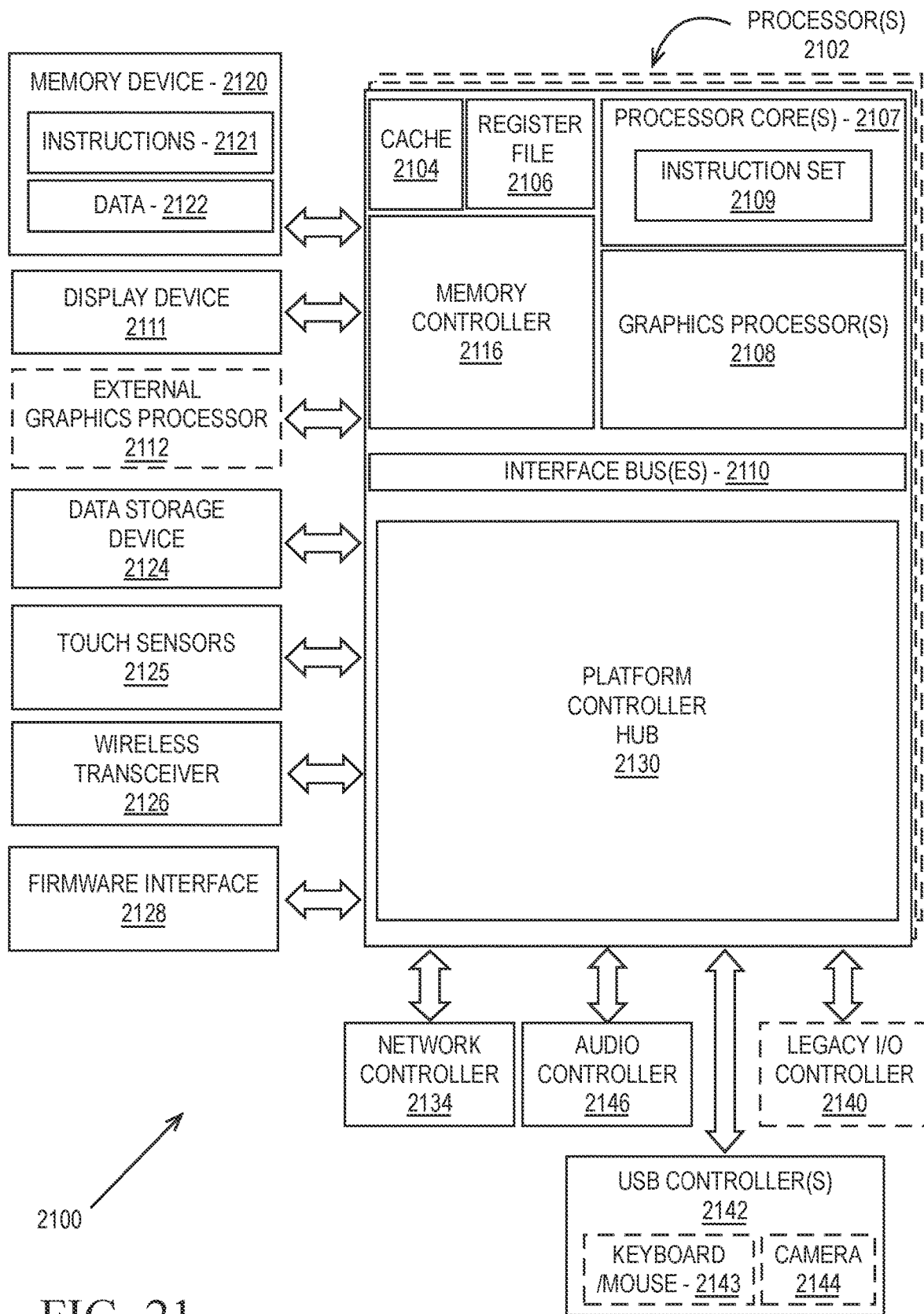
FIG. 21 is a block diagram of a processing system, according to an embodiment.

FIG. 21 is a block diagram of a processing system 2100, according to an embodiment. System 2100 may be used in a single processor desktop system, a multiprocessor workstation system, or a server system having a large number of processors 2102 or processor cores 2107. In one embodiment, the system 2100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 2100 can include, couple with, or be integrated within: a server-based gaming platform; a game console, including a game and media console; a mobile gaming console, a handheld game console, or an online game console. In some embodiments the system 2100 is part of a mobile phone, smart phone, tablet computing device or mobile Internet-connected device such as a laptop with low internal storage capacity. Processing system 2100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 2100 includes or is part of a television or set top box device.

In some embodiments, system 2100 can include, couple with, or be integrated within a self-driving vehicle such as a bus, tractor trailer, car, motor or electric power cycle, plane or glider (or any combination thereof). The self-driving vehicle may use system 2100 to process the environment sensed around the vehicle.

In some embodiments, the one or more processors 2102 each include one or more processor cores 2107 to process instructions which, when executed, perform operations for system or user software. In some embodiments, at least one of the one or more processor cores 2107 is configured to process a specific instruction set 2109. In some embodiments, instruction set 2109 may facilitate Complex Instruction Set Computing (CISC), Reduced Instruction Set Computing (RISC), or computing via a Very Long Instruction Word (VLIW). One or more processor cores 2107 may process a different instruction set 2109, which may include instructions to facilitate the emulation of other instruction sets. Processor core 2107 may also include other processing devices, such as a Digital Signal Processor (DSP).

In some embodiments, the processor 2102 includes cache memory 2104. Depending on the architecture, the processor 2102 can have a single internal cache or multiple levels of internal cache. In some embodiments, the cache memory is shared among various components of the processor 2102. In some embodiments, the processor 2102 also uses an external cache (e.g., a Level-3 (L3) cache or Last Level Cache (LLC)) (not shown), which may be shared among processor cores 2107 using known cache coherency techniques. A register file 2106 can be additionally included in processor 2102 and may include different types of registers for storing different types of data (e.g., integer registers, floating point registers, status registers, and an instruction pointer register). Some registers may be general-purpose registers, while other registers may be specific to the design of the processor 2102.

In some embodiments, one or more processor(s) 2102 are coupled with one or more interface bus(es) 2110 to transmit communication signals such as address, data, or control signals between processor 2102 and other components in the system 2100. The interface bus 2110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 2102 include an integrated memory controller 2116 and a platform controller hub 2130. The memory controller 2116 facilitates communication between a memory device and other components of the system 2100, while the platform controller hub (PCH) 2130 provides connections to I/O devices via a local I/O bus.

The memory device 2120 can be a dynamic random access memory (DRAM) device, a static random access memory (SRAM) device, flash memory device, phase-change memory device, or some other memory device having suitable performance to serve as process memory. In one embodiment the memory device 2120 can operate as system memory for the system 2100, to store data 2122 and instructions 2121 for use when the one or more processors 2102 executes an application or process. Memory controller 2116 also couples with an optional external graphics processor 2112, which may communicate with the one or more graphics processors 2108 in processors 2102 to perform graphics and media operations. In some embodiments, graphics, media, and or compute operations may be assisted by an accelerator 2112, which is a coprocessor that can be configured to perform a specialized set of graphics, media, or compute operations. For example, in one embodiment the accelerator 2112 is a matrix multiplication accelerator used to optimize machine learning or compute operations. In one embodiment the accelerator 2112 is a ray-tracing accelerator that can be used to perform ray-tracing operations in concert with the graphics processor 2108. In some embodiments a display device 2111 can connect to the processor(s) 2102. The display device 2111 can be one or more of an internal display device, as in a mobile electronic device or a laptop device or an external display device attached via a display interface (e.g., DisplayPort, etc.). In one embodiment the display device 2111 can be a head mounted display (HMD) such as a stereoscopic display device for use in virtual reality (VR) applications or augmented reality (AR) applications.

In some embodiments the platform controller hub 2130 enables peripherals to connect to memory device 2120 and processor 2102 via a high-speed I/O bus. The I/O peripherals include, but are not limited to, an audio controller 2146, a network controller 2134, a firmware interface 2128, a wireless transceiver 2126, touch sensors 2125, a data storage device 2124 (e.g., non-volatile memory, volatile memory, hard disk drive, flash memory, NAND, 3D NAND, 3D XPoint, etc.). The data storage device 2124 can connect via a storage interface (e.g., SATA) or via a peripheral bus, such as a Peripheral Component Interconnect bus (e.g., PCI, PCI Express). The touch sensors 2125 can include touch screen sensors, pressure sensors, or fingerprint sensors. The wireless transceiver 2126 can be a Wi-Fi transceiver, a Bluetooth transceiver, or a mobile network transceiver such as a 3G, 4G, 5G, or Long Term Evolution (LTE) transceiver. The firmware interface 2128 enables communication with system firmware, and can be, for example, a unified extensible firmware interface (UEFI). The network controller 2134 can enable a network connection to a wired network. In some embodiments, a high-performance network controller (not shown) couples with the interface bus 2110. The audio controller 2146, in one embodiment, is a multi-channel high definition audio controller. In one embodiment the system 2100 includes an optional legacy I/O controller 2140 for coupling legacy (e.g., Personal System 2 (PS/2)) devices to the system. The platform controller hub 2130 can also connect to one or more Universal Serial Bus (USB) controllers 2142 connect input devices, such as keyboard and mouse 2143 combinations, a camera 2144, or other USB input devices.

It will be appreciated that the system 2100 shown is exemplary and not limiting, as other types of data processing systems that are differently configured may also be used. For example, an instance of the memory controller 2116 and platform controller hub 2130 may be integrated into a discreet external graphics processor, such as the external graphics processor 2112. In one embodiment the platform controller hub 2130 and/or memory controller 2116 may be external to the one or more processor(s) 2102. For example, the system 2100 can include an external memory controller 2116 and platform controller hub 2130, which may be configured as a memory controller hub and peripheral controller hub within a system chipset that is in communication with the processor(s) 2102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 2100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Figure 22:
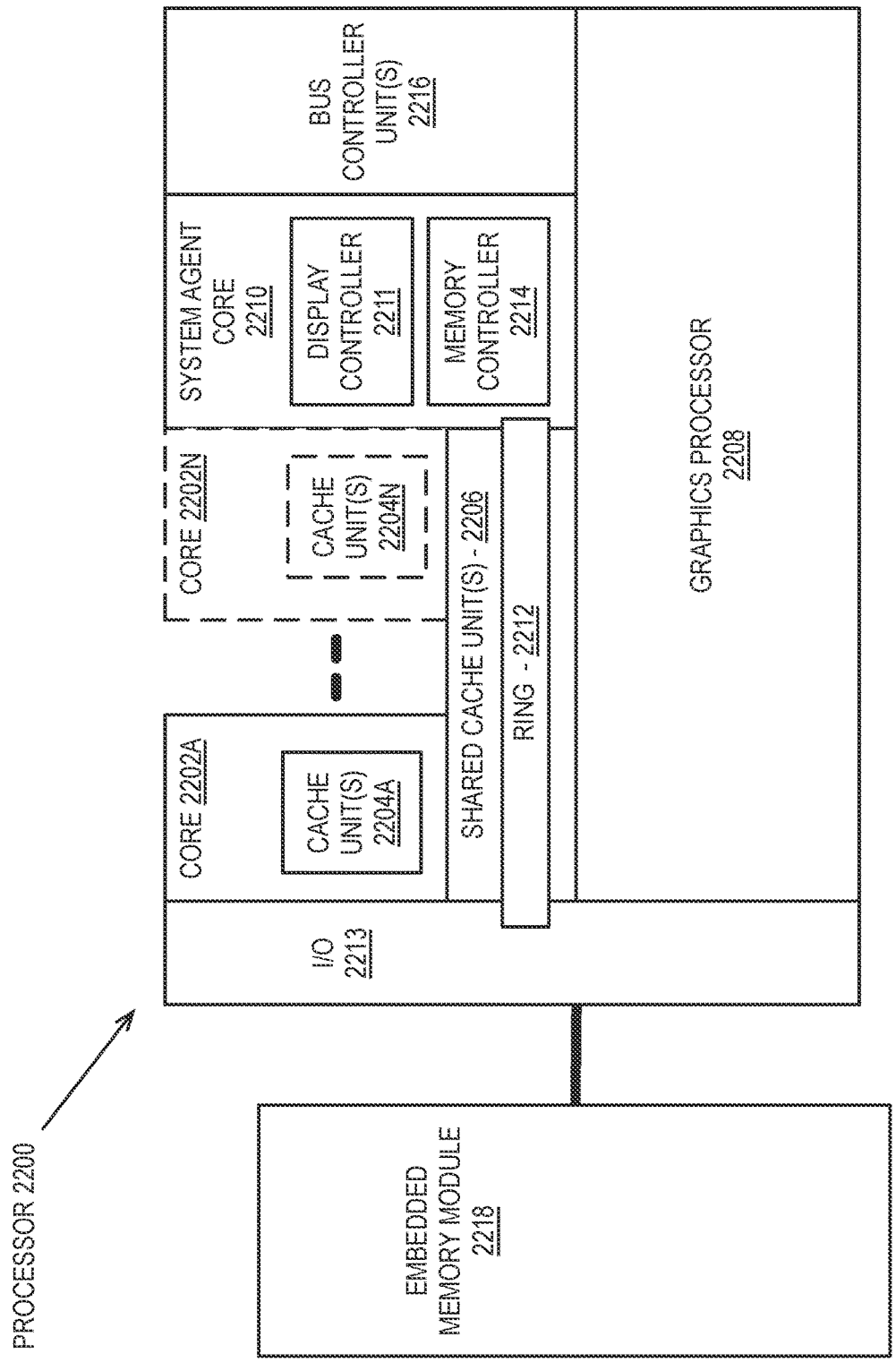
FIG. 22 is a block diagram of a processor according to an embodiment.

FIG. 22 is a block diagram of an embodiment of a processor 2200 having one or more processor cores 2202A-2202N, an integrated memory controller 2214, and an integrated graphics processor 2208. Those elements of FIG. 22 having the same reference numbers (or names) as the elements of any other figure herein can operate or function in any manner similar to that described elsewhere herein, but are not limited to such. Processor 2200 can include additional cores up to and including additional core 2202N represented by the dashed lined boxes. Each of processor cores 2202A-2202N includes one or more internal cache units 2204A-2204N. In some embodiments each processor core also has access to one or more shared cached units 2206.

The internal cache units 2204A-2204N and shared cache units 2206 represent a cache memory hierarchy within the processor 2200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 2206 and 2204A-2204N.

In some embodiments, processor 2200 may also include a set of one or more bus controller units 2216 and a system agent core 2210. The one or more bus controller units 2216 manage a set of peripheral buses, such as one or more PCI or PCI express busses. System agent core 2210 provides management functionality for the various processor components. In some embodiments, system agent core 2210 includes one or more integrated memory controllers 2214 to manage access to various external memory devices (not shown).

In some embodiments, one or more of the processor cores 2202A-2202N include support for simultaneous multi-threading. In such embodiment, the system agent core 2210 includes components for coordinating and operating cores 2202A-2202N during multi-threaded processing. System agent core 2210 may additionally include a power control unit (PCU), which includes logic and components to regulate the power state of processor cores 2202A-2202N and graphics processor 2208.

In some embodiments, processor 2200 additionally includes graphics processor 2208 to execute graphics processing operations. In some embodiments, the graphics processor 2208 couples with the set of shared cache units 2206, and the system agent core 2210, including the one or more integrated memory controllers 2214. In some embodiments, the system agent core 2210 also includes a display controller 2211 to drive graphics processor output to one or more coupled displays. In some embodiments, display controller 2211 may also be a separate module coupled with the graphics processor via at least one interconnect, or may be integrated within the graphics processor 2208.

In some embodiments, a ring based interconnect unit 2212 is used to couple the internal components of the processor 2200. However, an alternative interconnect unit may be used, such as a point-to-point interconnect, a switched interconnect, or other techniques, including techniques well known in the art. In some embodiments, graphics processor 2208 couples with the ring interconnect 2212 via an I/O link 2213.

The exemplary I/O link 2213 represents at least one of multiple varieties of I/O interconnects, including an on package I/O interconnect which facilitates communication between various processor components and a high-performance embedded memory module 2218, such as an eDRAM module. In some embodiments, each of the processor cores 2202A-2202N and graphics processor 2208 can use embedded memory modules 2218 as a shared Last Level Cache.

In some embodiments, processor cores 2202A-2202N are homogenous cores executing the same instruction set architecture. In another embodiment, processor cores 2202A-2202N are heterogeneous in terms of instruction set architecture (ISA), where one or more of processor cores 2202A-2202N execute a first instruction set, while at least one of the other cores executes a subset of the first instruction set or a different instruction set. In one embodiment, processor cores 2202A-2202N are heterogeneous in terms of microarchitecture, where one or more cores having a relatively higher power consumption couple with one or more power cores having a lower power consumption. In one embodiment, processor cores 2202A-2202N are heterogeneous in terms of computational capability. Additionally, processor 2200 can be implemented on one or more chips or as an SoC integrated circuit having the illustrated components, in addition to other components.

Figure 23:
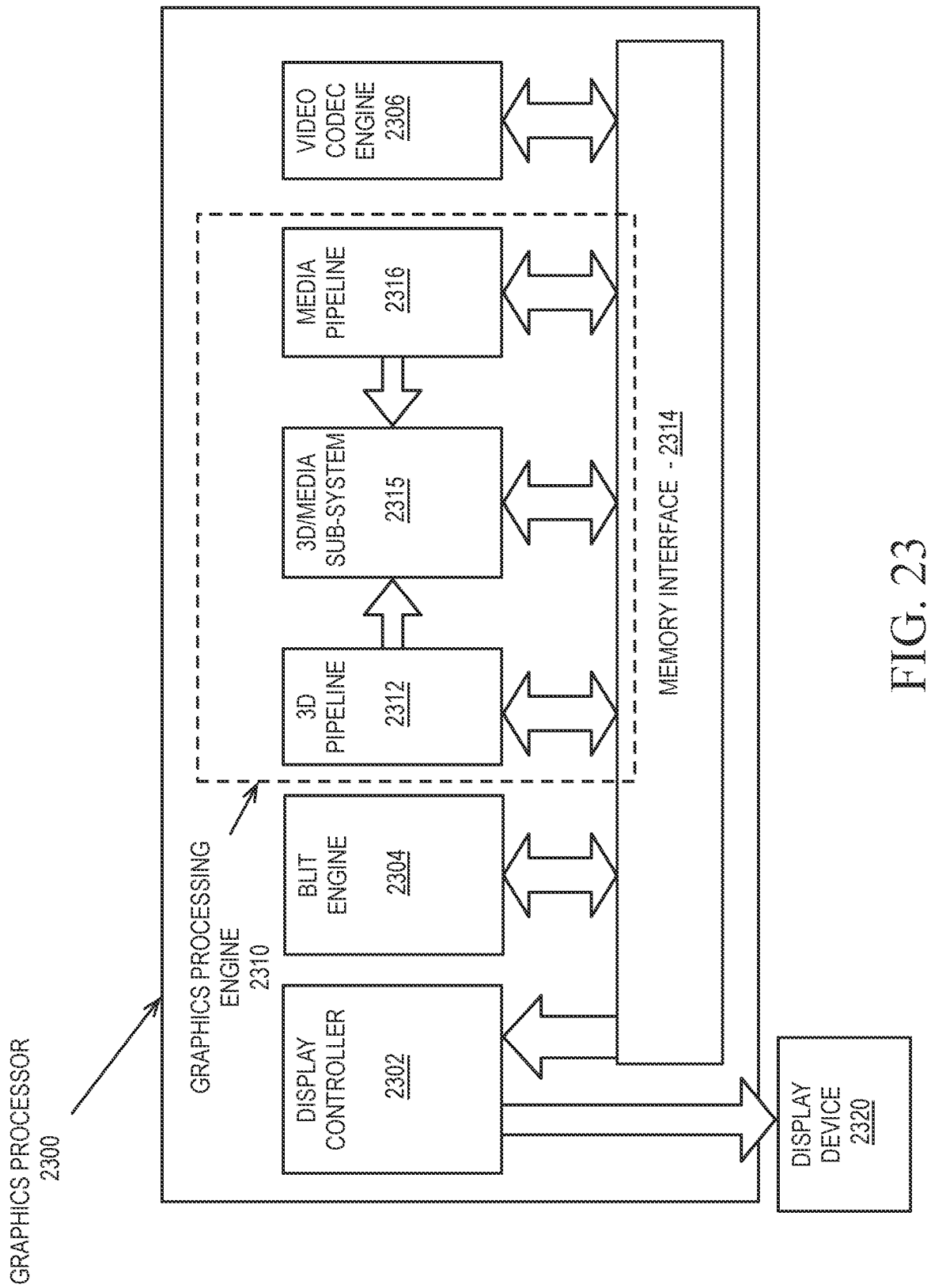
FIG. 23 is a block diagram of a graphics processor, according to an embodiment.

FIG. 23 is a block diagram of a graphics processor 2300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 2300 includes a memory interface 2314 to access memory. Memory interface 2314 can be an interface to local memory, one or more internal caches, one or more shared external caches, and/or to system memory.

In some embodiments, graphics processor 2300 also includes a display controller 2302 to drive display output data to a display device 2320. Display controller 2302 includes hardware for one or more overlay planes for the display and composition of multiple layers of video or user interface elements. The display device 2320 can be an internal or external display device. In one embodiment the display device 2320 is a head mounted display device, such as a virtual reality (VR) display device or an augmented reality (AR) display device. In some embodiments, graphics processor 2300 includes a video codec engine 2306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 2300 includes a block image transfer (BLIT) engine 2304 to perform two-dimensional (2D) rasterizer operations including, for example, bit-boundary block transfers. However, in one embodiment, 2D graphics operations are performed using one or more components of graphics processing engine (GPE) 2310. In some embodiments, GPE 2310 is a compute engine for performing graphics operations, including three-dimensional (3D) graphics operations and media operations.

In some embodiments, GPE 2310 includes a 3D pipeline 2312 for performing 3D operations, such as rendering three-dimensional images and scenes using processing functions that act upon 3D primitive shapes (e.g., rectangle, triangle, etc.). The 3D pipeline 2312 includes programmable and fixed function elements that perform various tasks within the element and/or spawn execution threads to a 3D/Media sub-system 2315. While 3D pipeline 2312 can be used to perform media operations, an embodiment of GPE 2310 also includes a media pipeline 2316 that is specifically used to perform media operations, such as video post-processing and image enhancement.

In some embodiments, media pipeline 2316 includes fixed function or programmable logic units to perform one or more specialized media operations, such as video decode acceleration, video de-interlacing, and video encode acceleration in place of, or on behalf of video codec engine 2306. In some embodiments, media pipeline 2316 additionally includes a thread spawning unit to spawn threads for execution on 3D/Media sub-system 2315. The spawned threads perform computations for the media operations on one or more graphics execution units included in 3D/Media subsystem 2315.

In some embodiments, 3D/Media subsystem 2315 includes logic for executing threads spawned by 3D pipeline 2312 and media pipeline 2316. In one embodiment, the pipelines send thread execution requests to 3D/Media subsystem 2315, which includes thread dispatch logic for arbitrating and dispatching the various requests to available thread execution resources. The execution resources include an array of graphics execution units to process the 3D and media threads. In some embodiments, 3D/Media subsystem 2315 includes one or more internal caches for thread instructions and data. In some embodiments, the subsystem also includes shared memory, including registers and addressable memory, to share data between threads and to store output data.

Graphics Processing Engine

Figure 24:
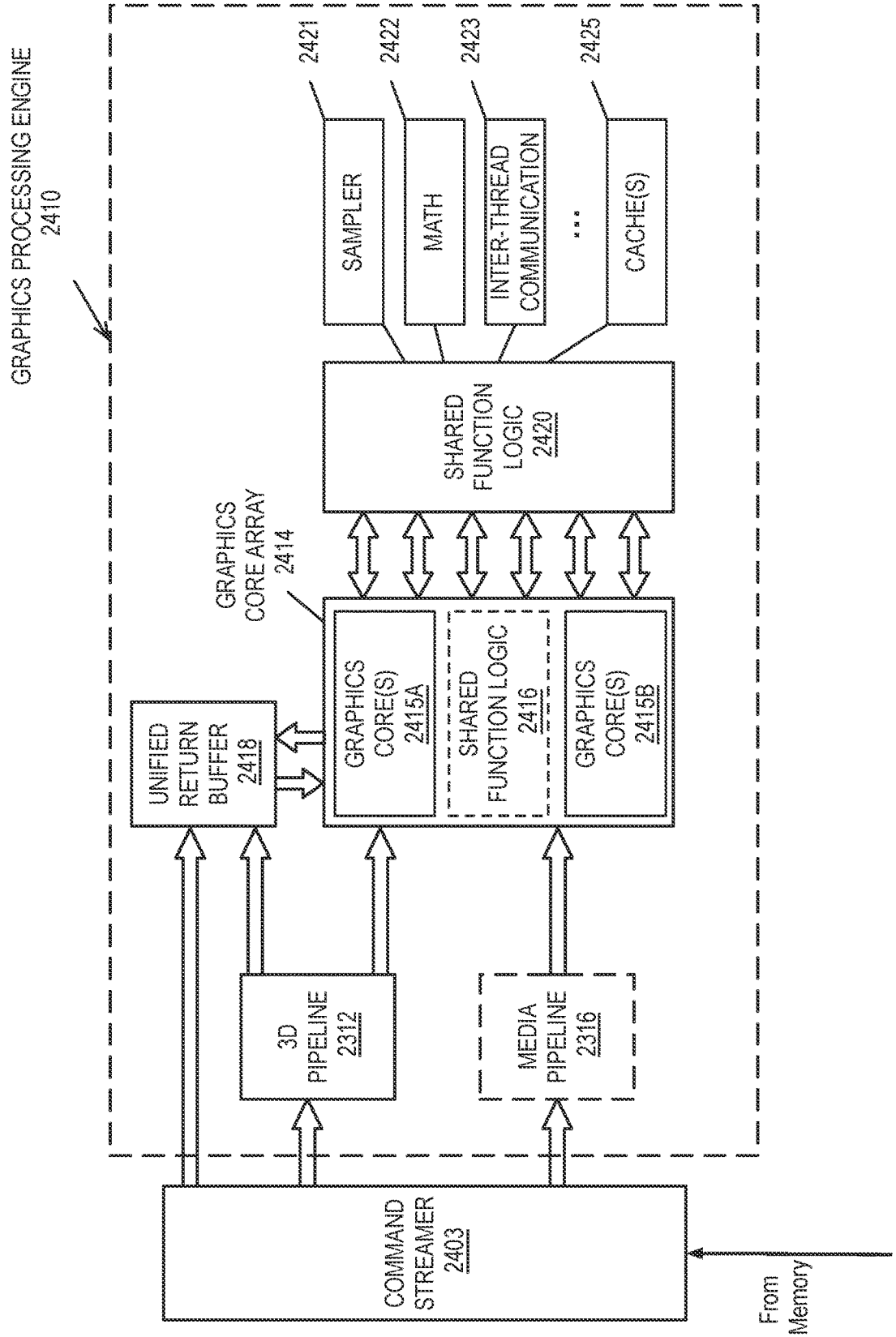
FIG. 24 is a block diagram of a graphics processing engine of a graphics processor in accordance with some embodiments.

FIG. 24 is a block diagram of a graphics processing engine 2410 of a graphics processor in accordance with some embodiments. In one embodiment, the graphics processing engine (GPE) 2410 is a version of the GPE 2310 shown in FIG. 23. Elements of FIG. 24 having the same reference numbers (or names) as the elements of any other figure herein can operate or function in any manner similar to that described elsewhere herein, but are not limited to such. For example, the 3D pipeline 2312 and media pipeline 2316 of FIG. 23 are illustrated. The media pipeline 2316 is optional in some embodiments of the GPE 2410 and may not be explicitly included within the GPE 2410. For example and in at least one embodiment, a separate media and/or image processor is coupled to the GPE 2410.

In some embodiments, GPE 2410 couples with or includes a command streamer 2403, which provides a command stream to the 3D pipeline 2312 and/or media pipelines 2316. In some embodiments, command streamer 2403 is coupled with memory, which can be system memory, or one or more of internal cache memory and shared cache memory. In some embodiments, command streamer 2403 receives commands from the memory and sends the commands to 3D pipeline 2312 and/or media pipeline 2316. The commands are directives fetched from a ring buffer, which stores commands for the 3D pipeline 2312 and media pipeline 2316. In one embodiment, the ring buffer can additionally include batch command buffers storing batches of multiple commands. The commands for the 3D pipeline 2312 can also include references to data stored in memory, such as but not limited to vertex and geometry data for the 3D pipeline 2312 and/or image data and memory objects for the media pipeline 2316. The 3D pipeline 2312 and media pipeline 2316 process the commands and data by performing operations via logic within the respective pipelines or by dispatching one or more execution threads to a graphics core array 2414. In one embodiment the graphics core array 2414 include one or more blocks of graphics cores (e.g., graphics core(s) 2415A, graphics core(s) 2415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 2312 can include fixed function and programmable logic to process one or more shader programs, such as vertex shaders, geometry shaders, pixel shaders, fragment shaders, compute shaders, or other shader programs, by processing the instructions and dispatching execution threads to the graphics core array 2414. The graphics core array 2414 provides a unified block of execution resources for use in processing these shader programs. Multi-purpose execution logic (e.g., execution units) within the graphics core(s) 2415A-2414B of the graphic core array 2414 includes support for various 3D API shader languages and can execute multiple simultaneous execution threads associated with multiple shaders.

In some embodiments, the graphics core array 2414 includes execution logic to perform media functions, such as video and/or image processing. In one embodiment, the execution units include general-purpose logic that is programmable to perform parallel general-purpose computational operations, in addition to graphics processing operations. The general-purpose logic can perform processing operations in parallel or in conjunction with general-purpose logic within the processor core(s) 2107 of FIG. 21 or core 2202A-2202N as in FIG. 22.

Output data generated by threads executing on the graphics core array 2414 can output data to memory in a unified return buffer (URB) 2418. The URB 2418 can store data for multiple threads. In some embodiments the URB 2418 may be used to send data between different threads executing on the graphics core array 2414. In some embodiments the URB 2418 may additionally be used for synchronization between threads on the graphics core array and fixed function logic within the shared function logic 2420.

In some embodiments, graphics core array 2414 is scalable, such that the array includes a variable number of graphics cores, each having a variable number of execution units based on the target power and performance level of GPE 2410. In one embodiment the execution resources are dynamically scalable, such that execution resources may be enabled or disabled as needed.

The graphics core array 2414 couples with shared function logic 2420 that includes multiple resources that are shared between the graphics cores in the graphics core array. The shared functions within the shared function logic 2420 are hardware logic units that provide specialized supplemental functionality to the graphics core array 2414. In various embodiments, shared function logic 2420 includes but is not limited to sampler 2421, math 2422, and inter-thread communication (ITC) 2423 logic. Additionally, some embodiments implement one or more cache(s) 2425 within the shared function logic 2420.

A shared function is implemented at least in a case where the demand for a given specialized function is insufficient for inclusion within the graphics core array 2414. Instead a single instantiation of that specialized function is implemented as a stand-alone entity in the shared function logic 2420 and shared among the execution resources within the graphics core array 2414. The precise set of functions that are shared between the graphics core array 2414 and included within the graphics core array 2414 varies across embodiments. In some embodiments, specific shared functions within the shared function logic 2420 that are used extensively by the graphics core array 2414 may be included within shared function logic 2416 within the graphics core array 2414. In various embodiments, the shared function logic 2416 within the graphics core array 2414 can include some or all logic within the shared function logic 2420. In one embodiment, all logic elements within the shared function logic 2420 may be duplicated within the shared function logic 2416 of the graphics core array 2414. In one embodiment the shared function logic 2420 is excluded in favor of the shared function logic 2416 within the graphics core array 2414.

Figure 25:
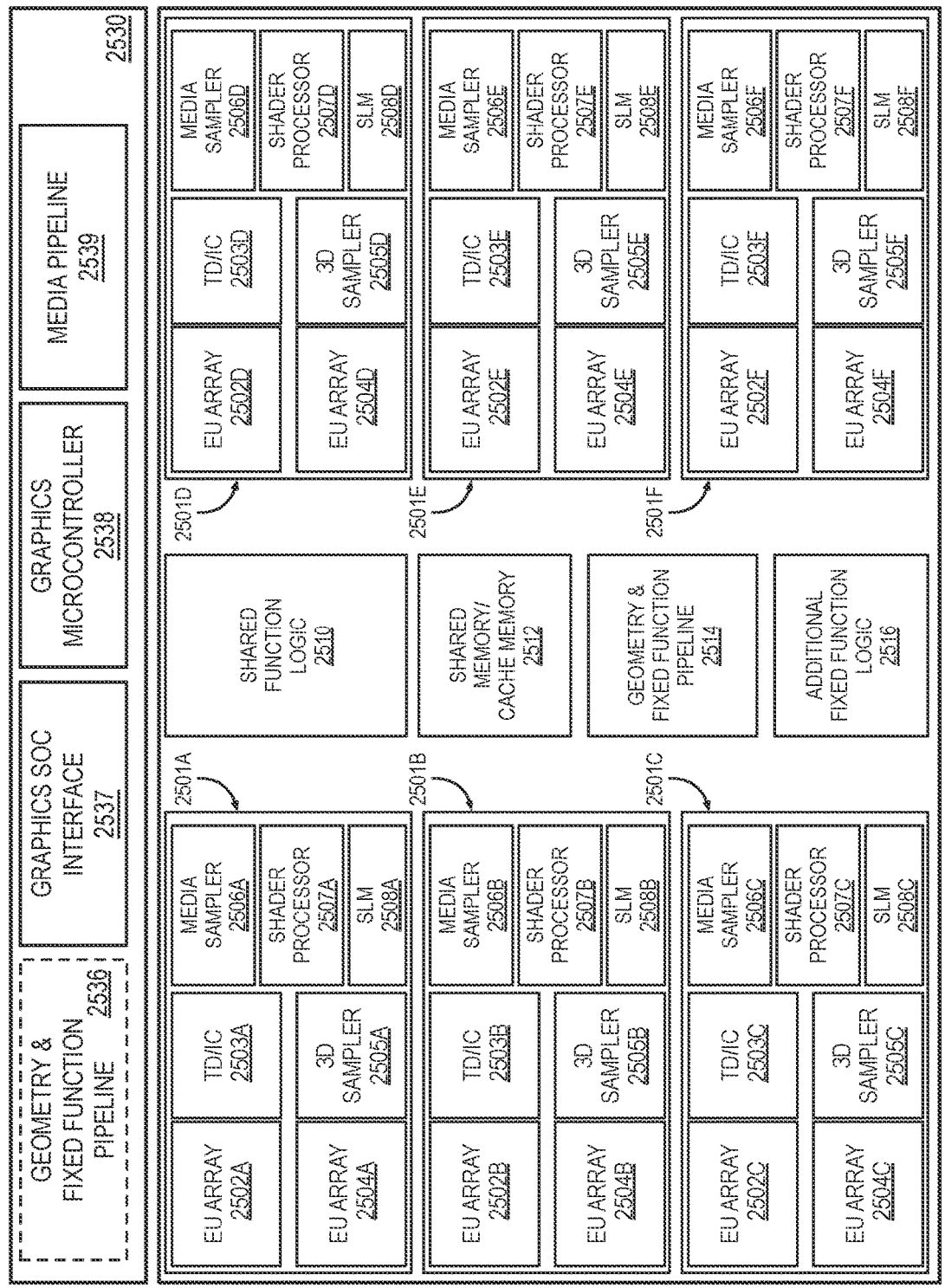
FIG. 25 is a block diagram of hardware logic of a graphics processor core, according to some embodiments described herein.

FIG. 25 is a block diagram of hardware logic of a graphics processor core 2500, according to some embodiments described herein. Elements of FIG. 25 having the same reference numbers (or names) as the elements of any other figure herein can operate or function in any manner similar to that described elsewhere herein, but are not limited to such. The illustrated graphics processor core 2500, in some embodiments, is included within the graphics core array 2414 of FIG. 24. The graphics processor core 2500, sometimes referred to as a core slice, can be one or multiple graphics cores within a modular graphics processor. The graphics processor core 2500 is exemplary of one graphics core slice, and a graphics processor as described herein may include multiple graphics core slices based on target power and performance envelopes. Each graphics processor core 2500 can include a fixed function block 2530 coupled with multiple sub-cores 2501A-2501F, also referred to as sub-slices, that include modular blocks of general-purpose and fixed function logic.

In some embodiments, the fixed function block 2530 includes a geometry/fixed function pipeline 2536 that can be shared by all sub-cores in the graphics processor core 2500, for example, in lower performance and/or lower power graphics processor implementations. In various embodiments, the geometry/fixed function pipeline 2536 includes a 3D fixed function pipeline (e.g., 3D pipeline 2312 as in FIG. 23 and FIG. 24) a video front-end unit, a thread spawner and thread dispatcher, and a unified return buffer manager, which manages unified return buffers, such as the unified return buffer 2418 of FIG. 24.

In one embodiment the fixed function block 2530 also includes a graphics SoC interface 2537, a graphics microcontroller 2538, and a media pipeline 2539. The graphics SoC interface 2537 provides an interface between the graphics processor core 2500 and other processor cores within a system on a chip integrated circuit. The graphics microcontroller 2538 is a programmable sub-processor that is configurable to manage various functions of the graphics processor core 2500, including thread dispatch, scheduling, and pre-emption. The media pipeline 2539 (e.g., media pipeline 2316 of FIG. 23 and FIG. 24) includes logic to facilitate the decoding, encoding, pre-processing, and/or post-processing of multimedia data, including image and video data. The media pipeline 2539 implement media operations via requests to compute or sampling logic within the sub-cores 2501-2501F.

In one embodiment the SoC interface 2537 enables the graphics processor core 2500 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 2537 can also enable communication with fixed function devices within the SoC, such as camera imaging pipelines, and enables the use of and/or implements global memory atomics that may be shared between the graphics processor core 2500 and CPUs within the SoC. The SoC interface 2537 can also implement power management controls for the graphics processor core 2500 and enable an interface between a clock domain of the graphic core 2500 and other clock domains within the SoC. In one embodiment the SoC interface 2537 enables receipt of command buffers from a command streamer and global thread dispatcher that are configured to provide commands and instructions to each of one or more graphics cores within a graphics processor. The commands and instructions can be dispatched to the media pipeline 2539, when media operations are to be performed, or a geometry and fixed function pipeline (e.g., geometry and fixed function pipeline 2536, geometry and fixed function pipeline 2514) when graphics processing operations are to be performed.

The graphics microcontroller 2538 can be configured to perform various scheduling and management tasks for the graphics processor core 2500. In one embodiment the graphics microcontroller 2538 can perform graphics and/or compute workload scheduling on the various graphics parallel engines within execution unit (EU) arrays 2502A-2502F, 2504A-2504F within the sub-cores 2501A-2501F. In this scheduling model, host software executing on a CPU core of an SoC including the graphics processor core 2500 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 2538 can also facilitate low-power or idle states for the graphics processor core 2500, providing the graphics processor core 2500 with the ability to save and restore registers within the graphics processor core 2500 across low-power state transitions independently from the operating system and/or graphics driver software on the system.

The graphics processor core 2500 may have greater than or fewer than the illustrated sub-cores 2501A-2501F, up to N modular sub-cores. For each set of N sub-cores, the graphics processor core 2500 can also include shared function logic 2510, shared and/or cache memory 2512, a geometry/fixed function pipeline 2514, as well as additional fixed function logic 2516 to accelerate various graphics and compute processing operations. The shared function logic 2510 can include logic units associated with the shared function logic 2420 of FIG. 24 (e.g., sampler, math, and/or inter-thread communication logic) that can be shared by each N sub-cores within the graphics processor core 2500. The shared and/or cache memory 2512 can be a last-level cache for the set of N sub-cores 2501A-2501F within the graphics processor core 2500, and can also serve as shared memory that is accessible by multiple sub-cores. The geometry/fixed function pipeline 2514 can be included instead of the geometry/fixed function pipeline 2536 within the fixed function block 2530 and can include the same or similar logic units.

In one embodiment the graphics processor core 2500 includes additional fixed function logic 2516 that can include various fixed function acceleration logic for use by the graphics processor core 2500. In one embodiment the additional fixed function logic 2516 includes an additional geometry pipeline for use in position only shading. In position-only shading, two geometry pipelines exist, the full geometry pipeline within the geometry/fixed function pipeline 2516, 2536, and a cull pipeline, which is an additional geometry pipeline which may be included within the additional fixed function logic 2516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 2516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 2516 can also include machine-learning acceleration logic, such as fixed function matrix multiplication logic, for implementations including optimizations for machine learning training or inferencing.

Within each graphics sub-core 2501A-2501F includes a set of execution resources that may be used to perform graphics, media, and compute operations in response to requests by graphics pipeline, media pipeline, or shader programs. The graphics sub-cores 2501A-2501F include multiple EU arrays 2502A-2502F, 2504A-2504F, thread dispatch and inter-thread communication (TD/IC) logic 2503A-2503F, a 3D (e.g., texture) sampler 2505A-2505F, a media sampler 2506A-2506F, a shader processor 2507A-2507F, and shared local memory (SLM) 2508A-2508F. The EU arrays 2502A-2502F, 2504A-2504F each include multiple execution units, which are general-purpose graphics processing units capable of performing floating-point and integer/fixed-point logic operations in service of a graphics, media, or compute operation, including graphics, media, or compute shader programs. The TD/IC logic 2503A-2503F performs local thread dispatch and thread control operations for the execution units within a sub-core and facilitate communication between threads executing on the execution units of the sub-core. The 3D sampler 2505A-2505F can read texture or other 3D graphics related data into memory. The 3D sampler can read texture data differently based on a configured sample state and the texture format associated with a given texture. The media sampler 2506A-2506F can perform similar read operations based on the type and format associated with media data. In one embodiment, each graphics sub-core 2501A-2501F can alternately include a unified 3D and media sampler. Threads executing on the execution units within each of the sub-cores 2501A-2501F can make use of shared local memory 2508A-2508F within each sub-core, to enable threads executing within a thread group to execute using a common pool of on-chip memory.

Execution Units

Figure 26A:
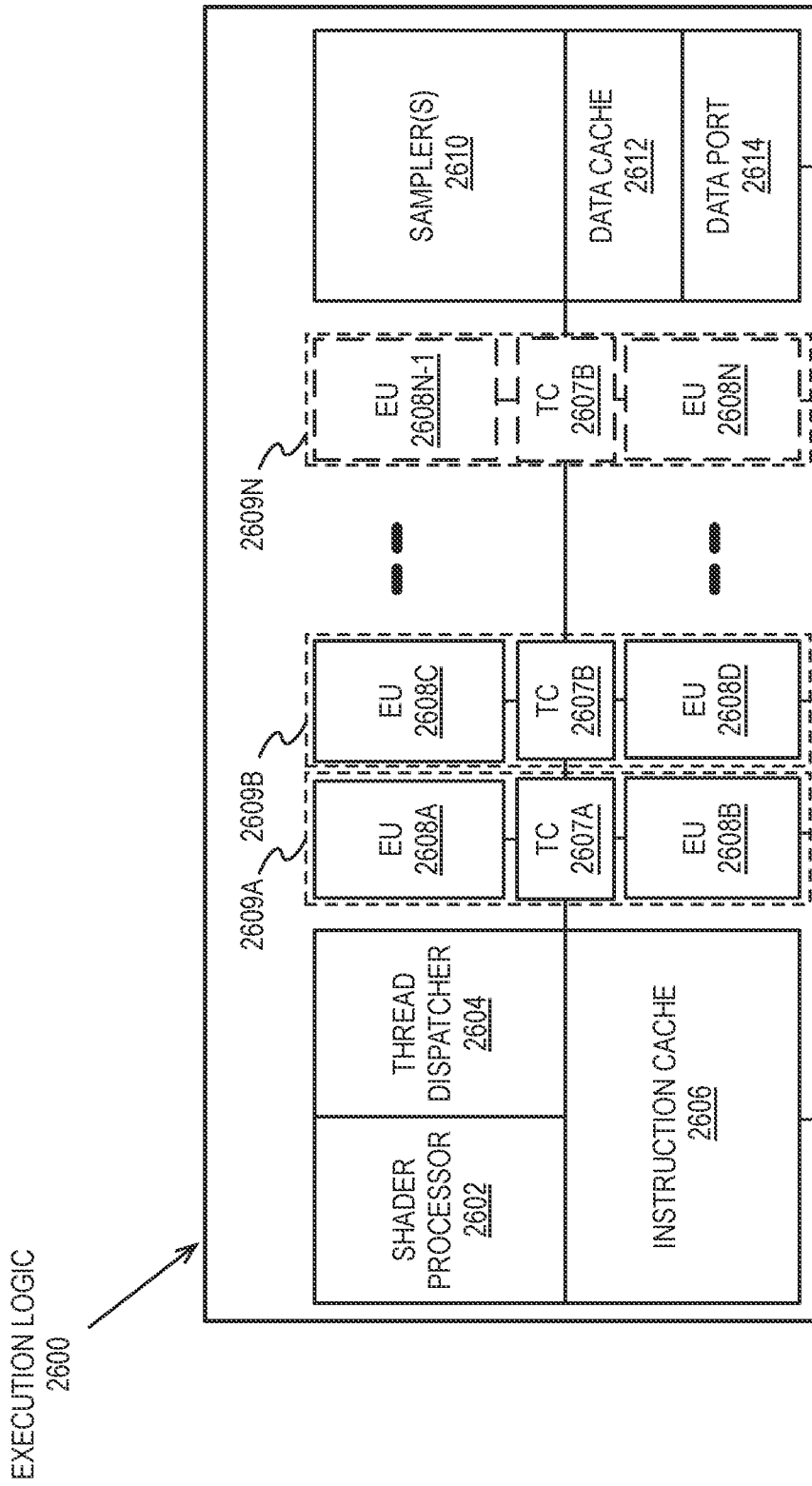
FIG. 26A-26B illustrate thread execution logic including an array of processing elements employed in a graphics processor core according to embodiments described herein.
Figure 26B:
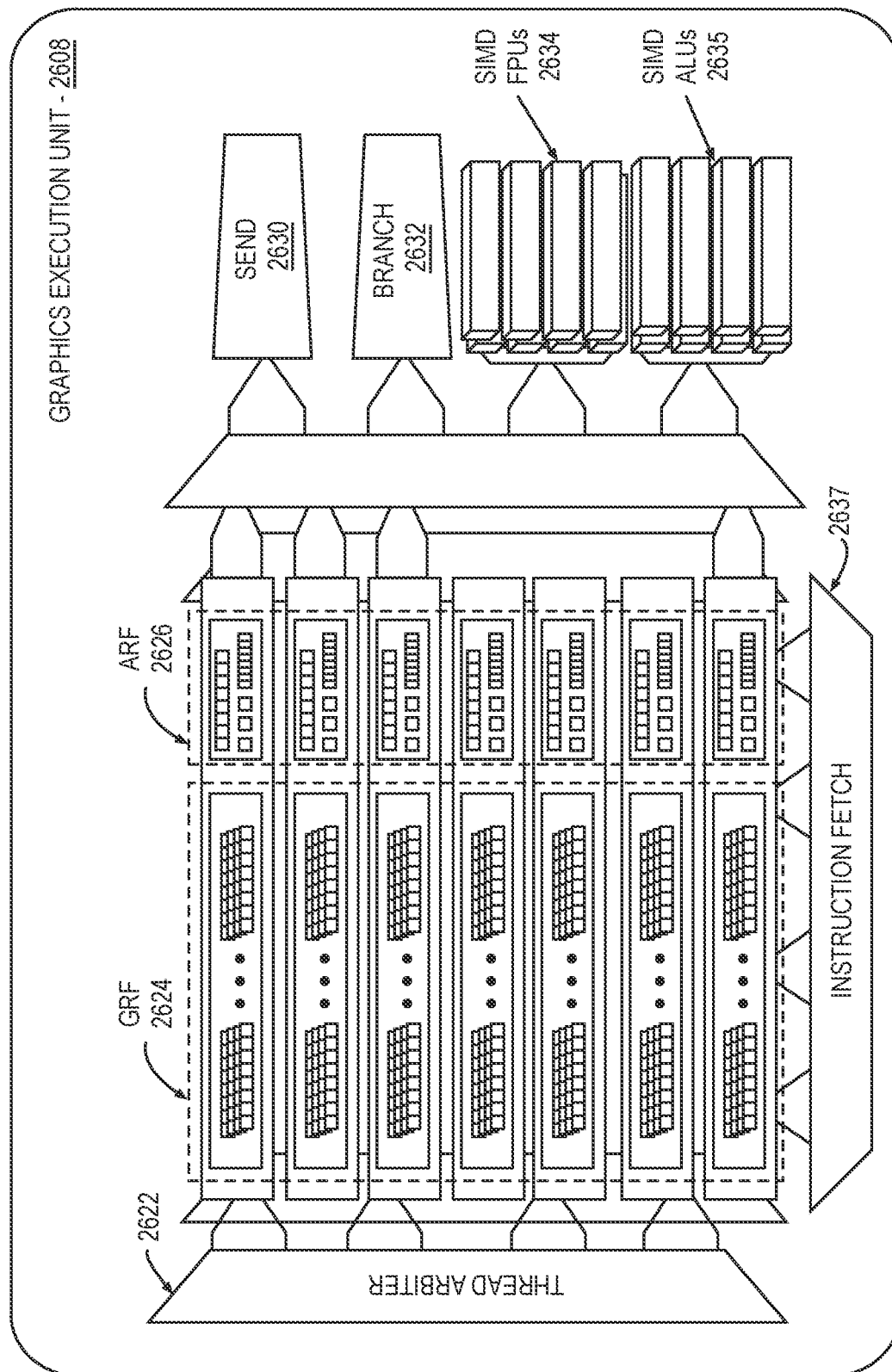

FIG. 26A-26B illustrate thread execution logic 2600 including an array of processing elements employed in a graphics processor core according to embodiments described herein. Elements of FIG. 26A-26B having the same reference numbers (or names) as the elements of any other figure herein can operate or function in any manner similar to that described elsewhere herein, but are not limited to such. FIG. 26A illustrates an overview of thread execution logic 2600, which can include a variant of the hardware logic illustrated with each sub-core 2501A-2501F of FIG. 25. FIG. 26B illustrates exemplary internal details of an execution unit.

As illustrated in FIG. 26A, in some embodiments thread execution logic 2600 includes a shader processor 2602, a thread dispatcher 2604, instruction cache 2606, a scalable execution unit array including a plurality of execution units 2608A-2608N, a sampler 2610, a data cache 2612, and a data port 2614. In one embodiment the scalable execution unit array can dynamically scale by enabling or disabling one or more execution units (e.g., any of execution unit 2608A, 2608B, 2608C, 2608D, through 2608N-1 and 2608N) based on the computational requirements of a workload. In one embodiment the included components are interconnected via an interconnect fabric that links to each of the components. In some embodiments, thread execution logic 2600 includes one or more connections to memory, such as system memory or cache memory, through one or more of instruction cache 2606, data port 2614, sampler 2610, and execution units 2608A-2608N. In some embodiments, each execution unit (e.g. 2608A) is a stand-alone programmable general-purpose computational unit that is capable of executing multiple simultaneous hardware threads while processing multiple data elements in parallel for each thread. In various embodiments, the array of execution units 2608A-2608N is scalable to include any number individual execution units.

In some embodiments, the execution units 2608A-2608N are primarily used to execute shader programs. A shader processor 2602 can process the various shader programs and dispatch execution threads associated with the shader programs via a thread dispatcher 2604. In one embodiment the thread dispatcher includes logic to arbitrate thread initiation requests from the graphics and media pipelines and instantiate the requested threads on one or more execution unit in the execution units 2608A-2608N. For example, a geometry pipeline can dispatch vertex, tessellation, or geometry shaders to the thread execution logic for processing. In some embodiments, thread dispatcher 2604 can also process runtime thread spawning requests from the executing shader programs.

In some embodiments, the execution units 2608A-2608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 2608A-2608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 2608A-2608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various embodiments can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in execution units 2608A-2608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 2608A-2608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 2609A-2609N having thread control logic (2607A-2607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 2609A-2609N includes at least two execution units. For example, fused execution unit 2609A includes a first EU 2608A, second EU 2608B, and thread control logic 2607A that is common to the first EU 2608A and the second EU 2608B. The thread control logic 2607A controls threads executed on the fused graphics execution unit 2609A, allowing each EU within the fused execution units 2609A-2609N to execute using a common instruction pointer register.

One or more internal instruction caches (e.g., 2606) are included in the thread execution logic 2600 to cache thread instructions for the execution units. In some embodiments, one or more data caches (e.g., 2612) are included to cache thread data during thread execution. In some embodiments, a sampler 2610 is included to provide texture sampling for 3D operations and media sampling for media operations. In some embodiments, sampler 2610 includes specialized texture or media sampling functionality to process texture or media data during the sampling process before providing the sampled data to an execution unit.

During execution, the graphics and media pipelines send thread initiation requests to thread execution logic 2600 via thread spawning and dispatch logic. Once a group of geometric objects has been processed and rasterized into pixel data, pixel processor logic (e.g., pixel shader logic, fragment shader logic, etc.) within the shader processor 2602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 2602 then executes an application programming interface (API)-supplied pixel or fragment shader program. To execute the shader program, the shader processor 2602 dispatches threads to an execution unit (e.g., 2608A) via thread dispatcher 2604. In some embodiments, shader processor 2602 uses texture sampling logic in the sampler 2610 to access texture data in texture maps stored in memory. Arithmetic operations on the texture data and the input geometry data compute pixel color data for each geometric fragment, or discards one or more pixels from further processing.

In some embodiments, the data port 2614 provides a memory access mechanism for the thread execution logic 2600 to output processed data to memory for further processing on a graphics processor output pipeline. In some embodiments, the data port 2614 includes or couples to one or more cache memories (e.g., data cache 2612) to cache data for memory access via the data port.

As illustrated in FIG. 26B, a graphics execution unit 2608 can include an instruction fetch unit 2637, a general register file array (GRF) 2624, an architectural register file array (ARF) 2626, a thread arbiter 2622, a send unit 2630, a branch unit 2632, a set of SIMD floating point units (FPUs) 2634, and in one embodiment a set of dedicated integer SIMD ALUs 2635. The GRF 2624 and ARF 2626 includes the set of general register files and architecture register files associated with each simultaneous hardware thread that may be active in the graphics execution unit 2608. In one embodiment, per thread architectural state is maintained in the ARF 2626, while data used during thread execution is stored in the GRF 2624. The execution state of each thread, including the instruction pointers for each thread, can be held in thread-specific registers in the ARF 2626.

In one embodiment the graphics execution unit 2608 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads.

In one embodiment, the graphics execution unit 2608 can co-issue multiple instructions, which may each be different instructions. The thread arbiter 2622 of the graphics execution unit thread 2608 can dispatch the instructions to one of the send unit 2630, branch unit 2632, or SIMD FPU(s) 2634 for execution. Each execution thread can access 128 general-purpose registers within the GRF 2624, where each register can store 32 bytes, accessible as an 8-element vector of 32-bit data elements. In one embodiment, each execution unit thread has access to 4 Kbytes within the GRF 2624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 2624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 2630. In one embodiment, branch instructions are dispatched to a dedicated branch unit 2632 to facilitate SIMD divergence and eventual convergence.

In one embodiment the graphics execution unit 2608 includes one or more SIMD floating point units (FPU(s)) 2634 to perform floating-point operations. In one embodiment, the FPU(s) 2634 also support integer computation. In one embodiment the FPU(s) 2634 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 2635 are also present and may be specifically optimized to perform operations associated with machine learning computations.

In one embodiment, arrays of multiple instances of the graphics execution unit 2608 can be instantiated in a graphics sub-core grouping (e.g., a sub-slice). For scalability, product architects can choose the exact number of execution units per sub-core grouping. In one embodiment the execution unit 2608 can execute instructions across a plurality of execution channels. In a further embodiment, each thread executed on the graphics execution unit 2608 is executed on a different channel.

FIG. 27 is a block diagram illustrating a graphics processor instruction formats 2700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 2700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 2710. A 64-bit compacted instruction format 2730 is available for some instructions based on the selected instruction, instruction options, and number of operands. The native 128-bit instruction format 2710 provides access to all instruction options, while some options and operations are restricted in the 64-bit format 2730. The native instructions available in the 64-bit format 2730 vary by embodiment. In some embodiments, the instruction is compacted in part using a set of index values in an index field 2713. The execution unit hardware references a set of compaction tables based on the index values and uses the compaction table outputs to reconstruct a native instruction in the 128-bit instruction format 2710. Other sizes and formats of instruction can be used.

For each format, instruction opcode 2712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 2714 enables control over certain execution options, such as channels selection (e.g., predication) and data channel order (e.g., swizzle). For instructions in the 128-bit instruction format 2710 an exec-size field 2716 limits the number of data channels that will be executed in parallel. In some embodiments, exec-size field 2716 is not available for use in the 64-bit compact instruction format 2730.

Some execution unit instructions have up to three operands including two source operands, src0 2720, src1 2722, and one destination 2718. In some embodiments, the execution units support dual destination instructions, where one of the destinations is implied. Data manipulation instructions can have a third source operand (e.g., SRC2 2724), where the instruction opcode 2712 determines the number of source operands. An instruction's last source operand can be an immediate (e.g., hard-coded) value passed with the instruction.

In some embodiments, the 128-bit instruction format 2710 includes an access/address mode field 2726 specifying, for example, whether direct register addressing mode or indirect register addressing mode is used. When direct register addressing mode is used, the register address of one or more operands is directly provided by bits in the instruction.

In some embodiments, the 128-bit instruction format 2710 includes an access/address mode field 2726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 2726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments, instructions are grouped based on opcode 2712 bit-fields to simplify Opcode decode 2740. For an 8-bit opcode, bits 4, 5, and 6 allow the execution unit to determine the type of opcode. The precise opcode grouping shown is merely an example. In some embodiments, a move and logic opcode group 2742 includes data movement and logic instructions (e.g., move (mov), compare (cmp)). In some embodiments, move and logic group 2742 shares the five most significant bits (MSB), where move (mov) instructions are in the form of 0000xxxxb and logic instructions are in the form of 0001xxxxb. A flow control instruction group 2744 (e.g., call, jump (jmp)) includes instructions in the form of 0010xxxxb (e.g., 0x20). A miscellaneous instruction group 2746 includes a mix of instructions, including synchronization instructions (e.g., wait, send) in the form of 0011xxxxb (e.g., 0x30). A parallel math instruction group 2748 includes component-wise arithmetic instructions (e.g., add, multiply (mul)) in the form of 0100xxxxb (e.g., 0x40). The parallel math group 2748 performs the arithmetic operations in parallel across data channels. The vector math group 2750 includes arithmetic instructions (e.g., dp4) in the form of 0101xxxxb (e.g., 0x50). The vector math group performs arithmetic such as dot product calculations on vector operands.

Graphics Pipeline

Figure 28:
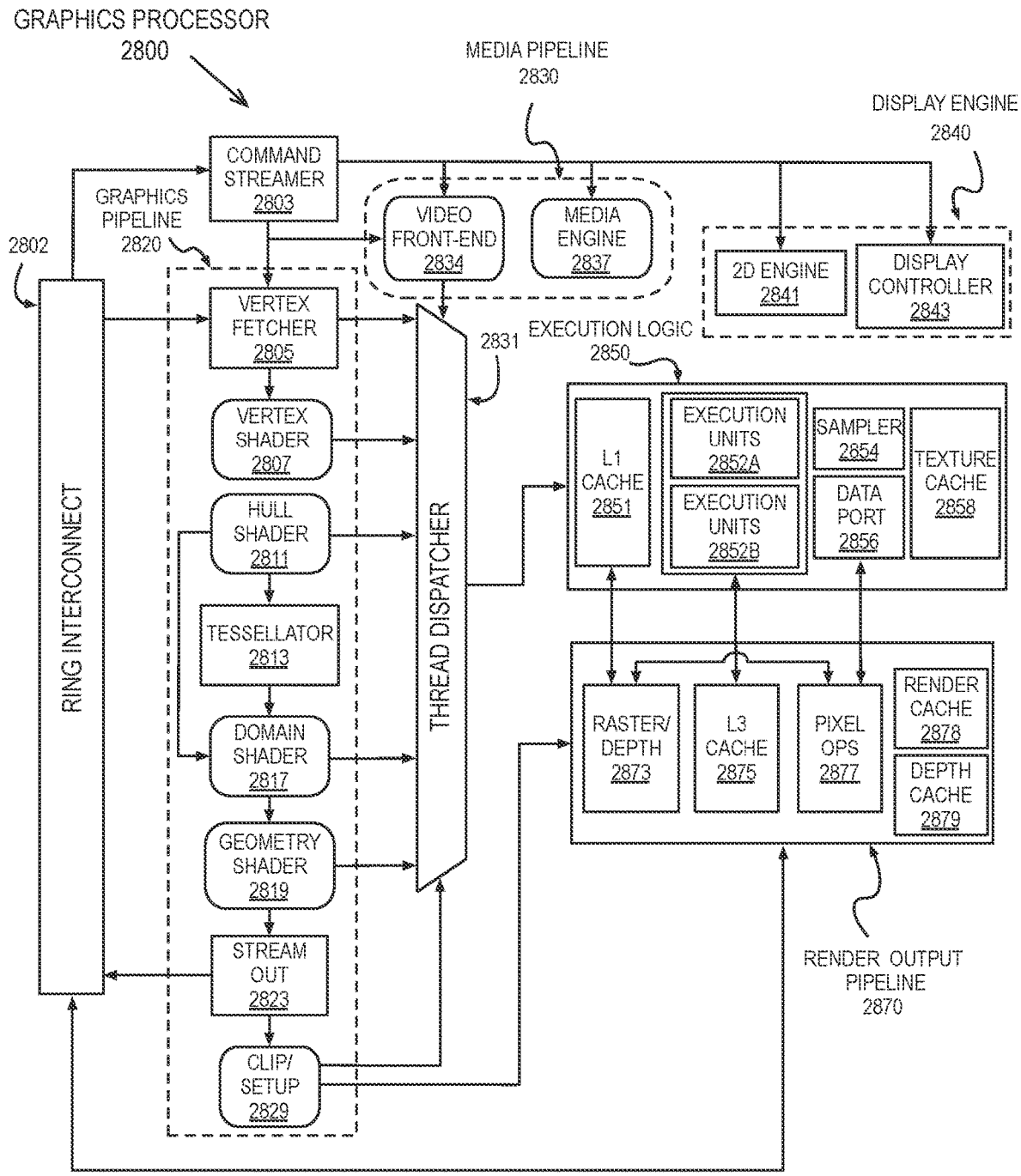
FIG. 28 is a block diagram of a graphics processor according to another embodiment.

FIG. 28 is a block diagram of another embodiment of a graphics processor 2800. Elements of FIG. 28 having the same reference numbers (or names) as the elements of any other figure herein can operate or function in any manner similar to that described elsewhere herein, but are not limited to such.

In some embodiments, graphics processor 2800 includes a geometry pipeline 2820, a media pipeline 2830, a display engine 2840, thread execution logic 2850, and a render output pipeline 2870. In some embodiments, graphics processor 2800 is a graphics processor within a multi-core processing system that includes one or more general-purpose processing cores. The graphics processor is controlled by register writes to one or more control registers (not shown) or via commands issued to graphics processor 2800 via a ring interconnect 2802. In some embodiments, ring interconnect 2802 couples graphics processor 2800 to other processing components, such as other graphics processors or general-purpose processors. Commands from ring interconnect 2802 are interpreted by a command streamer 2803, which supplies instructions to individual components of the geometry pipeline 2820 or the media pipeline 2830.

In some embodiments, command streamer 2803 directs the operation of a vertex fetcher 2805 that reads vertex data from memory and executes vertex-processing commands provided by command streamer 2803. In some embodiments, vertex fetcher 2805 provides vertex data to a vertex shader 2807, which performs coordinate space transformation and lighting operations to each vertex. In some embodiments, vertex fetcher 2805 and vertex shader 2807 execute vertex-processing instructions by dispatching execution threads to execution units 2852A-2852B via a thread dispatcher 2831.

In some embodiments, execution units 2852A-2852B are an array of vector processors having an instruction set for performing graphics and media operations. In some embodiments, execution units 2852A-2852B have an attached L1 cache 2851 that is specific for each array or shared between the arrays. The cache can be configured as a data cache, an instruction cache, or a single cache that is partitioned to contain data and instructions in different partitions.

In some embodiments, geometry pipeline 2820 includes tessellation components to perform hardware-accelerated tessellation of 3D objects. In some embodiments, a programmable hull shader 2811 configures the tessellation operations. A programmable domain shader 2817 provides back-end evaluation of tessellation output. A tessellator 2813 operates at the direction of hull shader 2811 and contains special purpose logic to generate a set of detailed geometric objects based on a coarse geometric model that is provided as input to geometry pipeline 2820. In some embodiments, if tessellation is not used, tessellation components (e.g., hull shader 2811, tessellator 2813, and domain shader 2817) can be bypassed.

In some embodiments, complete geometric objects can be processed by a geometry shader 2819 via one or more threads dispatched to execution units 2852A-2852B, or can proceed directly to the clipper 2829. In some embodiments, the geometry shader operates on entire geometric objects, rather than vertices or patches of vertices as in previous stages of the graphics pipeline. If the tessellation is disabled, the geometry shader 2819 receives input from the vertex shader 2807. In some embodiments, geometry shader 2819 is programmable by a geometry shader program to perform geometry tessellation if the tessellation units are disabled.

Before rasterization, a clipper 2829 processes vertex data. The clipper 2829 may be a fixed function clipper or a programmable clipper having clipping and geometry shader functions. In some embodiments, a rasterizer and depth test component 2873 in the render output pipeline 2870 dispatches pixel shaders to convert the geometric objects into per pixel representations. In some embodiments, pixel shader logic is included in thread execution logic 2850. In some embodiments, an application can bypass the rasterizer and depth test component 2873 and access un-rasterized vertex data via a stream out unit 2823.

The graphics processor 2800 has an interconnect bus, interconnect fabric, or some other interconnect mechanism that allows data and message passing amongst the major components of the processor. In some embodiments, execution units 2852A-2852B and associated logic units (e.g., L1 cache 2851, sampler 2854, texture cache 2858, etc.) interconnect via a data port 2856 to perform memory access and communicate with render output pipeline components of the processor. In some embodiments, sampler 2854, L1 cache 2851, texture cache 2858, and execution units 2852A-2852B each have separate memory access paths. In one embodiment the texture cache 2858 can also be configured as a sampler cache.

In some embodiments, render output pipeline 2870 contains a rasterizer and depth test component 2873 that converts vertex-based objects into an associated pixel-based representation. In some embodiments, the rasterizer logic includes a windower/masker unit to perform fixed function triangle and line rasterization. An associated render cache 2878 and depth cache 2879 are also available in some embodiments. A pixel operations component 2877 performs pixel-based operations on the data, though in some instances, pixel operations associated with 2D operations (e.g. bit block image transfers with blending) are performed by the 2D engine 2841, or substituted at display time by the display controller 2843 using overlay display planes. In some embodiments, a shared L3 cache 2875 is available to all graphics components, allowing the sharing of data without the use of main system memory.

In some embodiments, graphics processor media pipeline 2830 includes a media engine 2837 and a video front-end 2834. In some embodiments, video front-end 2834 receives pipeline commands from the command streamer 2803. In some embodiments, media pipeline 2830 includes a separate command streamer. In some embodiments, video front-end 2834 processes media commands before sending the command to the media engine 2837. In some embodiments, media engine 2837 includes thread spawning functionality to spawn threads for dispatch to thread execution logic 2850 via thread dispatcher 2831.

In some embodiments, graphics processor 2800 includes a display engine 2840. In some embodiments, display engine 2840 is external to processor 2800 and couples with the graphics processor via the ring interconnect 2802, or some other interconnect bus or fabric. In some embodiments, display engine 2840 includes a 2D engine 2841 and a display controller 2843. In some embodiments, display engine 2840 contains special purpose logic capable of operating independently of the 3D pipeline. In some embodiments, display controller 2843 couples with a display device (not shown), which may be a system integrated display device, as in a laptop computer, or an external display device attached via a display device connector.

In some embodiments, the geometry pipeline 2820 and media pipeline 2830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 29A is a block diagram illustrating a graphics processor command format 2900 according to some embodiments. FIG. 29B is a block diagram illustrating a graphics processor command sequence 2910 according to an embodiment. The solid lined boxes in FIG. 29A illustrate the components that are generally included in a graphics command while the dashed lines include components that are optional or that are only included in a sub-set of the graphics commands. The exemplary graphics processor command format 2900 of FIG. 29A includes data fields to identify a client 2902, a command operation code (opcode) 2904, and data 2906 for the command. A sub-opcode 2905 and a command size 2908 are also included in some commands.

In some embodiments, client 2902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 2904 and, if present, sub-opcode 2905 to determine the operation to perform. The client unit performs the command using information in data field 2906. For some commands an explicit command size 2908 is expected to specify the size of the command. In some embodiments, the command parser automatically determines the size of at least some of the commands based on the command opcode. In some embodiments, commands are aligned via multiples of a double word. Other command formats can be used.

The flow diagram in FIG. 29B illustrates an exemplary graphics processor command sequence 2910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 2910 may begin with a pipeline flush command 2912 to cause any active graphics pipeline to complete the currently pending commands for the pipeline. In some embodiments, the 3D pipeline 2922 and the media pipeline 2924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 2912 can be used for pipeline synchronization or before placing the graphics processor into a low power state.

In some embodiments, a pipeline select command 2913 is used when a command sequence requires the graphics processor to explicitly switch between pipelines. In some embodiments, a pipeline select command 2913 is required only once within an execution context before issuing pipeline commands unless the context is to issue commands for both pipelines. In some embodiments, a pipeline flush command 2912 is required immediately before a pipeline switch via the pipeline select command 2913.

In some embodiments, a pipeline control command 2914 configures a graphics pipeline for operation and is used to program the 3D pipeline 2922 and the media pipeline 2924. In some embodiments, pipeline control command 2914 configures the pipeline state for the active pipeline. In one embodiment, the pipeline control command 2914 is used for pipeline synchronization and to clear data from one or more cache memories within the active pipeline before processing a batch of commands.

In some embodiments, commands to configure the return buffer state 2916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 2916 includes selecting the size and number of return buffers to use for a set of pipeline operations.

The remaining commands in the command sequence differ based on the active pipeline for operations. Based on a pipeline determination 2920, the command sequence is tailored to the 3D pipeline 2922 beginning with the 3D pipeline state 2930 or the media pipeline 2924 beginning at the media pipeline state 2940.

The commands to configure the 3D pipeline state 2930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 2930 commands are also able to selectively disable or bypass certain pipeline elements if those elements will not be used.

In some embodiments, 3D primitive 2932 command is used to submit 3D primitives to be processed by the 3D pipeline. Commands and associated parameters that are passed to the graphics processor via the 3D primitive 2932 command are forwarded to the vertex fetch function in the graphics pipeline. The vertex fetch function uses the 3D primitive 2932 command data to generate vertex data structures. The vertex data structures are stored in one or more return buffers. In some embodiments, 3D primitive 2932 command is used to perform vertex operations on 3D primitives via vertex shaders. To process vertex shaders, 3D pipeline 2922 dispatches shader execution threads to graphics processor execution units.

In some embodiments, 3D pipeline 2922 is triggered via an execute 2934 command or event. In some embodiments, a register write triggers command execution. In some embodiments, execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 2910 follows the media pipeline 2924 path when performing media operations. In general, the specific use and manner of programming for the media pipeline 2924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 2924 is configured in a similar manner as the 3D pipeline 2922. A set of commands to configure the media pipeline state 2940 are dispatched or placed into a command queue before the media object commands 2942. In some embodiments, commands for the media pipeline state 2940 include data to configure the media pipeline elements that will be used to process the media objects. This includes data to configure the video decode and video encode logic within the media pipeline, such as encode or decode format. In some embodiments, commands for the media pipeline state 2940 also support the use of one or more pointers to "indirect" state elements that contain a batch of state settings.

In some embodiments, media object commands 2942 supply pointers to media objects for processing by the media pipeline. The media objects include memory buffers containing video data to be processed. In some embodiments, all media pipeline states must be valid before issuing a media object command 2942. Once the pipeline state is configured and media object commands 2942 are queued, the media pipeline 2924 is triggered via an execute command 2944 or an equivalent execute event (e.g., register write). Output from media pipeline 2924 may then be post processed by operations provided by the 3D pipeline 2922 or the media pipeline 2924. In some embodiments, GPGPU operations are configured and executed in a similar manner as media operations.

Graphics Software Architecture

Figure 30:
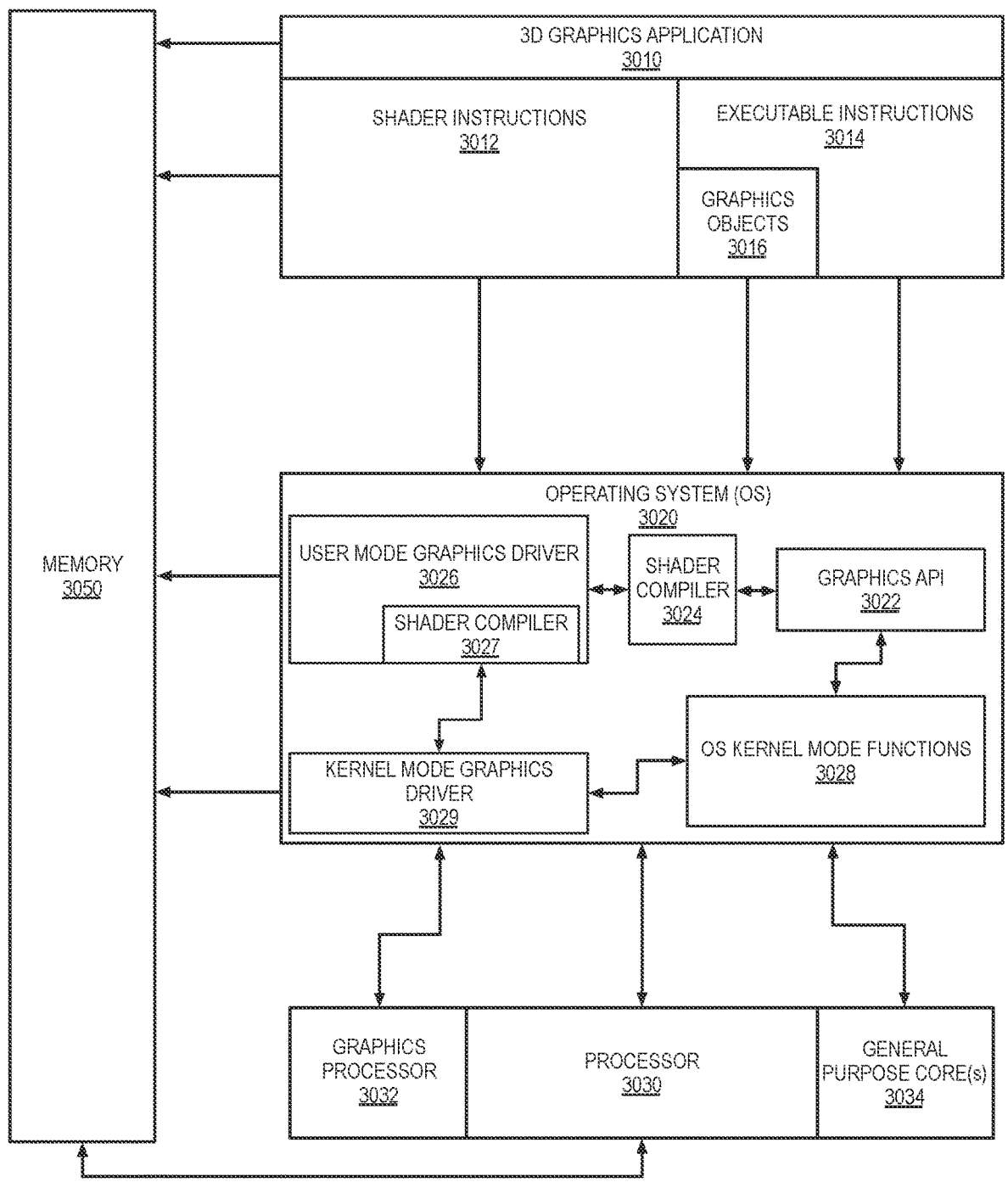
FIG. 30 illustrates exemplary graphics software architecture for a data processing system according to some embodiments.

FIG. 30 illustrates an exemplary graphics software architecture for a data processing system 3000 according to some embodiments. In some embodiments, software architecture includes a 3D graphics application 3010, an operating system 3020, and at least one processor 3030. In some embodiments, processor 3030 includes a graphics processor 3032 and one or more general-purpose processor core(s) 3034. The graphics application 3010 and operating system 3020 each execute in the system memory 3050 of the data processing system.

In some embodiments, 3D graphics application 3010 contains one or more shader programs including shader instructions 3012. The shader language instructions may be in a high-level shader language, such as the High-Level Shader Language (HLSL) of Direct3D, the OpenGL Shader Language (GLSL), and so forth. The application also includes executable instructions 3014 in a machine language suitable for execution by the general-purpose processor core 3034. The application also includes graphics objects 3016 defined by vertex data.

In some embodiments, operating system 3020 is a Microsoft® Windows® operating system from the Microsoft Corporation, a proprietary UNIX-like operating system, or an open source UNIX-like operating system using a variant of the Linux kernel. The operating system 3020 can support a graphics API 3022 such as the Direct3D API, the OpenGL API, or the Vulkan API. When the Direct3D API is in use, the operating system 3020 uses a front-end shader compiler 3024 to compile any shader instructions 3012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 3010. In some embodiments, the shader instructions 3012 are provided in an intermediate form, such as a version of the Standard Portable Intermediate Representation (SPIR) used by the Vulkan API.

In some embodiments, user mode graphics driver 3026 contains a back-end shader compiler 3027 to convert the shader instructions 3012 into a hardware specific representation. When the OpenGL API is in use, shader instructions 3012 in the GLSL high-level language are passed to a user mode graphics driver 3026 for compilation. In some embodiments, user mode graphics driver 3026 uses operating system kernel mode functions 3028 to communicate with a kernel mode graphics driver 3029. In some embodiments, kernel mode graphics driver 3029 communicates with graphics processor 3032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 31A:
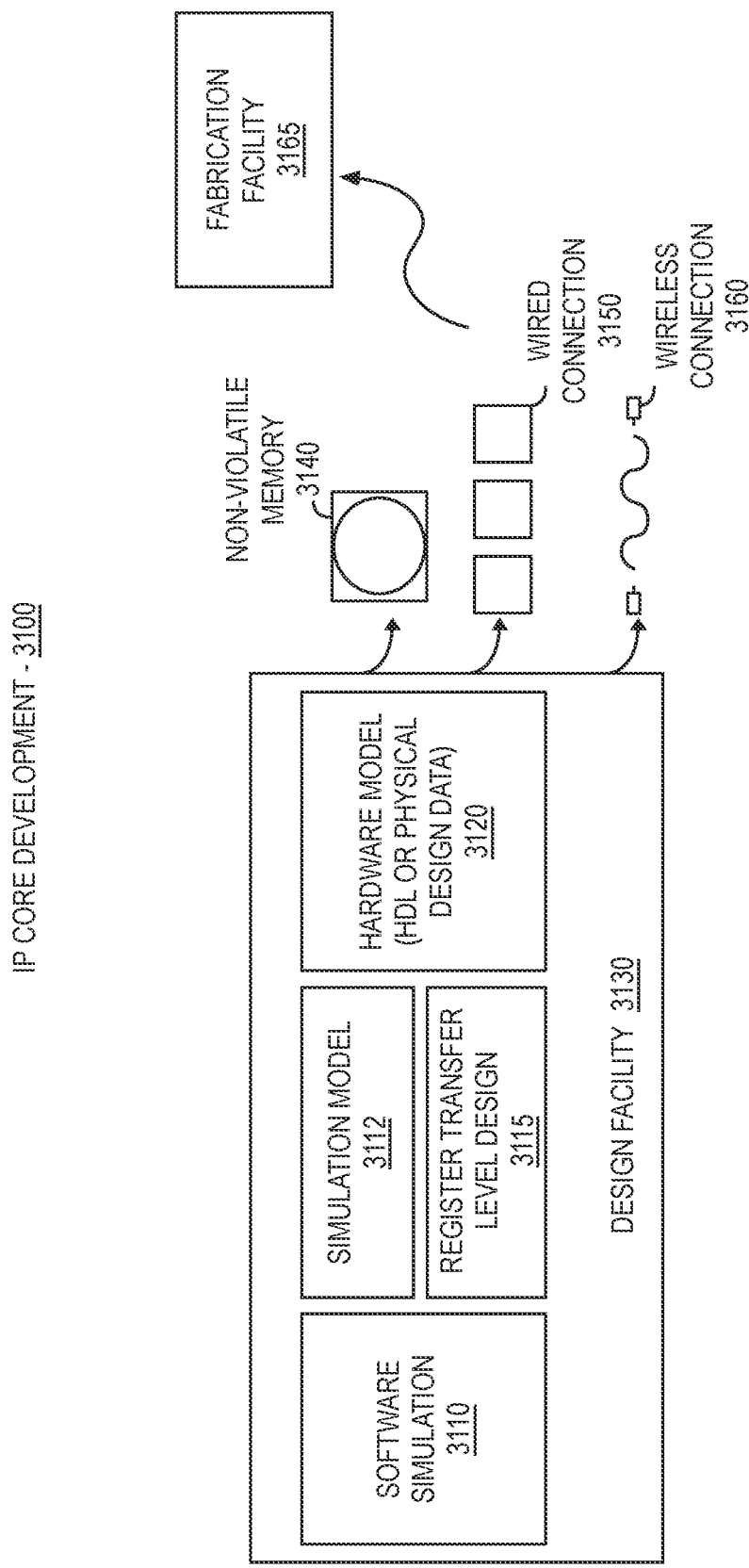
FIG. 31A is a block diagram illustrating an IP core development system, according to an embodiment.

FIG. 31A is a block diagram illustrating an IP core development system 3100 that may be used to manufacture an integrated circuit to perform operations according to an embodiment. The IP core development system 3100 may be used to generate modular, re-usable designs that can be incorporated into a larger design or used to construct an entire integrated circuit (e.g., an SOC integrated circuit). A design facility 3130 can generate a software simulation 3110 of an IP core design in a high-level programming language (e.g., C/C++). The software simulation 3110 can be used to design, test, and verify the behavior of the IP core using a simulation model 3112. The simulation model 3112 may include functional, behavioral, and/or timing simulations. A register transfer level (RTL) design 3115 can then be created or synthesized from the simulation model 3112. The RTL design 3115 is an abstraction of the behavior of the integrated circuit that models the flow of digital signals between hardware registers, including the associated logic performed using the modeled digital signals. In addition to an RTL design 3115, lower-level designs at the logic level or transistor level may also be created, designed, or synthesized. Thus, the particular details of the initial design and simulation may vary.

The RTL design 3115 or equivalent may be further synthesized by the design facility into a hardware model 3120, which may be in a hardware description language (HDL), or some other representation of physical design data. The HDL may be further simulated or tested to verify the IP core design. The IP core design can be stored for delivery to a $3^{rd}$ party fabrication facility 3165 using non-volatile memory 3140 (e.g., hard disk, flash memory, or any non-volatile storage medium). Alternatively, the IP core design may be transmitted (e.g., via the Internet) over a wired connection 3150 or wireless connection 3160. The fabrication facility 3165 may then fabricate an integrated circuit that is based at least in part on the IP core design. The fabricated integrated circuit can be configured to perform operations in accordance with at least one embodiment described herein.

Figure 31B:
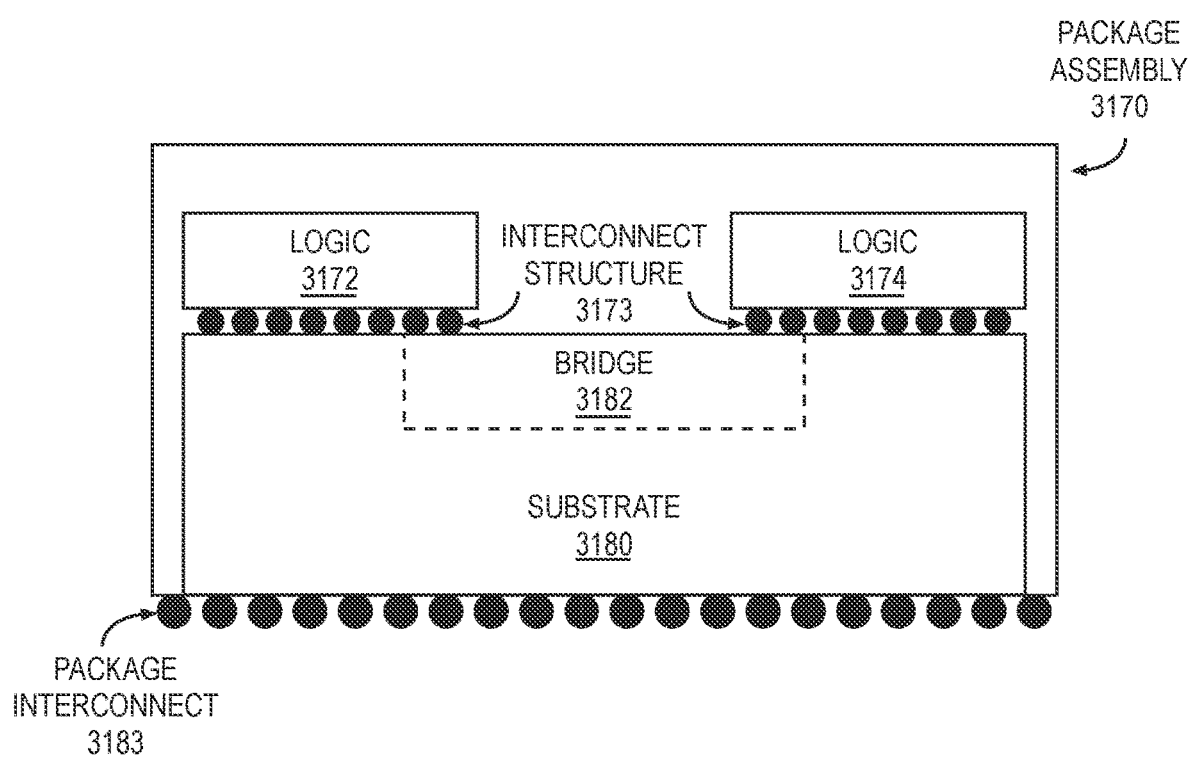
FIG. 31B illustrates a cross-section side view of an integrated circuit package assembly, according to some embodiments described herein.

FIG. 31B illustrates a cross-section side view of an integrated circuit package assembly 3170, according to some embodiments described herein. The integrated circuit package assembly 3170 illustrates an implementation of one or more processor or accelerator devices as described herein. The package assembly 3170 includes multiple units of hardware logic 3172, 3174 connected to a substrate 3180. The logic 3172, 3174 may be implemented at least partly in configurable logic or fixed-functionality logic hardware, and can include one or more portions of any of the processor core(s), graphics processor(s), or other accelerator devices described herein. Each unit of logic 3172, 3174 can be implemented within a semiconductor die and coupled with the substrate 3180 via an interconnect structure 3173. The interconnect structure 3173 may be configured to route electrical signals between the logic 3172, 3174 and the substrate 3180, and can include interconnects such as, but not limited to bumps or pillars. In some embodiments, the interconnect structure 3173 may be configured to route electrical signals such as, for example, input/output (I/O) signals and/or power or ground signals associated with the operation of the logic 3172, 3174. In some embodiments, the substrate 3180 is an epoxy-based laminate substrate. The substrate 3180 may include other suitable types of substrates in other embodiments. The package assembly 3170 can be connected to other electrical devices via a package interconnect 3183. The package interconnect 3183 may be coupled to a surface of the substrate 3180 to route electrical signals to other electrical devices, such as a motherboard, other chipset, or multi-chip module.

In some embodiments, the units of logic 3172, 3174 are electrically coupled with a bridge 3182 that is configured to route electrical signals between the logic 3172, 3174. The bridge 3182 may be a dense interconnect structure that provides a route for electrical signals. The bridge 3182 may include a bridge substrate composed of glass or a suitable semiconductor material. Electrical routing features can be formed on the bridge substrate to provide a chip-to-chip connection between the logic 3172, 3174.

Although two units of logic 3172, 3174 and a bridge 3182 are illustrated, embodiments described herein may include more or fewer logic units on one or more dies. The one or more dies may be connected by zero or more bridges, as the bridge 3182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 32:
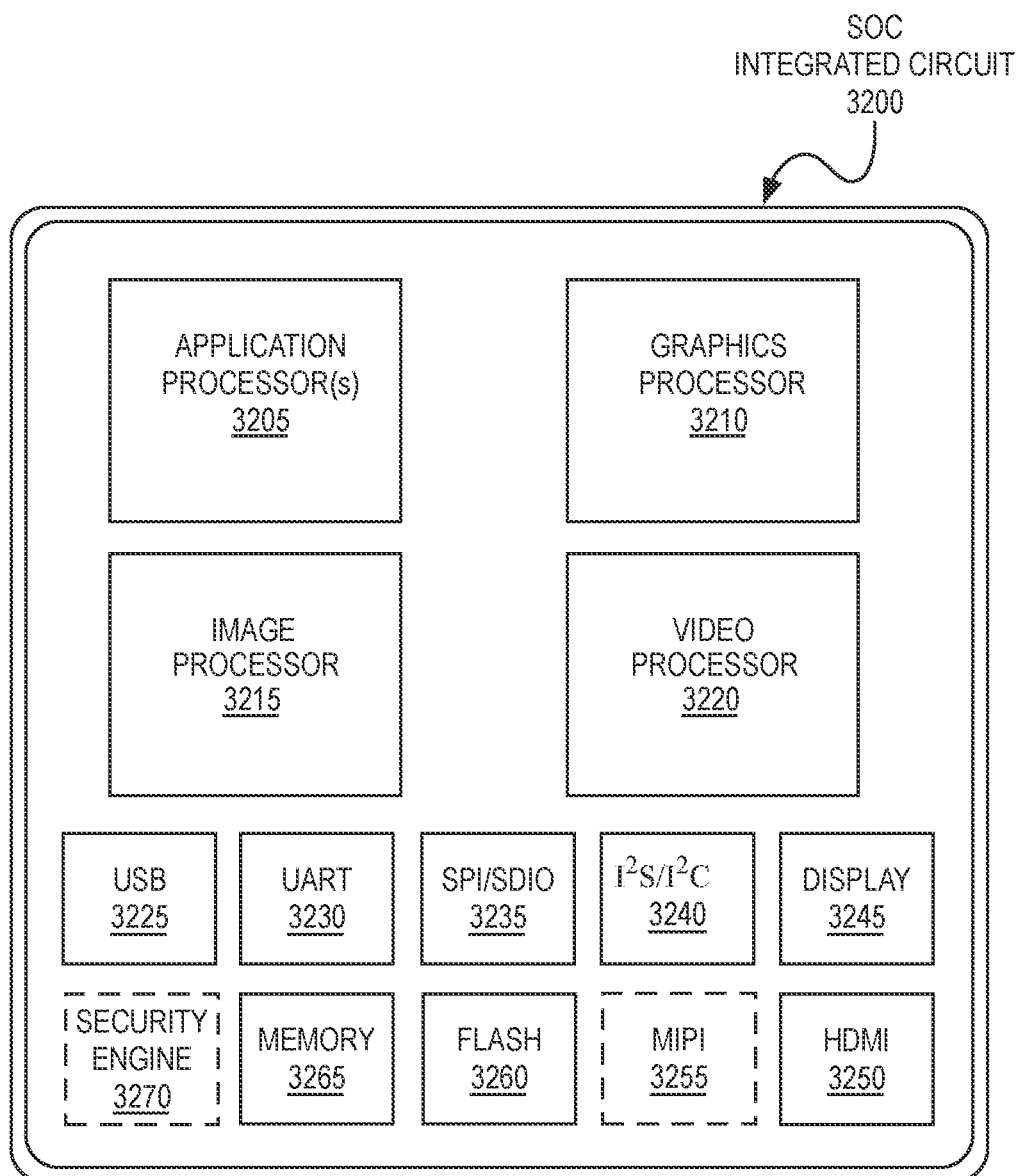
FIG. 32 is a block diagram illustrating an exemplary system on a chip integrated circuit, according to an embodiment.

FIG. 32-33 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 32 is a block diagram illustrating an exemplary system on a chip integrated circuit 3200 that may be fabricated using one or more IP cores, according to an embodiment. Exemplary integrated circuit 3200 includes one or more application processor(s) 3205 (e.g., CPUs), at least one graphics processor 3210, and may additionally include an image processor 3215 and/or a video processor 3220, any of which may be a modular IP core from the same or multiple different design facilities. Integrated circuit 3200 includes peripheral or bus logic including a USB controller 3225, UART controller 3230, an SPI/SDIO controller 3235, and an I²S/I²C controller 3240. Additionally, the integrated circuit can include a display device 3245 coupled to one or more of a high-definition multimedia interface (HDMI) controller 3250 and a mobile industry processor interface (MIPI) display interface 3255. Storage may be provided by a flash memory subsystem 3260 including flash memory and a flash memory controller. Memory interface may be provided via a memory controller 3265 for access to SDRAM or SRAM memory devices. Some integrated circuits additionally include an embedded security engine 3270.

Figure 33A:
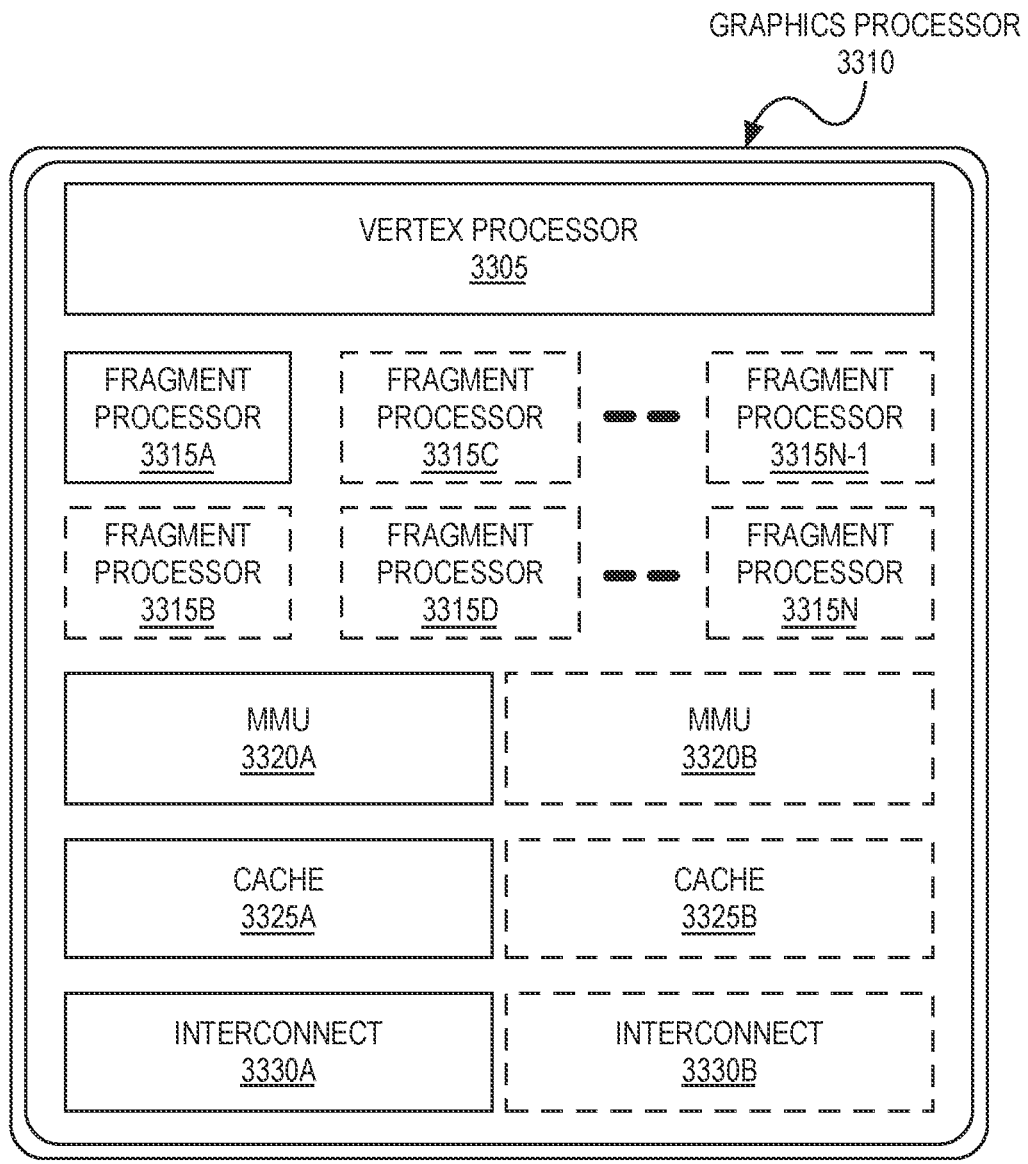
FIG. 33A-33B are block diagrams illustrating exemplary graphics processors for use within an SoC, according to embodiments described herein.
Figure 33B:
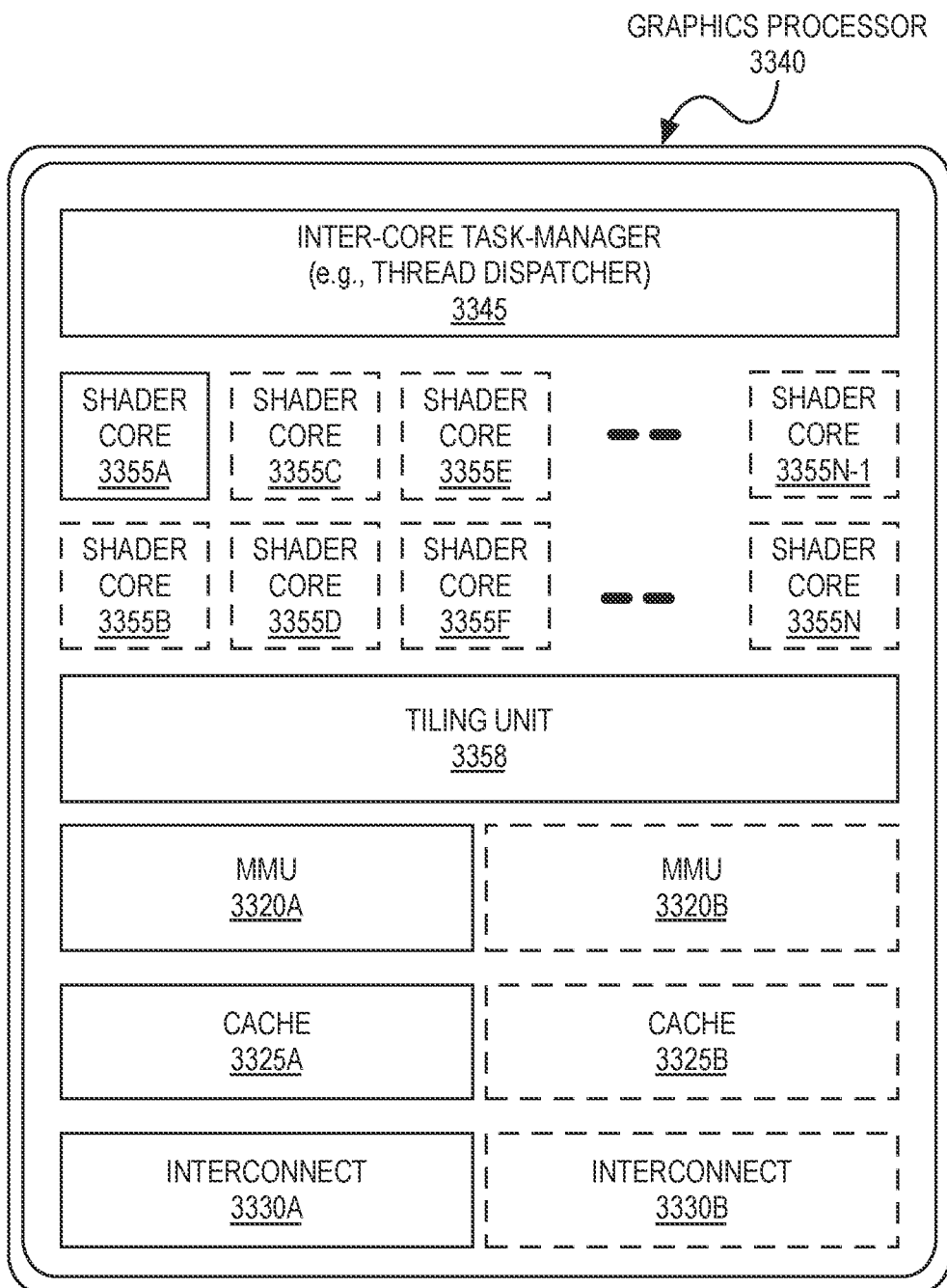

FIG. 33A-33B are block diagrams illustrating exemplary graphics processors for use within an SoC, according to embodiments described herein. FIG. 33A illustrates an exemplary graphics processor 3310 of a system on a chip integrated circuit that may be fabricated using one or more IP cores, according to an embodiment. FIG. 33B illustrates an additional exemplary graphics processor 3340 of a system on a chip integrated circuit that may be fabricated using one or more IP cores, according to an embodiment. Graphics processor 3310 of FIG. 33A is an example of a low power graphics processor core. Graphics processor 3340 of FIG. 33B is an example of a higher performance graphics processor core. Each of the graphics processors 3310, 3340 can be variants of the graphics processor 3210 of FIG. 32.

As shown in FIG. 33A, graphics processor 3310 includes a vertex processor 3305 and one or more fragment processor(s) 3315A-3315N (e.g., 3315A, 3315B, 3315C, 3315D, through 3315N-1, and 3315N). Graphics processor 3310 can execute different shader programs via separate logic, such that the vertex processor 3305 is optimized to execute operations for vertex shader programs, while the one or more fragment processor(s) 3315A-3315N execute fragment (e.g., pixel) shading operations for fragment or pixel shader programs. The vertex processor 3305 performs the vertex processing stage of the 3D graphics pipeline and generates primitives and vertex data. The fragment processor(s) 3315A-3315N use the primitive and vertex data generated by the vertex processor 3305 to produce a framebuffer that is displayed on a display device. In one embodiment, the fragment processor(s) 3315A-3315N are optimized to execute fragment shader programs as provided for in the OpenGL API, which may be used to perform similar operations as a pixel shader program as provided for in the Direct 3D API.

Graphics processor 3310 additionally includes one or more memory management units (MMUs) 3320A-3320B, cache(s) 3325A-3325B, and circuit interconnect(s) 3330A-3330B. The one or more MMU(s) 3320A-3320B provide for virtual to physical address mapping for the graphics processor 3310, including for the vertex processor 3305 and/or fragment processor(s) 3315A-3315N, which may reference vertex or image/texture data stored in memory, in addition to vertex or image/texture data stored in the one or more cache(s) 3325A-3325B. In one embodiment the one or more MMU(s) 3320A-3320B may be synchronized with other MMUs within the system, including one or more MMUs associated with the one or more application processor(s) 3205, image processor 3215, and/or video processor 3220 of FIG. 32, such that each processor 3205-3220 can participate in a shared or unified virtual memory system. The one or more circuit interconnect(s) 3330A-3330B enable graphics processor 3310 to interface with other IP cores within the SoC, either via an internal bus of the SoC or via a direct connection, according to embodiments.

As shown FIG. 33B, graphics processor 3340 includes the one or more MMU(s) 3320A-3320B, cache(s) 3325A-3325B, and circuit interconnect(s) 3330A-3330B of the graphics processor 3310 of FIG. 33A. Graphics processor 3340 includes one or more shader cores 3355A-3355N (e.g., 3355A, 3355B, 3355C, 3355D, 3355E, 3355F, through 3355N-1, and 3355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 3340 includes an inter-core task manager 3345, which acts as a thread dispatcher to dispatch execution threads to one or more shader cores 3355A-3355N and a tiling unit 3358 to accelerate tiling operations for tile-based rendering, in which rendering operations for a scene are subdivided in image space, for example to exploit local spatial coherence within a scene or to optimize use of internal caches.

In some embodiments, an apparatus includes one or more processors including one or more graphics processing units (GPUs); and a plurality of caches to provide storage for the one or more GPUs, the plurality of caches including at least an L1 cache and an L3 cache, wherein the apparatus to provide intelligent prefetching of data by a prefetcher of a first GPU of the one or more GPUs including: measuring a hit rate for the L1 cache, upon determining that the hit rate for the L1 cache is equal to or greater than a threshold value, limiting a prefetch of data to storage in the L3 cache, and upon determining that the hit rate for the L1 cache is less than a threshold value, allowing the prefetch of data to the L1 cache.

In some embodiments, the apparatus further includes an interface to receive prefetch instructions from prefetchers of the one or more GPUs, and wherein the interface is to detect and eliminate unnecessary prefetches.

In some embodiments, upon the interface detecting two or more prefetches having a duplicate address, the apparatus is to eliminate one or more of the prefetches having the duplicate address.

In some embodiments, upon the interface detecting a prefetch that relates to data that is uncacheable, the interface is to eliminate the prefetch.

In some embodiments, the apparatus further includes an execution unit of the one or more GPUs, the execution unit including a hardware preprocessor, the hardware preprocessor to have access to a table of IP addresses that a kernel is using.

In some embodiments, the hardware preprocessor is to commence prefetching of IP addresses from the table of IP addresses ahead of execution of a thread.

In some embodiments, a prefetcher of a GPU of the one or more GPUs is to prefetch an instruction directly into an instruction cache (I-cache).

In some embodiments, the prefetch of the instruction directly into the I-cache is to occur upon an application driver being aware of a next kernel, and the prefetch being issued for the next kernel when starting execution of a current kernel.

In some embodiments, upon a compute operation operating out of the L3 cache, the apparatus is to utilize a memory link to perform memory scrubbing to maintain activity of a memory bandwidth.

In some embodiments, one or more non-transitory computer-readable storage mediums having stored thereon executable computer program instructions that, when executed by one or more processors, cause the one or more processors to perform operations including measuring a hit rate for an L1 cache for a first graphics processing unit (GPU) of one or more GPUs of a computing system, the computing system further including an L3 cache; receiving a prefetch of data for the first GPU; upon determining that the hit rate for the L1 cache is equal to or greater than a threshold value, limiting the prefetch of the data to storage in the L3 cache; and upon determining that the hit rate for the L1 cache is less than the threshold value, allowing the prefetch of the data to the L1 cache.

In some embodiments, the instructions further include instructions for detecting and eliminating unnecessary prefetches received for the one or more GPUs.

In some embodiments, detecting and eliminating unnecessary prefetches includes detecting two or more prefetches having a duplicate address and eliminating one or more of the prefetches having the duplicate address.

In some embodiments, detecting and eliminating unnecessary prefetches includes detecting a prefetch that relates to data that is uncacheable and eliminating the prefetch.

In some embodiments, the instructions further include instructions for prefetching IP addresses from a table of IP addresses ahead of execution of a thread utilizing a hardware preprocessor.

In some embodiments, the instructions further include instructions for prefetching an instruction directly into an instruction cache (I-cache).

In some embodiments, the prefetching of the instruction directly into the I-cache is to occur upon an application driver being aware of a next kernel, and the prefetch being issued for the next kernel when starting execution of a current kernel.

In some embodiments, the instructions further include instructions for utilizing a memory link to perform memory scrubbing to maintain activity of a memory bandwidth upon a compute operation operating out of the L3 cache.

In some embodiments, a method includes measuring a hit rate for an L1 cache for a first graphics processing unit (GPU) of one or more GPUs of a computing system, the computing system further including an L3 cache; receiving a prefetch of data for the first GPU; upon determining that the hit rate for the L1 cache is equal to or greater than a threshold value, limiting the prefetch of the data to storage in the L3 cache; and upon determining that the hit rate for the L1 cache is less than the threshold value, allowing the prefetch of the data to the L1 cache.

In some embodiments, the method further includes detecting and eliminating unnecessary prefetches received for the one or more GPUs.

In some embodiments, detecting and eliminating unnecessary prefetches includes detecting two or more prefetches having a duplicate address and eliminating one or more of the prefetches having the duplicate address.

In some embodiments, detecting and eliminating unnecessary prefetches includes detecting a prefetch that relates to data that is uncacheable and eliminating the prefetch.

In some embodiments, the method further includes prefetching IP addresses from a table of IP addresses ahead of execution of a thread utilizing a hardware preprocessor.

In some embodiments, the method further includes prefetching an instruction directly into an instruction cache (I-cache).

In some embodiments, the prefetching of the instruction directly into the I-cache is to occur upon an application driver being aware of a next kernel, and the prefetch being issued for the next kernel when starting execution of a current kernel.

In some embodiments, the method further includes utilizing a memory link to perform memory scrubbing to maintain activity of a memory bandwidth upon a compute operation operating out of the L3 cache.

In some embodiments, an apparatus includes means for measuring a hit rate for an L1 cache for a first graphics processing unit (GPU) of one or more GPUs of a computing system, the computing system further including an L3 cache; means for receiving a prefetch of data for the first GPU; upon determining that the hit rate for the L1 cache is equal to or greater than a threshold value, limiting the prefetch of the data to storage in the L3 cache; and means for allowing the prefetch of the data to the L1 cache upon determining that the hit rate for the L1 cache is less than the threshold value.

In some embodiments, the apparatus further includes means for detecting and eliminating unnecessary prefetches received for the one or more GPUs.

In some embodiments, detecting and eliminating unnecessary prefetches includes detecting two or more prefetches having a duplicate address and eliminating one or more of the prefetches having the duplicate address.

In some embodiments, detecting and eliminating unnecessary prefetches includes detecting a prefetch that relates to data that is uncacheable and eliminating the prefetch.

In some embodiments, the apparatus further includes means for prefetching IP addresses from a table of IP addresses ahead of execution of a thread utilizing a hardware preprocessor.

In some embodiments, the apparatus further includes means for prefetching an instruction directly into an instruction cache (I-cache).

In some embodiments, the prefetching of the instruction directly into the I-cache is to occur upon an application driver being aware of a next kernel, and the prefetch being issued for the next kernel when starting execution of a current kernel.

In some embodiments, the apparatus further includes means for utilizing a memory link to perform memory scrubbing to maintain activity of a memory bandwidth upon a compute operation operating out of the L3 cache.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
   one or more processors including one or more graphics processing units (GPUs); and
   a plurality of caches to provide storage for the one or more GPUs, the plurality of caches including at least a lower level cache and a higher level cache; and
   wherein the apparatus to provide intelligent prefetching of data by a prefetcher of a first GPU of the one or more GPUs including:
      measuring a hit rate for the lower level cache over a sampling period,
      comparing the hit rate for the lower level cache to a threshold value number of hits;
      upon determining that the hit rate for the lower level cache is equal to or greater than the threshold value, limiting a prefetch of data to storage in the higher level cache, and
      upon determining that the hit rate for the lower level cache is less than the threshold value, allowing the prefetch of data to both the lower level cache and the higher level cache; and
   wherein, upon a compute operation operating out of the higher level cache, the apparatus is further to utilize a memory link during the operation of the higher level cache to maintain activity of memory bandwidth.

2. The apparatus of claim 1, wherein the one or more processors are further to determine higher level cache and memory activity at least in part utilizing the memory bandwidth.

3. The apparatus of claim 2, wherein the one or more processors are further to trigger prefetching and memory scrubbing activities based at least in part on the determined higher level cache and memory activity.

4. The apparatus of claim 1, wherein the apparatus further includes an interface to receive prefetch instructions from prefetchers of the one or more GPUs, and wherein the apparatus is to detect and eliminate unnecessary prefetches, including:
   upon the apparatus detecting two or more prefetches having a duplicate address, the apparatus is to eliminate one or more of the prefetches having the duplicate address; or
   upon the apparatus detecting a prefetch that relates to data that is uncacheable, the apparatus is to eliminate the prefetch.

5. The apparatus of claim 1, further comprising an execution unit of the one or more GPUs, the execution unit including a hardware preprocessor, the hardware preprocessor to have access to a table of IP addresses that a kernel is using, wherein the hardware preprocessor is to commence prefetching of IP addresses from the table of IP addresses ahead of execution of a thread.

6. The apparatus of claim 1, wherein a prefetcher of a GPU of the one or more GPUs is to prefetch an instruction directly into an instruction cache (I-cache), and wherein the prefetch of the instruction directly into the I-cache is to occur upon an application driver being aware of a next kernel, and the prefetch being issued for the next kernel when starting execution of a current kernel.

7. One or more non-transitory computer-readable storage mediums having stored thereon executable computer program instructions that, when executed by one or more processors, cause the one or more processors to perform operations comprising:
    measuring a hit rate for an lower level cache over a sampling period for a first graphics processing unit (GPU) of one or more GPUs of a computing system, the computing system further including a higher level cache;
    receiving a prefetch of data for the first GPU;
    comparing the hit rate for the lower level cache to a threshold value number of hits;
    upon determining that the hit rate for the lower level cache is equal to or greater than the threshold value, limiting the prefetch of the data to storage in the higher level cache;
    upon determining that the hit rate for the lower level cache is less than the threshold value, allowing the prefetch of the data to both the lower level cache and the higher level cache; and
    upon a compute operation operating out of the higher level cache, utilizing a memory link during the operation of the higher level cache to maintain activity of memory bandwidth.

8. The one or more computer-readable storage mediums of claim 7, further comprising instructions for determining higher level cache and memory activity at least in part utilizing the memory bandwidth.

9. The one or more computer-readable storage mediums of claim 8, further comprising instructions for triggering prefetching and memory scrubbing activities based at least in part on the determined higher level cache and memory activity.

10. The one or more computer-readable storage mediums of claim 7, further comprising instructions for detecting and eliminating unnecessary prefetches, including:
    upon detecting two or more prefetches having a duplicate address, eliminating one or more of the prefetches having the duplicate address; or
    upon detecting a prefetch that relates to data that is uncacheable, eliminating the prefetch.

11. The one or more computer-readable storage mediums of claim 7, further comprising instructions for commencing prefetching of IP addresses ahead of execution of a thread from a table of IP addresses that a kernel is using, wherein an execution unit of the one or more GPUs includes a hardware preprocessor, the hardware preprocessor having access to the table of IP addresses.

12. The one or more computer-readable storage mediums of claim 7, further comprising instructions for prefetching an instruction directly into an instruction cache (I-cache), wherein the prefetch of the instruction directly into the I-cache is to occur upon an application driver being aware of a next kernel, and wherein the prefetch being issued for the next kernel when starting execution of a current kernel.

13. A method comprising:
    measuring a hit rate for an lower level cache over a sampling period for a first graphics processing unit (GPU) of one or more GPUs of a computing system, the computing system further including a higher level cache;
    receiving a prefetch of data for the first GPU;
    comparing the hit rate for the lower level cache to a threshold value number of hits;
    upon determining that the hit rate for the lower level cache is equal to or greater than the threshold value, limiting the prefetch of the data to storage in the higher level cache;
    upon determining that the hit rate for the lower level cache is less than the threshold value, allowing the prefetch of the data to both the lower level cache and the higher level cache; and
    upon a compute operation operating out of the higher level cache, utilizing a memory link during the operation of the higher level cache to maintain activity of memory bandwidth.

14. The method of claim 13, further comprising determining higher level cache and memory activity at least in part utilizing the memory bandwidth.

15. The method of claim 14, further comprising triggering prefetching and memory scrubbing activities based at least in part on the determined higher level cache and memory activity.

16. The method of claim 13, further comprising detecting and eliminating unnecessary prefetches, including:
    upon detecting two or more prefetches having a duplicate address, eliminating one or more of the prefetches having the duplicate address; or
    upon detecting a prefetch that relates to data that is uncacheable, eliminating the prefetch.

17. The method of claim 13, further comprising commencing prefetching of IP addresses ahead of execution of a thread from a table of IP addresses that a kernel is using, wherein an execution unit of the one or more GPUs includes a hardware preprocessor, the hardware preprocessor having access to the table of IP addresses.

18. The method of claim 13, further comprising prefetching an instruction directly into an instruction cache (I-cache), wherein the prefetch of the instruction directly into the I-cache is to occur upon an application driver being aware of a next kernel, and wherein the prefetch being issued for the next kernel when starting execution of a current kernel.

* * * * *